United States Patent [19]
Taneda et al.

[11] Patent Number: 5,539,178
[45] Date of Patent: Jul. 23, 1996

[54] METHOD AND APPARATUS FOR CONTROLLING THE POWER SUPPLY FOR ELECTRICAL DISCHARGE MACHINE

[75] Inventors: Atsushi Taneda; Hajime Ogawa; Kazuhiko Uemoto; Yoshihide Kinbara, all of Aichi, Japan

[73] Assignee: Mitsubishi Denki Kabushiki Kaisha, Tokyo, Japan

[21] Appl. No.: 151,854

[22] Filed: Nov. 15, 1993

[30] Foreign Application Priority Data

Nov. 18, 1992 [JP] Japan .................... 4-308830
Aug. 6, 1993 [JP] Japan .................... 5-196101

[51] Int. Cl.⁶ .............................. B23H 1/00; G05F 1/40
[52] U.S. Cl. .................................. 219/69.13; 323/282
[58] Field of Search ........................ 323/220, 223, 323/282, 284; 219/69.11, 69.13, 69.16, 69.18

[56] References Cited

U.S. PATENT DOCUMENTS

| | | | |
|---|---|---|---|
| 5,126,525 | 6/1992 | Kaneko et al. | 219/69.13 |
| 5,298,709 | 3/1994 | Kaneko et al. | 219/69.18 |
| 5,345,053 | 9/1994 | Kaneko et al. | 219/69.18 |
| 5,352,859 | 10/1994 | Kaneko et al. | 219/69.13 |
| 5,378,866 | 1/1995 | Taneda | 219/69.18 |
| 5,386,095 | 1/1995 | Kaneko et al. | 219/69.18 |
| 5,399,826 | 3/1995 | Kaneko et al. | 219/69.13 |

FOREIGN PATENT DOCUMENTS

| | | |
|---|---|---|
| 0369949 | 5/1990 | European Pat. Off. . |
| 0412262 | 2/1991 | European Pat. Off. . |
| 4107910 | 9/1992 | Germany . |

*Primary Examiner*—Matthew V. Nguyen
*Attorney, Agent, or Firm*—Sughrue, Mion, Zinn, Macpeak & Seas; Richard C. Turner

[57] ABSTRACT

In a power supply apparatus of an electrical discharge machine, a power supply high in efficiency and small in current ripple is provided to achieve a power supply reduced in size and price. In addition, a switching power supply system is used jointly to generate an optional waveform. A first switching device is switched on/off in an optional cycle under the control of a current command value signal corresponding to the waveform shape of a current pulse to be supplied to a machining gap, whereby an optional shape of current pulse is supplied to the machining gap and a current component which compensates for a current ripple generated by said switching at the time of supplying said current is superimposed on said optional shape of current pulse and is supplied to the machining gap.

32 Claims, 51 Drawing Sheets

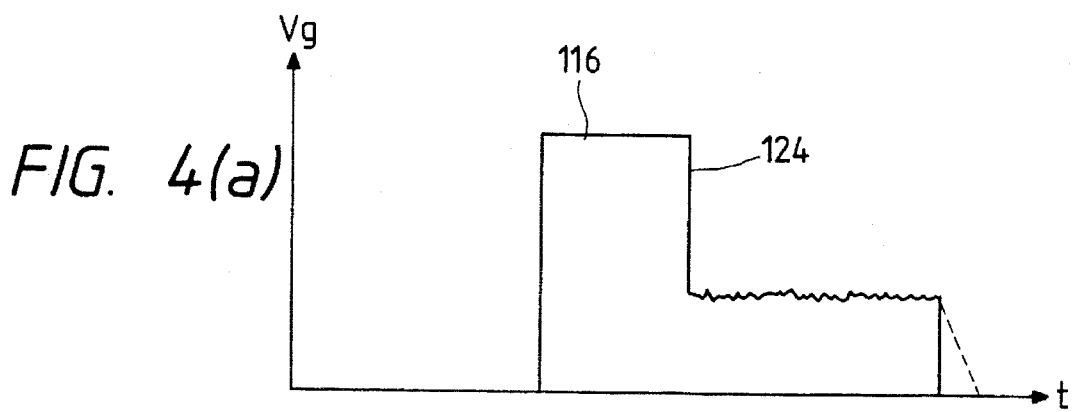
FIG. 4(a)
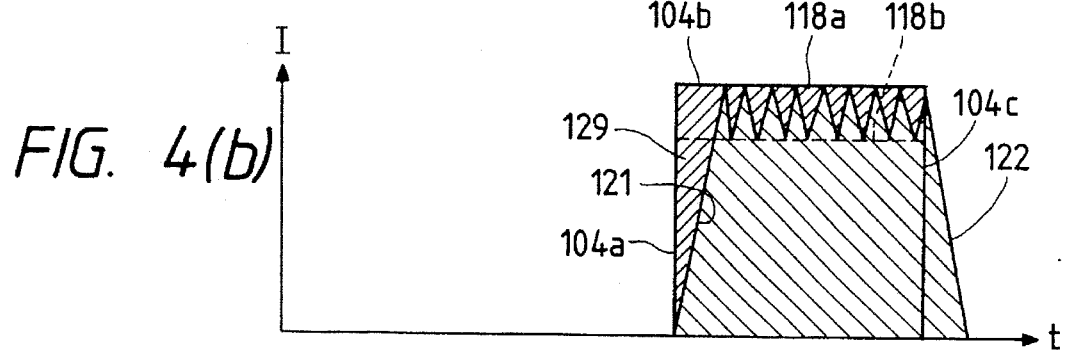
FIG. 4(b)
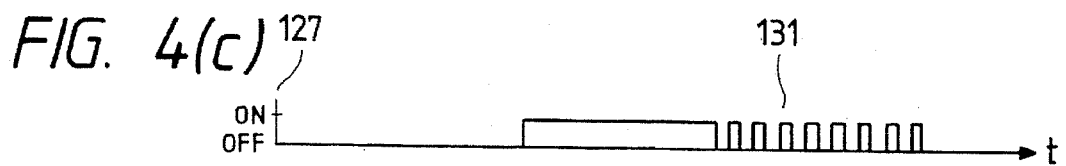
FIG. 4(c)
FIG. 4(e)   FIG. 4(d)
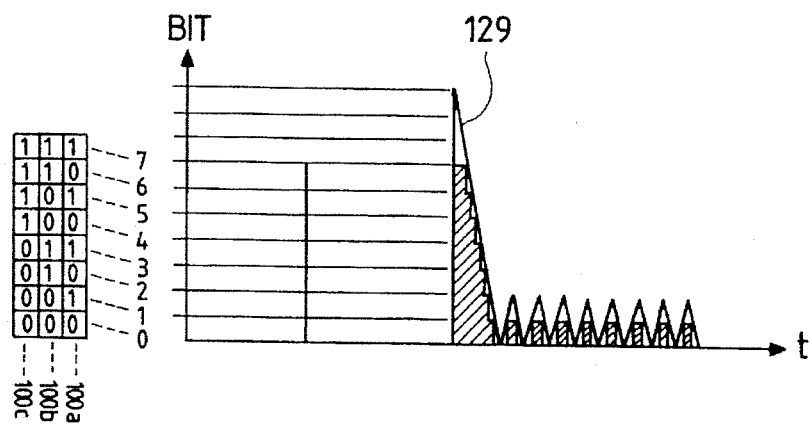

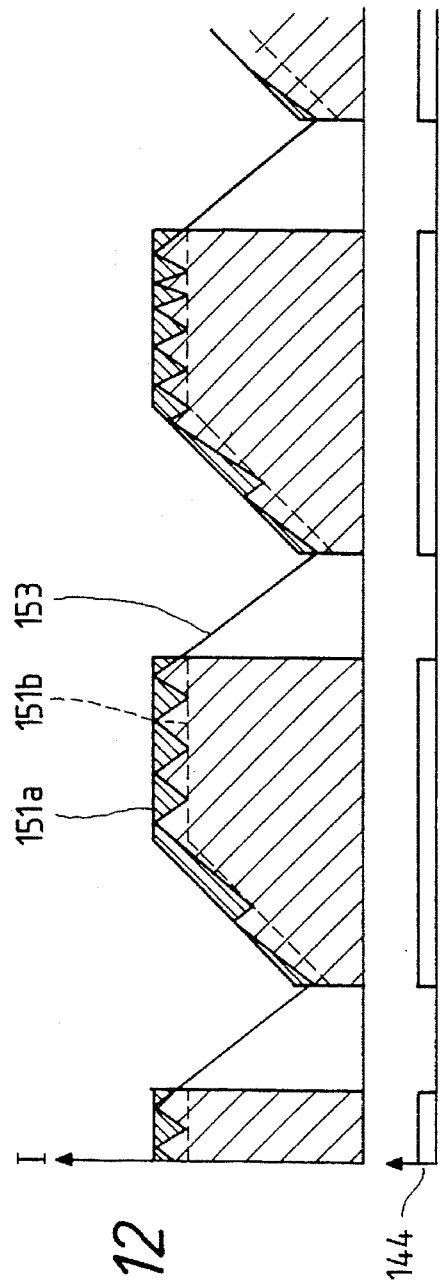
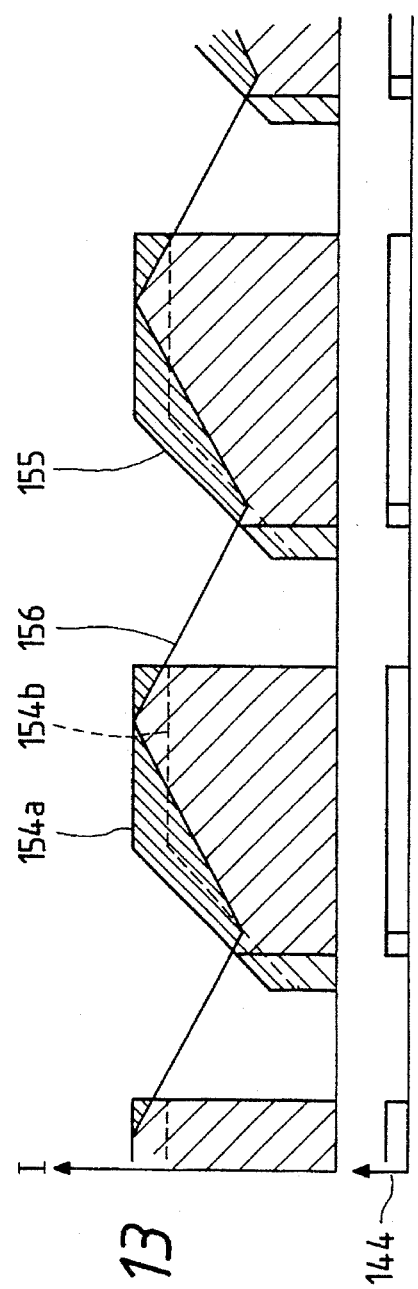

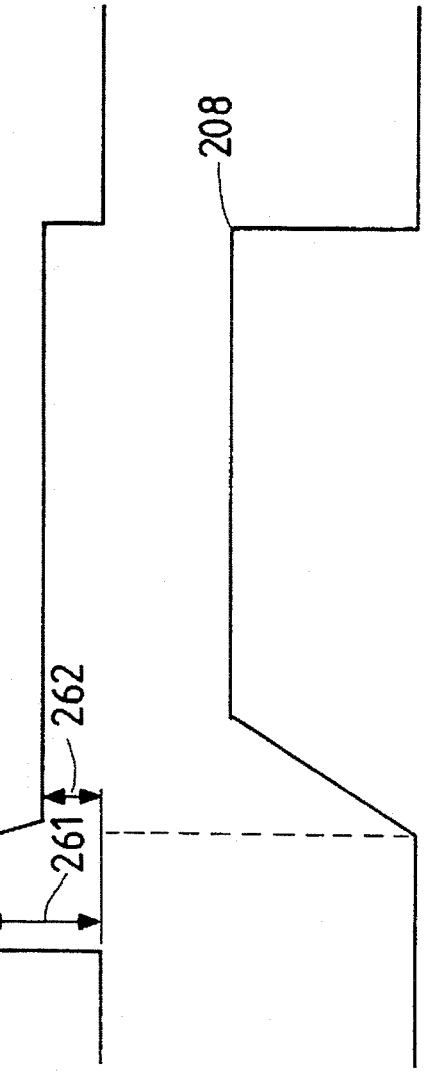
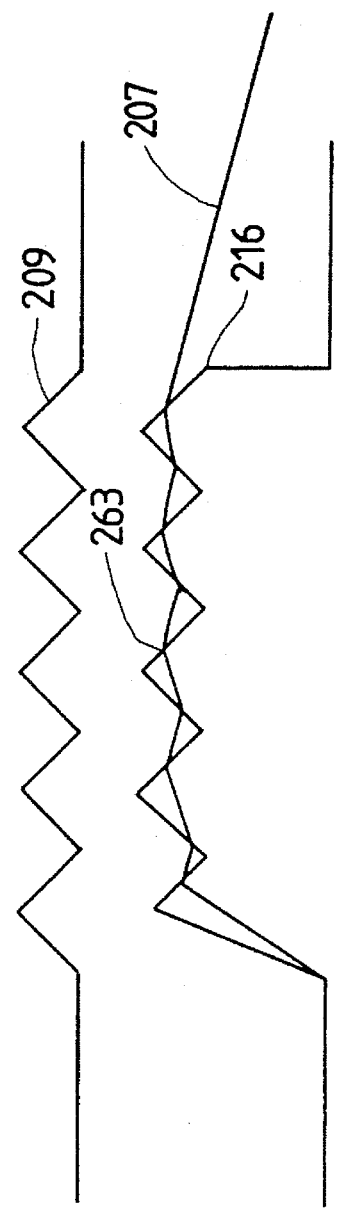
FIG. 21(a)
FIG. 21(b)
FIG. 21(c)
FIG. 21(d)
FIG. 21(e)

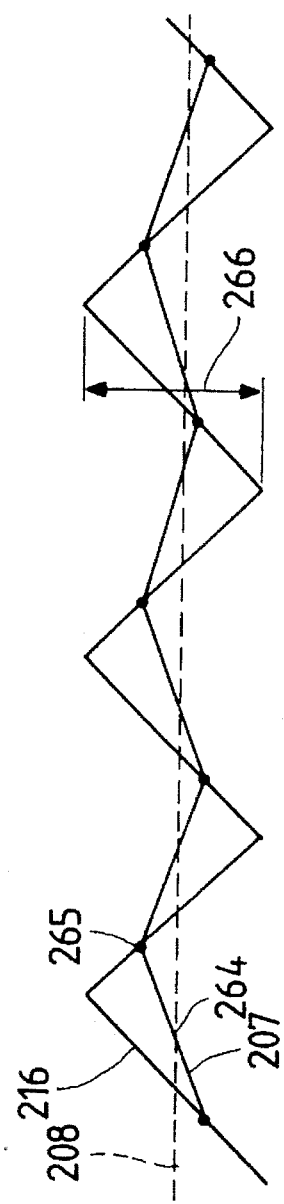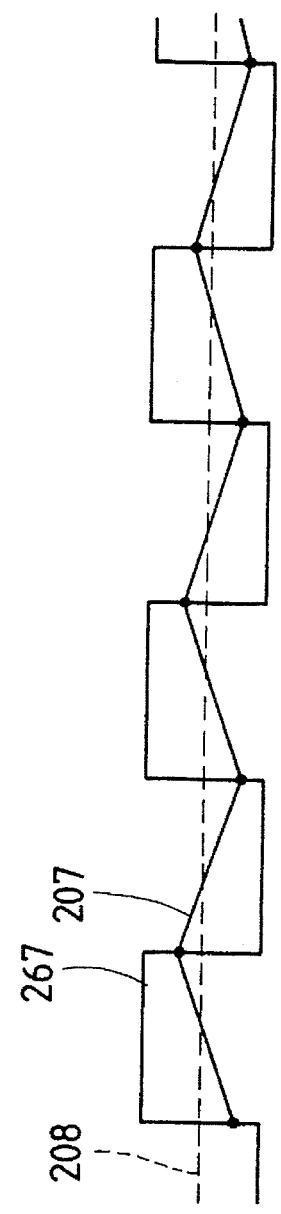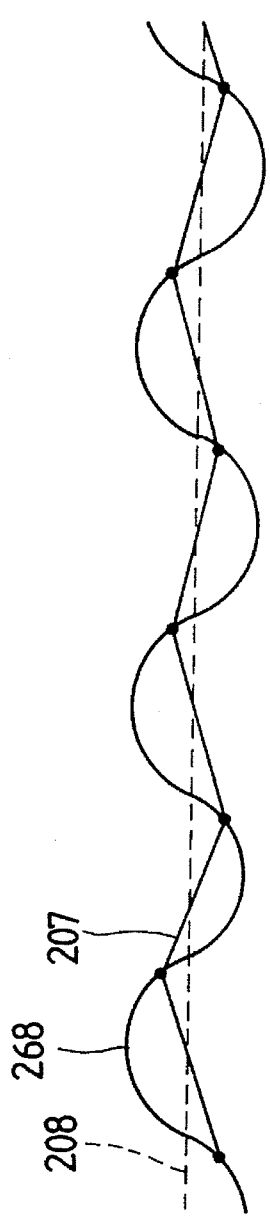

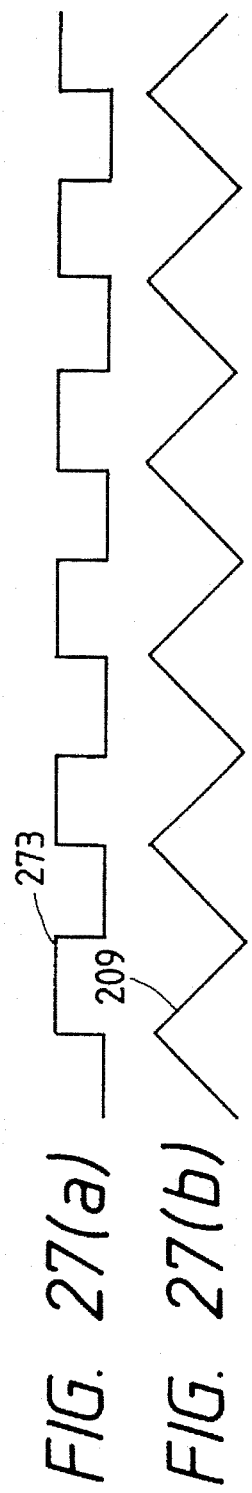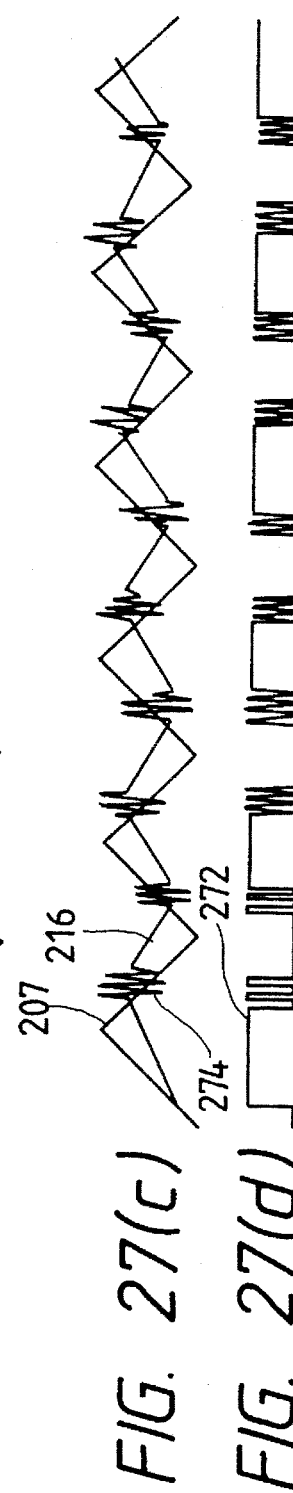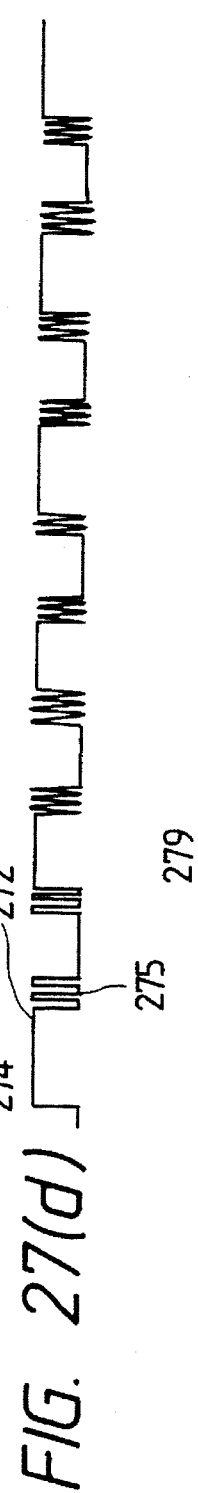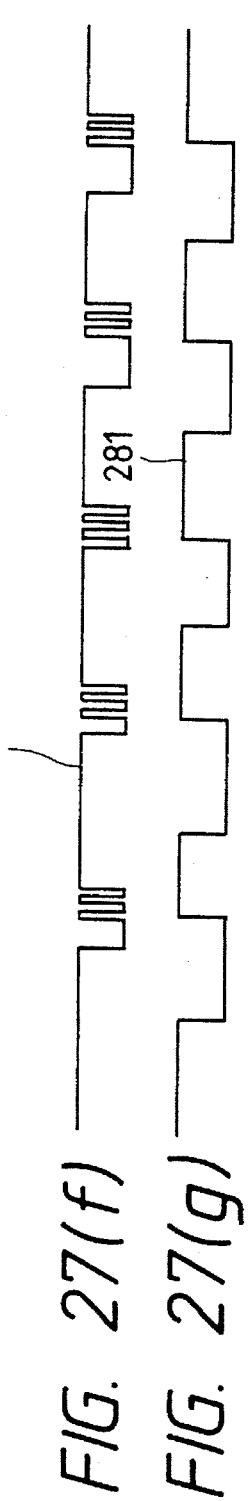
FIG. 27(a)
FIG. 27(b)
FIG. 27(c)
FIG. 27(d)
FIG. 27(e)
FIG. 27(f)
FIG. 27(g)

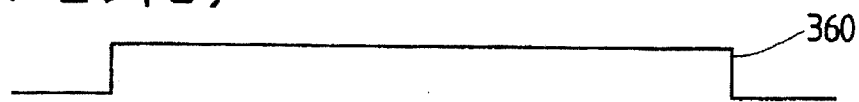
FIG. 29(a)
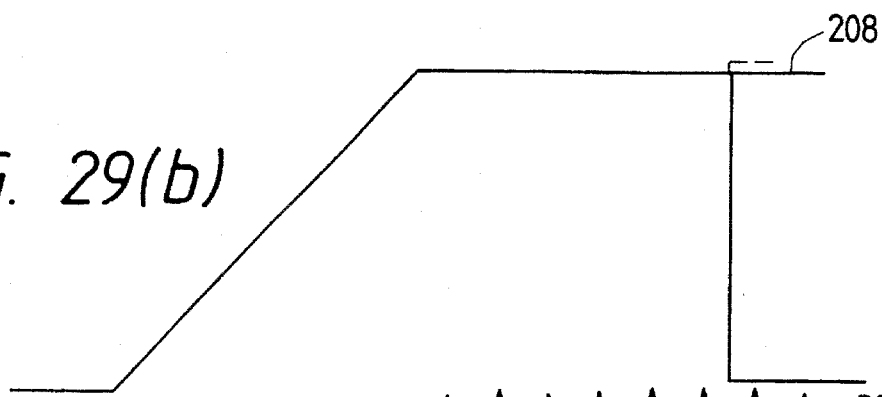
FIG. 29(b)
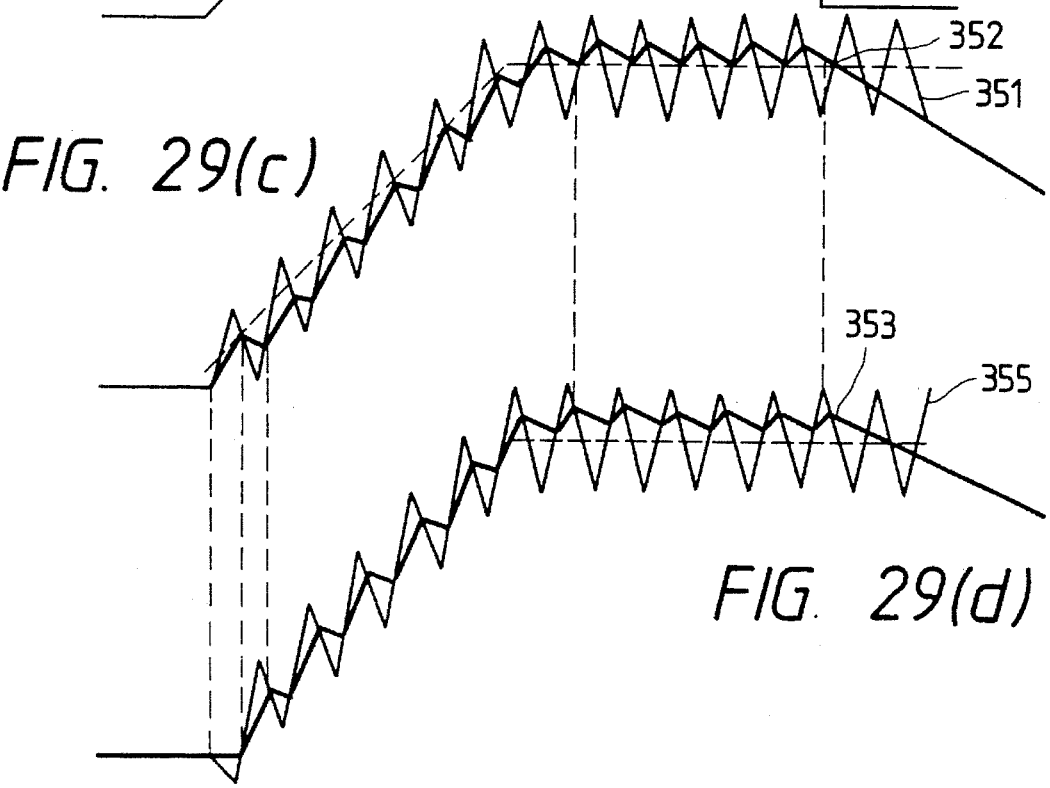
FIG. 29(c)
FIG. 29(d)

FIG. 31
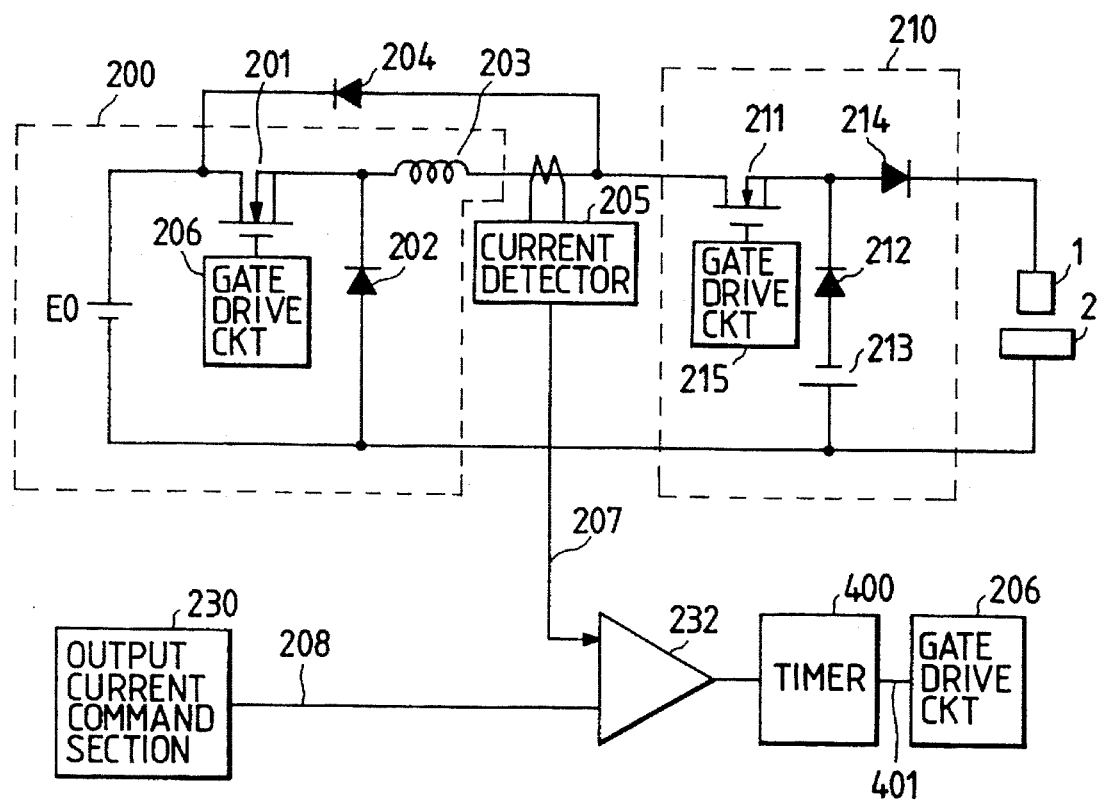
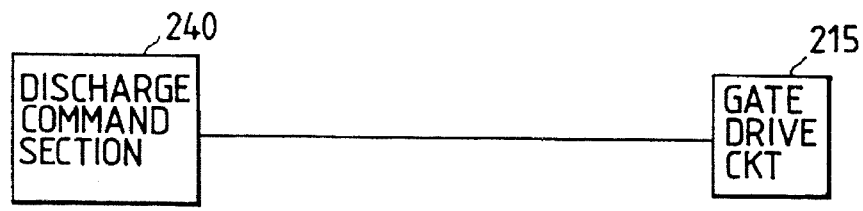

METHOD AND APPARATUS FOR CONTROLLING THE POWER SUPPLY FOR ELECTRICAL DISCHARGE MACHINE

BACKGROUND OF THE INVENTION

1. Field of the Invention

The present invention relates to a method and apparatus for controlling a power supply of an electrical discharge machine which supplies machining power to a machining gap between an electrode and a workpiece provided in dielectric.

2. Description of the Background Art

An electrical discharge machine supplies a constant current pulse to a machining gap to melt a workpiece and remove molten material therefrom and to machine the workpiece by the discharge of energy. Generally, the following four conventional power supply circuit arrangements are used to supply the constant current pulse.

One known circuit arrangement for a first power supply apparatus is shown in FIG. 54. This arrangement is, for example, disclosed in Japanese Laid-Open Patent Publication No. SHO62-27928 as a "Pulse Generator Used with the Electrical Erosion Machine Tool."

In FIG. 54, the numeral 1 indicates an electrode, 2 denotes a workpiece, 3 designates a control circuit for a switching device 4, 4 represents a switching device, 5 indicates a power supply for supplying a machining current, 6 designates a diode for causing a residual current to flow, 7 represents a current detection resistor, 8a and 8b denote stray inductances of wiring, 9 indicates a comparator, 10 represents an envelope signal generator, and 18 designates a servo device for exercising the servo control of the electrode 1.

The operation of this circuit will now be described. Before a discharge is started, the switching device 4 is conducting and a machining voltage is applied to the machining gap between the electrode 1 and the workpiece 2 by the power supply 5. Upon the start of the discharge, a pulse command 16 corresponding to a machining current waveform to be supplied to the machining gap is output from a control apparatus (not shown in FIG. 54) to the envelope signal generator 10. The pulse command 16 is output by the envelope signal generator 10 as envelope signals 13, 14. FIG. 55 shows the shapes of the envelope signals 13, 14. In the comparator 9, the current flowing in the machining gap is detected by the current detection resistor 7 to obtain a present machining current value 15, thereby comparing the envelope signals 13, 14 with the present machining current value 15 and outputting a control signal 12 to the control circuit 3. The control circuit 3 switches on/off the switching element 4 under the control of the control signal 12 to control the machining current within a predetermined value. Namely, when the present machining current value 15 exceeds the envelope signal 13, the switching device 4 is turned off. Conversely, when the present machining current value 15 falls below the envelope signal 14, the switching device 4 is turned on. The machining current is controlled in the above method.

In this method, the rising speed of the machining current waveform is determined by the current detection resistor 7 and the magnitude of the inductances 8a, 8b of a machining current supply feeder, i.e., the resistor and inductances are used as loads to carry out switching control.

A second conventional circuit arrangement for a power supply apparatus is shown in FIG. 58, which is disclosed, for example, in Japanese Laid-Open Utility Model Publication No. SHO57-33949 as a "Pulse Generation Circuit Controlled for Formation by Intermittent Electrical Discharges". This power supply apparatus has been improved in rising and falling speeds of the machining current, as compared to the first power supply apparatus, in order to ensure faster operation. In FIG. 58, an auxiliary power supply 28, a first switching device 4, a current detector 24, a reactor 22 and a diode 23 constitute a first auxiliary circuit. A power supply 5, the auxiliary power supply 28, the first switching device 4, the current detector 24, the reactor 22, an electrode 1, a workpiece 2 and a second switching device 20 constitute a main circuit.

The operation of this circuit will now be described. In the first auxiliary circuit, the switching device 4 is driven by a control circuit 27 under the control of the detection signal of the current detector 24. The control circuit 27 carries out the switching control of the switching device 4 so as to render the current flowing in the current detector 24 constant. In this case, the reactor 22 inserted in the circuit allows the current flowing in the first auxiliary circuit to be kept constant.

This second power supply apparatus is fitted with a second switching device 20 exclusively employed to switch the discharge pulse on/off. When the discharge pulse is off, a current within a predetermined range flows in the first auxiliary circuit on a steady-state basis, and as soon as the discharge is started, the machining current is supplied from the first auxiliary circuit. This enables the current to rise extremely fast. The current during the discharge flows in the main circuit which consists of the power supply 5, the auxiliary power supply 28, the first switching device 4, the current detector 24, the reactor 22, the electrode 1, the workpiece 2 and the second switching device 20. When the discharge has ended, the current which had been flowing in the reactor 22 of the main circuit flows to the second diode 23 in the first auxiliary circuit, thereby intercepting the current of the machining gap rapidly.

A first diode 25 is provided to raise power supply efficiency by forming a second auxiliary circuit and causing the current flowing in the reactor 22 to return to the power supply 5 when the first switching device 4 and the second switching device 20 are both switched off. The second auxiliary circuit is constituted by the first diode 25, the current detector 24, the reactor 22, the second diode 23 and the main power supply 5. FIG. 59 shows a machining current waveform generated by the second power supply apparatus.

Also, there is a third conventional circuit arrangement for a power supply apparatus shown in FIG. 60, which is disclosed, for example, in Japanese Laid-Open Patent Publication No. HEI2-34732 as a "Control Method for the Electrical Discharge Machining Power Supply." In FIG. 60, 30a to 30e indicate drive devices which cause switching devices 32a to 32e to conduct and which constitute a logic circuit 35. 33a to 33e represent limiting resistors which control a machining current and which have different values individually. Between an electrode 1 and a workpiece 2 is a detector 36 for detecting a discharge start. This detector 36 transmits a discharge detection signal 37 to the logic circuit 35. The logic circuit 35 selects the switching devices 32a to 32e to be driven under the control of the output signal of an oscillator 34 and the discharge detection signal 37.

The operation of this circuit will now be described. In the circuit, a power supply 5 is provided for supplying a current and a parallel connection of circuits, each comprising series connections of the switching devices 32a to 32e and the current limiting resistors 33a to 33e, is connected in series with the power supply 5. The resistance values of the current limiting resistors 33a to 33e different from each other are designed to be a power of two, i.e., once, twice, four times, etc. When a rectangular wave having a constant current value and a duration $t_p$ as shown in FIG. 61 is to be supplied, some of the switching devices 32 are switched on by their corresponding drive circuit 30 to cause current to flow through the corresponding current limiting resistors 33. When the discharge is started, a machining current is supplied to the machining gap through selected resistors 33. A difference voltage between the output voltage of the main power supply 5 and the discharge voltage generated at the machining gap between the electrode 1 and the workpiece 2 is applied to each current limiting resistor, thereby determining the current flowing in the current limiting resistor. Since the discharge voltage is generally a constant value, the machining current is determined uniquely by the selection of the current limiting resistors.

Further, as shown in FIG. 62, the rising speed of a current waveform can be controlled. By switching the switching devices 32 on/off continuously after the discharge current has risen up to a point indicated by 48 in FIG. 62, the current can be further increased but can be raised with its slope further reduced. Such intentional control of the discharge current waveform is often exercised to provide finer control of the machining operation.

Finally, there is a circuit arrangement for a fourth conventional power supply apparatus shown in FIG. 63, which is disclosed, for example, in the specification of U.S. Pat. No. 4,306,135. In this drawing, 49 indicates a fixed current limiting resistor, 50 denotes a semiconductor amplifier such as an FET, 51 designates a switching device for switching the semiconductor amplifier 50 on/off to turn a discharge pulse on/off, 52 represents a digital signal which specifies the current waveform shape of the discharge pulse, 53 denotes a digital-to-analog converter which converts said digital signal into an analog signal, 54 indicates an amplifier for driving the amplifier 50, and 55 represents a limiting resistor for the amplifier 54.

The operation of this circuit will now be described. For the ON/OFF timing of the discharge pulse, a signal is output from the oscillator 21 to drive the switching device 51. The current supplied to the machining gap between the electrode 1 and the workpiece 2 after the discharge has occurred is determined by the resistance values of the fixed resistor 49 and semiconductor amplifier 50. When, for example, an FET is used as the semiconductor amplifier 50, it can be operated as a variable resistor.

The characteristic of the FET is as indicated in FIG. 64. When VGS is determined optionally, ID is kept constant if VDS varies slightly. Namely, the FET features that the machining current is controlled to be kept constant independently of slight variation of the power supply voltage 5. For this reason, the current during discharge is stable and so-called pulse interruption, i.e., discharge stopping halfway into the pulse, is unlikely to occur, thereby providing extremely stable machining.

Also, changing a signal to the gate G of the FET 50 within a single pulse provides an optional waveform and offers a constant-current characteristic to a command value G, ensuring especially stable machining.

The conventional electrical discharge machining power supply constructed as described above has the following disadvantages.

Namely, since the "Pulse Generator Used the Electrical Erosion Machine Tool" disclosed in Japanese Laid-Open Patent Publication No. SHO62-27928 attempts to essentially control the machining current value within the specified range in switching control, the machining current waveform 47 has a ripple, as shown in FIG. 55. This ripple is generally several amperes in width. Examples of machining current pulses generated under various conditions are shown in FIGS. 56 and 57. FIG. 56 shows a large machining current value setting, i.e., current setting for so-called roughing. In a current waveform 47b of this example, the ripple width (which is approximate to a gap between command values 13 and 14) is small relative to a peak value 13 of the machining current command value and therefore does not cause any particular fault to machining. However, when the command value of the current peak value is reduced, as shown in FIG. 57, the lower limit value 14 of the command value no longer is significant and the waveform originally desired to be rectangular becomes triangular as indicated by 47c. As a result, the pulse cannot be sustained for a desired period of time and becomes intermittent. This waveform is not capable of providing a desired machining result.

Because of the ripple in the current waveform, the current waveform to be controlled by switching control is inappropriate for the control of a microcurrent waveform as in finishing and cannot achieve desired machining.

Also, the "Pulse Generation Circuit Controlled for Formation by Intermittent Electrical Discharges" disclosed in Japanese Laid-Open Utility Model Publication No. SHO57-33949 is designed to solve the disadvantages of the technique disclosed in Japanese Laid-Open Patent Publication No. SHO62-27928 to some extent. Namely, the reactor 22 inserted in the circuit of FIG. 58 keeps the current constant more easily and the ripple width of the current waveform can be considerably smaller than that in the technique of the circuit in FIG. 54. Generally, the insertion of a reactor allows the current to be kept constant more easily but has a disadvantage that rising and falling speeds cannot be provided. In the circuit of FIG. 58, however, the first auxiliary circuit is employed to secure the peak current value in advance, and upon the start of the discharge pulse, the separate second switching device 20 is used to cause the discharge circuit to conduct or not to conduct, thereby improving the rising and falling speeds. However, the auxiliary power supply 28 is required for this purpose.

This auxiliary power supply 28 is likely to be considerably larger in output capacity than the power supply 5 serving as a main power supply because it may be smaller in output voltage but its output current must be substantially equal to the machining current. Namely, another disadvantage of this technique is a difficulty in providing the circuit at low cost.

Further, the technique disclosed in Japanese Laid-Open Utility Model Publication No. SHO57-33949 has a disadvantage that, unlike the technique disclosed in Japanese Laid-Open Patent Publication No. SHO62-27928, it is difficult to provide an optional discharge pulse waveform concurrently with the control of the rising and falling speeds thereof and only the rectangular wave as shown in FIG. 59 may be offered.

Also, the technique disclosed in the "Control Method for the Electrical Discharge Machining Power Supply" in Japanese Laid-Open Patent Publication No. HEI2-34732 is built to solve the disadvantages in the techniques disclosed in Japanese Laid-Open Patent Publication No. SHO62-27928 and Japanese Laid-Open Utility Model Publication No. SHO57-33949.

The technique disclosed in Japanese Laid-Open Patent Publication No. HEI2-34732 employs the constant-voltage power supply and the resistor inserted therein to control the machining current value, without the discharge machining current being controlled by switching control. Hence, the discharge current waveform provided has almost no current ripple as shown in FIG. 61 and switching on/off the resistors 33*a* to *d* in the circuit at high speed allows the rising speed as indicated by 48 and the current waveform shape to be set optionally as shown in FIG. 62.

However, the disadvantage of this technique is that the current is not controlled directly but is controlled according to the resistance value which limits the current, whereby the discharge current value varies according to the output voltage of the power supply 5. In other words, if a given current value has been set, the same machining status cannot be provided when the power supply voltage varies.

Further, it is known that the discharge gap between the electrode 1 and the workpiece 2 physically acts as a constant-voltage load of approximately 25 V. For this reason, the difference voltage between the output voltage of the power supply 5 and the 25 V voltage drop of the discharge gap is mostly applied to the current limiting resistors 33 and is consumed as thermal energy. Namely, as the power supply of the electrical discharge machine, this technique cannot avoid a reduction in power supply efficiency as compared to the techniques disclosed in Japanese Laid-Open Patent Publication No. SHO62-27928 and Japanese Laid-Open Utility Model Publication No. SHO57-33949. This hinders the downsizing of the power supply apparatus and also makes it difficult to implement the same functions at low costs. As described above, the apparatus in information 3 had the disadvantages that the machining current is not kept constant easily, that the power supply efficiency is poor, and that this poor power supply efficiency resulted in large size and high price of the apparatus.

Further, in the specification of U.S. Pat. No. 4,306,135, some disadvantages of the technique disclosed in Japanese Laid-Open Patent Publication No. HEI2-34732 have been solved.

Namely, the technique disclosed in the specification of U.S. Pat. No. 4,306,135 uses a semiconductor amplifier instead of the plurality of current limiting resistors in the technique disclosed in Japanese Laid-Open Patent Publication No. HEI2-34732. Since the FET is employed as the semiconductor amplifier in this conventional art, the constant-current characteristic as shown in FIG. 64 is provided. That is, a constant current can be maintained and controlled relative to the variation in output voltage the power supply 5, and besides, the constant-current control can also be exercised during the continuation of the discharge pulse, whereby extremely stable machining can be achieved. In the sense that the in-pulse current can be rendered constant, more stable machining can be attained as compared to the switching power supplies in the techniques as disclosed in Japanese Laid-Open Patent Publication No. SHO62-27928 and Japanese Laid-Open Utility Model Publication No. SHO57-33949. Further, since the resistance value at the time of discharge start is extremely small as compared to Japanese Laid-Open Patent Publication No. HEI2-34732, the discharge current can be raised faster.

However, the difference voltage between the output voltage of the power supply 5 and the machining gap voltage is all applied to the semiconductor amplifier 50. Namely, the thermal energy to be consumed by the semiconductor amplifier 50 is large. As compared to ordinary electrical parts, the semiconductor is easily affected particularly by heat and has importance in heat-dissipation design. However, the technique disclosed in the specification of U.S. Pat. No. 4,306,135 generates much heat because it not only uses the semiconductor as the switching device but also employs it as the variable resistor in an active range, i.e., this technique does not allow a large current to flow and it is very difficult to design a circuit which can achieve electrical discharge roughing requiring the current peak value of tens of amperes or higher.

Namely, the technique disclosed in the specification of U.S. Pat. No. 4,306,135 has a disadvantage that a large current adequate for roughing cannot be controlled.

It is accordingly an object of the present invention to overcome these disadvantages by providing a power supply of an electrical discharge machine which has a small ripple in a machining current pulse, allows a microcurrent to be formed easily in finishing, and allows a power supply apparatus to be small in size and low in costs because of its extremely high power supply efficiency.

SUMMARY OF THE INVENTION

The method of controlling the power supply for the electrical discharge machine concerned with the invention switches on/off the switching devices in an optional cycle under the control of the current command value signal corresponding to the waveform shape of the current pulse to be supplied to the machining gap, whereby an optional shape of current pulse is supplied to the machining gap and the current component for compensating for the ripple component generated by said switching at the supply time of said current is superimposed on said optional shape of current and supplied to the machining gap.

The second machining circuit concerned with the invention superimposes the current equivalent to the difference between the current command value signal and the current from the first machining circuit, i.e., the so-called current component for compensating for the ripple component generated by the switching of the first machining circuit, on the current from the first machining circuit and supplies the resultant current to the machining gap.

The first direct-current source concerned with the invention supplies the machining gap with the current based on the signal obtained by subtracting the predetermined value from the current command value signal and the second direct-current source superimposes the current corresponding to the difference between the current command value signal and the current from the first direct-current source on the current from the first direct-current source and supplies the resultant current to the machining gap.

The first direct-current source concerned with the invention supplies the machining gap with the current based on the current command value signal, and the second current source superimposes the current equivalent to the positive difference between the current value from the first direct-current source and the current command value signal on the current from the first direct-current source and supplies the resultant current to the machining gap, and further the third current source superimposes the current equivalent to the negative difference between the current value from the first direct-current source and the current command value signal on the current from the first direct-current source and supplies the resultant current to the machining gap.

The power supply control technique concerned with the invention sets the output current level and output current ripple of the constant current supply section, defines the addition result of said set output current level and output current ripple as the output current command signal of the constant current supply section, compares said output current command signal with the output current of the constant current supply section, and controls the switching device of the constant current supply section according to the result of this comparison.

The power supply apparatus concerned with the invention includes the ripple current setting means which has the modulating means for modulating the set signal frequency of the ripple current set value according to the set value of the output current level setting means to reduce the set signal frequency of the ripple current set value when the set level of the output current level setting means is high and to increase the set signal frequency of the ripple current set value when the set level of the output current level setting means is low.

The power supply apparatus concerned with the invention sets the output current level and output current ripple of the constant current supply section, defines the addition result of said set output current level and output current ripple as the output current command signal of the constant current supply section, compares said output current command signal with the output current of the constant current supply section, and controls the switching device of the constant current supply section according to the result of this comparison. The gate means eliminates noise resulting from the on/off of the first switching device in the constant current supply section.

The power supply apparatus concerned with the invention sets the output current levels of the constant current supply sections, the first output current ripple and the second output current ripple 180 degrees out of phase with said first output current ripple, defines the addition result of said set output current level and first output current ripple as the first output current command signal of the first constant current supply section, defines the addition result of said set output current level and second output current ripple as the second output current command signal of the second constant current supply section, compares said first output current command signal with the output current of the first constant current supply section and controls the switching device of the first constant current supply section according to the result of this comparison, and compares said second output current command signal with the output current of the second constant current supply section and controls the switching device of the second constant current supply section according to the result of this comparison.

The power supply apparatus concerned with the invention sets the output current level and output current ripple of the constant current supply section, defines the addition result of said set output current level and output current ripple as the output current command signal of the constant current supply section, compares the output current command signal with the output current of the constant current supply section, and outputs the signal which switches off the first switching device of the constant current supply section according to the result of this comparison, and further the timer means outputs the signal which switches on the first switching device of the constant current supply section when the predetermined length of time elapses after the comparing means has output the signal which switches off the first switching device of the constant current supply section.

The power supply control method concerned with the invention causes the current which suppresses the reduction of the output current occurring at the off time of said first switching device when the current is supplied to be added to hold the current from being reduced abruptly, thereby reducing ripples.

The series connection of the second direct-current power supply having the voltage equal to or slightly lower than the electrical discharge voltage, the third switching device and the diode in the power supply apparatus concerned with the invention causes the current which suppresses the reduction of the output current occurring at the off time of said first switching device when the current is supplied to be added to hold the current from being reduced abruptly, thereby reducing ripples.

In the power supply apparatus concerned with the invention, the output current increases/decreases between the current command value and the overcurrent command value if an excess current flows due to a short circuit or the like across the electrode and the workpiece, thereby preventing a short-circuit current from flowing.

The power supply control method concerned with the invention holds the current from rising suddenly when the output current is controlled at a given current level, thereby reducing ripples.

The series connection of the third direct-current power supply having the voltage capable of supplying the machining gap with the voltage higher than the electrical discharge voltage and lower than the voltage supplied by said first direct-current power supply, the fourth switching device and the diode in the power supply apparatus concerned with the invention holds the current from rising abruptly when the output current is controlled at a given current level, thereby reducing ripples.

The power supply apparatus concerned with the invention uses the first switching device and the fourth switching device to control the output current and, after the output current has reached the given value, uses the fourth switching device to control the output current, thereby exercising current control with a few ripples.

The series connection of the fourth direct-current power supply having the voltage meeting the slant of the leading edge of the current in the power supply apparatus concerned with the invention reduces ripples when the output current is increased, thereby providing the desired leading edge of the current.

The power supply apparatus concerned with the invention works to eliminate the ripples of the current from when the electrical discharge occurs until when the current reaches the command value.

The series connection of the fifth direct-current power supply having the voltage capable of supplying the machining gap with the voltage higher than the voltage supplied by said first direct-current power supply and the sixth switching device in the power supply apparatus concerned with the invention works to generate the electrical discharge reliably.

The power supply apparatus concerned with the invention switches on the sixth switching device under the control of the high-voltage pulse signal when the electrical discharge has delayed, thereby generating the electrical discharge reliably.

The power supply apparatus concerned with any of the several embodiments of the invention can use low-voltage power supplies as its direct-current power supplies such as the first direct-current power supply, the fourth direct-current power supply, etc., thereby allowing the power supplies to be employed efficiently.

BRIEF DESCRIPTION OF THE DRAWINGS

FIGS. 4(a)–(e) are operation timing charts illustrating the operation of the circuit in the first embodiment.

FIG. 12 is a triangular-wave current waveform diagram in the fourth embodiment.

FIG. 13 is a triangular-wave current waveform diagram in the fourth embodiment.

FIGS. 21(a)–(e) are waveform diagrams and timing charts used to describe the operation of the eighth embodiment.

FIGS. 22(a)–(c) are waveform diagrams used to describe the modification of the eighth embodiment.

FIGS. 27(a)–(g) are waveform diagrams and timing charts used to describe the operation of the tenth embodiment.

FIGS. 29(a)–(d) are waveform diagrams used to describe the operation of the eleventh embodiment.

FIG. 31 is a circuit diagram illustrating a twelfth embodiment of the present invention.

DESCRIPTION OF THE PREFERRED EMBODIMENTS

Figure 1:
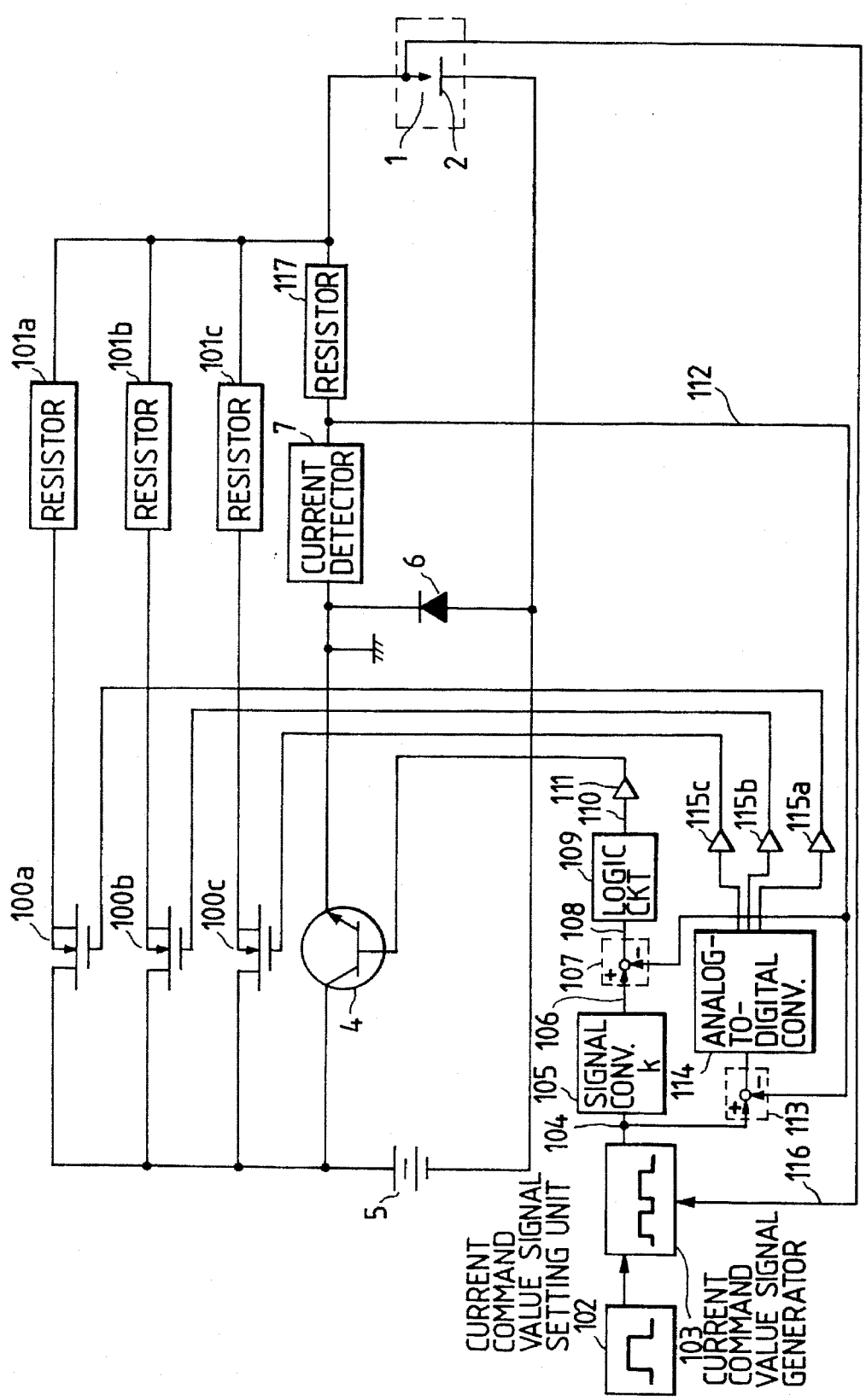
FIG. 1 is a circuit diagram illustrating a first embodiment of the present invention.

A first embodiment of the present invention will now be described in accordance with FIGS. 1 to 5. FIG. 1 is a circuit diagram of a power supply for an electrical discharge machine concerned with the first embodiment of the present invention. In FIG. 1, the numeral 1 indicates an electrode, 2 denotes a workpiece, 4 represents a first switching device, 5 designates a power supply, 6 indicates a diode which causes a residual current to flow, 7 designates a current detector, 100a to 100c denote second switching devices, 101a to 101c represent current limiting resistors having a resistance ratio of the power of two, i.e., one to two to four, respectively, 102 indicates a current command value signal setting unit which is used to set the peak value, duration, stop time, shape, etc., of a current waveform to a current command value signal generator 103, 103 represents a current command value signal generator which generates a current command value signal set by the current command value signal setting unit 102, and 104 denotes an output signal thereof.

105 indicates a signal converter which adds/subtracts a given value to/from the output 104 or multiplies the output by a given rate, 106 denotes an output signal thereof, 107 designates a first signal adder/subtractor which operates on a difference between the output signal 106 and the present value of a detection signal 112 detected by the current detector 7, 108 represents an output signal thereof, 109 indicates a logic circuit which outputs a logic signal for switching on/off the first switching device 4 under the control of the output signal 108, 110 indicates an output signal thereof, and 111 denotes an amplifier for driving the first switching device 4 under the control of the output signal 110.

112 designates a detection signal which represents the present value of a current provided by the current detector 7, 113 represents a second signal adder/subtractor which operates on a difference between a command value from the current command value signal generator 103 and the present value of the detection signal 112 from the current detector 7, 114 indicates an analog-to-digital converter which converts the output of the second signal adder/subtractor 113 into a digital signal, 115a to 115c designate amplifiers which amplify each bit of the digital signal of the analog-to-digital converter 114 to drive the switching devices 100a to 100c, 116 represents a machining gap voltage signal for detecting a discharge start, and 117 denotes a resistor.

In the present embodiment, the power supply 5, the first switching device 4, the current detector 7, the resistor 117 and the machining gap are connected in series to constitute a first machining circuit. Also, a plurality of series connections of the current limiting resistors 101a to 101c and the second switching devices 100a to 100c constitute a second machining circuit, which is connected in parallel with the first machining circuit to supply the machining gap with a current superimposed on a current from the first machining circuit. Further, the logic circuit 109 and the amplifier 111 constitute a first control circuit and the analog-to-digital converter 114 and the amplifiers 115a to 115c constitute a second control circuit.

The operation of this circuit will now be described with reference to FIGS. 2(a)–(d) to 5. First, before the start of machining, a worker who operates the electrical discharge machine sets the shape, duration, stop time, etc., of a current waveform from the setting unit 102 to the current command value signal generator 103. These values may be given by a program from an NC control apparatus or the like. The current command value signal generator 103 creates signals required for the power supply apparatus in actual machining, e.g., timing of applying a voltage to the machining gap, under the conditions of the setting unit 102. In other words, the current command value signal generator 103 generates a current command value signal which specifies operations, e.g., the machining current waveform is output when a discharge is started after the voltage has been applied to the machining gap and the voltage is applied again when a predetermined period of stop time has elapsed after the machining current waveform has ended.

The signal 104 output from the current command value signal generator 103 is converted into the output signal 106 by the signal converter 105. This output signal 106 is converted so as to be equivalent in level to the output signal 104 or is slightly smaller in signal level. A difference between this output signal 106 and the signal 112 detected by the current detector 7 (current flowing in the first machining circuit) is then operated on by the first signal adder 107 and serves as the output signal 108.

This output signal 108 is further sent to the logic circuit 109. This logic circuit 109 is designed to output the operation timing of the first switching device 4 under the control of the output signal 108, i.e., as the output signal 110, the logic circuit 109 provides output "1" to switch on the first switching device 4 if the current value detected by the current detector 7 is smaller than the command value given by the signal 106, and provides output "0" to switch off the first switching device 4 if the current value detected by the current detector 7 is larger than the command value given by the signal 106. The amplifier 111 drives the first switching device 4 under the control of the output signal 110.

Figure 2A:
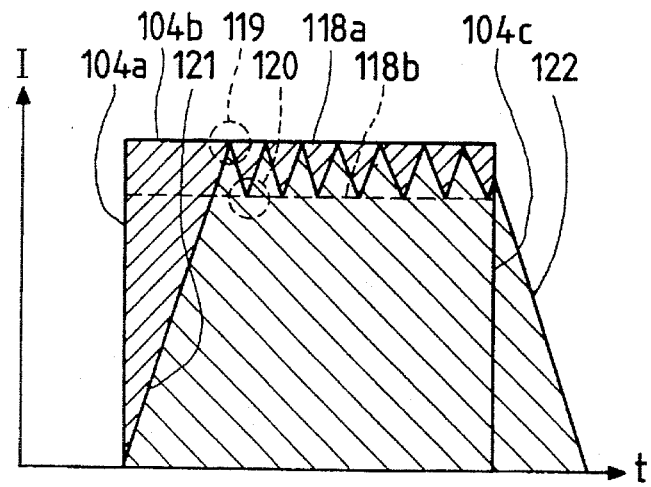
FIGS. 2(a)–(d) constitute current waveform diagrams provided by the first embodiment.

FIG. 2(a) illustrates the above description in the format of an operating current waveform. A shape enclosed by 104a to 104c represents the command value of the current waveform corresponding to the output signal 104 in FIG. 1. Now, assuming that the signal converter 105 does not make signal conversion, the output signal 106 matches the output signal 104. When the first switching device 4 conducts, a discharge is started, the discharge current begins to flow, and the current supplied from the first switching device 4 begins to rise as indicated by 121 in FIG. 2(a).

A preset upper threshold value 118a exists in the logic circuit 109, whose output shifts from "1" to "0" in order to switch off the first switching device 4 (timing 119 in FIG. 2(a)) when the difference signal 108 is switched to "0" and whose output shifts from "0" to "1" to switch on the first switching device 4 (timing 120 in FIG. 2(a)) when the difference signal 108 reaches a lower threshold value 118b. Namely, the current caused to flow by the first switching device 4 goes up and down between 118a and 118b in FIG. 2(a). A difference between 118a and 118b defines a threshold range. When the pulse duration ends, the current falls toward zero as indicated by 122. As described above, the current waveform supplied by the first switching device 4 is corrugated as indicated by 121, 119, 120, 122, etc., in FIG. 2(a). Namely, this is a current ripple.

In order to compensate for this current ripple component so that it is almost restored to the original output signal 104, i.e., the current waveform command value, the present embodiment is provided with, in addition to the first machining circuit comprising the first switching device 4, etc., the second machining circuit which consists of the series connections of the second switching devices 100a to 100c and the resistors 101a to 101c, in parallel with said first machining circuit.

A difference between the output signal 104 acting as the current command value and the detection signal 112 acting as the present current value due to the current ripple or a delay in the rise of the current from the first switching device 4 is detected by the second adder/subtractor 113 and transmitted to the analog-to-digital converter 114. Namely, the difference is converted into a digital signal by the analog-to-digital converter 114. In the present embodiment, the resistors 101a to 101c are designed to have a ratio of 1:2:4. Hence, the current values flowing in the resistors 101a to 101c are 4:2:1, respectively. Since the resistance values of the resistors 101a to 101c are designed to be the power of two as described above, eight different current values can be set according to the combination of the three outputs of the analog-to-digital converter 114, i.e., the logic signals sent to the second switching devices 100a to 100c. By changing this combination, the current equivalent to the difference between the current command value and the present current value is supplied by the resistors 101a to 101c.

FIGS. 4(a)–(e) show the operation timings of the above, wherein FIG. 4(a) shows the voltage waveform of the machining gap, FIG. 4(b) shows the current waveform of the machining gap, and a hatched area 129 is compensated for by the current supplied by the second machining circuit. FIG. 4(c) shows the operation timing of the first switching device 4 and FIG. 4(d) shows the operation timings of the second switching devices 100a to 100c. FIG. 4(e) shows the ON/OFF table of the second switching devices 100a to 100c which are switched on/off under the control of the signals output by the logic circuits 115a to 115c, wherein "1" indicates that the switching device is on and "0" indicates that the switching device is off.

First, in a state in which the voltage is applied to the machining gap before the start of the discharge, the first switching device 4 and the second switching devices 100a to 100c are all on.

When the discharge start is detected at 124 shown in FIG. 4(a), the current waveform begins to rise as shown in FIG. 4(b). At the same time, the current relying on the resistors 101a to 101c reduces. Hence, the second switching devices 100a to 100c are switched on/off as appropriate (so that the current component equivalent to the difference between the current command value and the present current value due to the delay in the rise of the current from the first switching device 4 is compensated for), for example, as shown in FIG. 4(e) to reduce the current supplied from the resistors 101a to 101c. When the current value has almost reached the command value, the current from the first switching device 4 exceeds the upper threshold value 118a, whereby the first switching device 4 is switched off (timing 131 in FIG. 4(c)). Then, the current from the first switching device 4 begins to fall toward the lower threshold value 118b.

The ripple generated here is detected by the second adder/subtractor 113 in FIG. 1 and the second switching devices 100a to 100c are selectively switched on through the analog-to-digital converter 114, causing the resistors 101a to 101c to supply the current which compensates for the current ripple. Although FIG. 4(d) shows an example that only the switching device 100a is switched on/off to compensate for the ripple, it is a matter of course that the other resistors are also selected when the ripple is much larger. If a second switching device and a resistor, i.e., the resistor having a ratio of the resistance value equivalent to 0.5 to 101a to 101c, are provided to make a smaller current compensation, current compensation is performed by a plurality of switching devices and the ripple is further reduced.

Figure 2B:
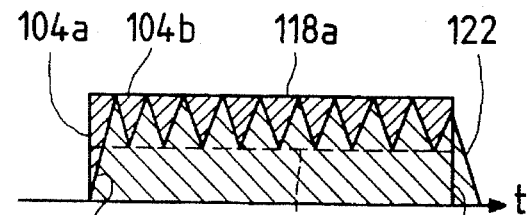
Figure 2C:
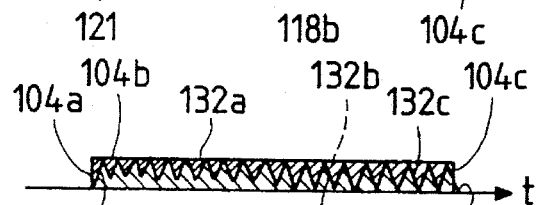
Figure 2D:
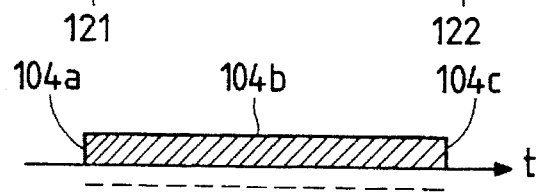

Current waveforms for small current set values are shogun in FIGS. 2(b) to 2(d). While the current set value is small in FIG. 2(b), the operation is identical to that for a large current value as in FIG. 2(a). FIG. 2(c) shows that the current set value is further smaller and is below a switching threshold value range. The switching threshold values are indicated by 132a and 132b. If the lower threshold value indicated by 132b has been set to have been decremented by a predetermined value from the current peak value, it may be lower than "0", as shown by the dotted line in FIG. 2(c). In this case, the lower threshold value, which is originally 132b, may be changed to 132c for control. Since the threshold value range is small at this time, the switching frequency of the first switching device 4 is higher as compared to those in FIGS. 2(a) and (b).

When the switching frequency rises, loss due to switching increases in the case of the semiconductor amplifier. Hence, more reliable circuit operation can be performed by making the setting as shown in FIG. 2(d) than by decreasing the threshold value range at random to raise the switching frequency. That is, in the small current setting of less than the switching threshold value range, the first switching device 4 is kept off and the current is supplied only from the second machining circuit constituted by the series connections of the second switching devices 100a to 100c and the resistors 101a to 101c. Since the current set value is small at this time, the reduction of power supply efficiency resulting from not using the power supply switching control does not pose a great problem.

Figure 3:
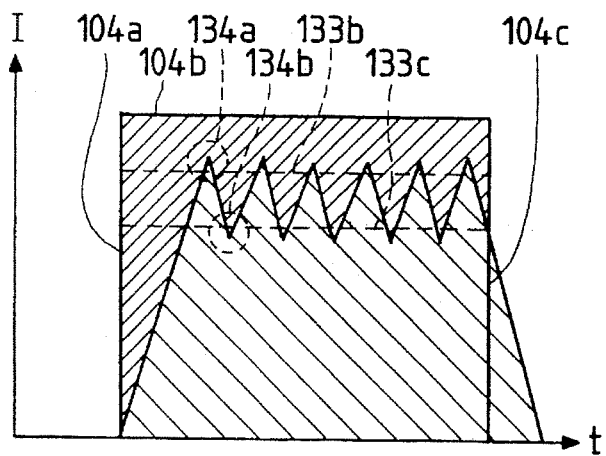
FIG. 3 is a current waveform diagram provided by the first embodiment.

There is another problem concerning the switching threshold value setting. FIG. 3 shows that an upper switching threshold value 133b is smaller than a set current peak value 134a. The present embodiment has been described on the assumption that both are set to the same value. Namely, the coefficient of the signal converter 105 in FIG. 1 is "1" and no conversion is made.

When the upper threshold value of switching is matched with the peak value of the current command value, a time delay occurs until the current begins to fall because the switching is actually carried out after the current has exceeded the upper threshold value. In short, the switching current above the upper threshold value flows. While the shortage of the switching current below the current command value at 134b is compensated for by the second machining circuit constituted by the series connections of the second switching devices 100a to 100c and the resistors 101a to 101c, the excess thereof cannot be compensated for.

Therefore, there is a method wherein the upper threshold value is made lower than the peak value of the current command value by taking the overshoot of the current value due to the switching delay into consideration. In FIG. 3, the current value at 134*a* is higher than the upper threshold value 133*b*. However, if the upper threshold value 133*b* set is slightly smaller than the peak value 104*b* of the current command, the overall current value does not exceed the current command value.

Figure 5:
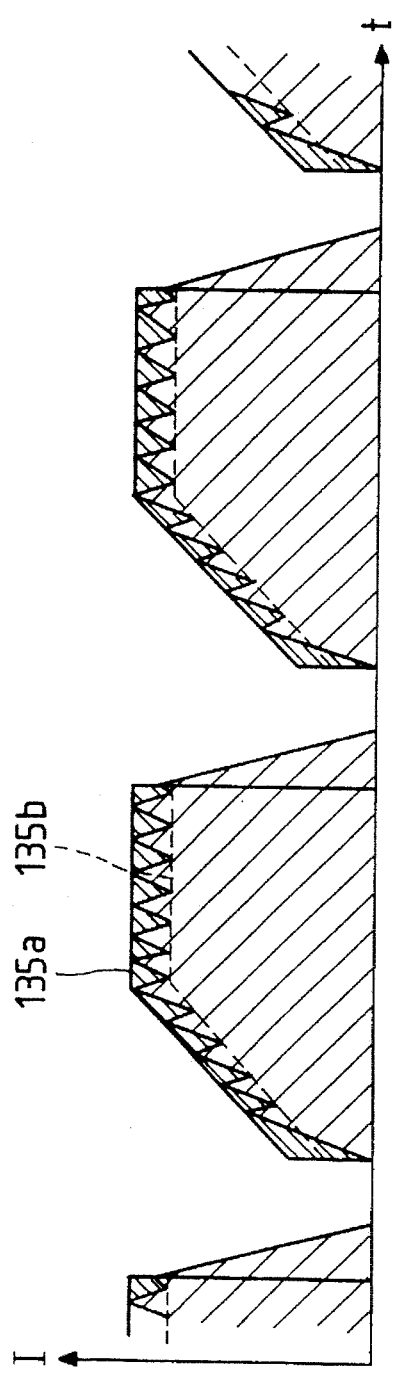
FIG. 5 is a current waveform diagram provided by the first embodiment.

While the rectangular wave has been used in the above description as the current command waveform, the current waveform shape employed in electrical discharge machining is not limited to the rectangular wave. It is known that the use of a kind of triangular current waveform having optional rising speed as shown in FIG. 5 suppresses electrode consumption very well. The present embodiment allows such a current waveform having such optional shape to be created easily. Since the power supply efficiency is high as a matter of course, it is easy to reduce the size and price of the power supply, and in addition, an accurate actual waveform can be provided for a desired waveform. In FIG. 5, switching threshold values 135*a* and 135*b* have been set to meet a desired waveform shape 135*a*. Namely, the upper threshold value 135*a* is matched with the waveform shape and the lower threshold value 135*b* set is a value smaller by a given value than the upper threshold value 135*a*. In this way, the waveform shape other than the rectangular wave can be provided easily.

As described above, the power supply apparatus for the electrical discharge machine concerned with the first embodiment uses the switching type power supply of high power supply efficiency to easily achieve the reduction in size and price of the power supply. Also, the addition of the resistor type circuit for compensating for the current ripple incidental to the switching power supply eliminates the current ripple and accomplishes stable machining even for a small current.

Figure 6:
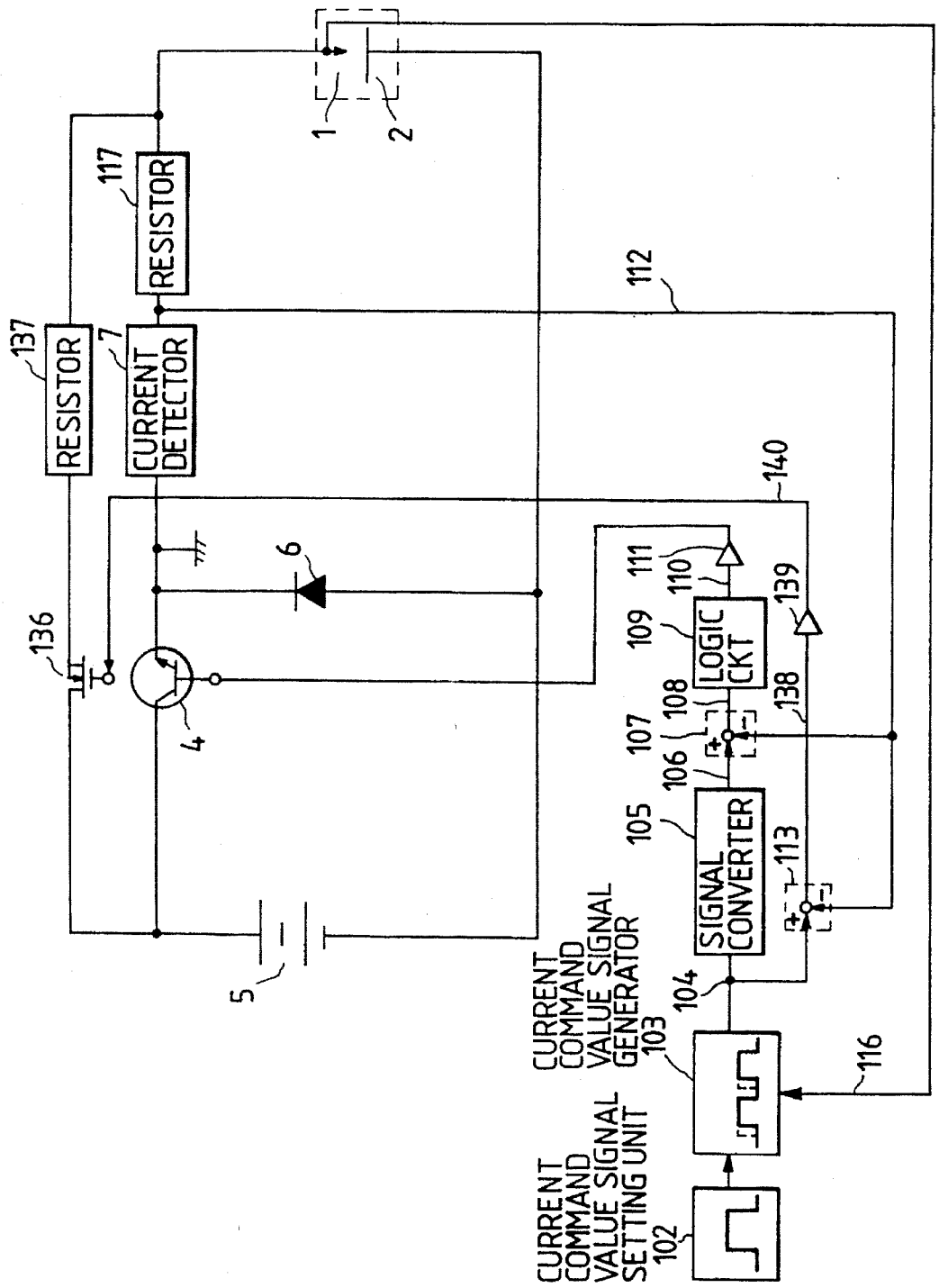
FIG. 6 is a circuit diagram illustrating a second embodiment of the present invention.
Figure 63:
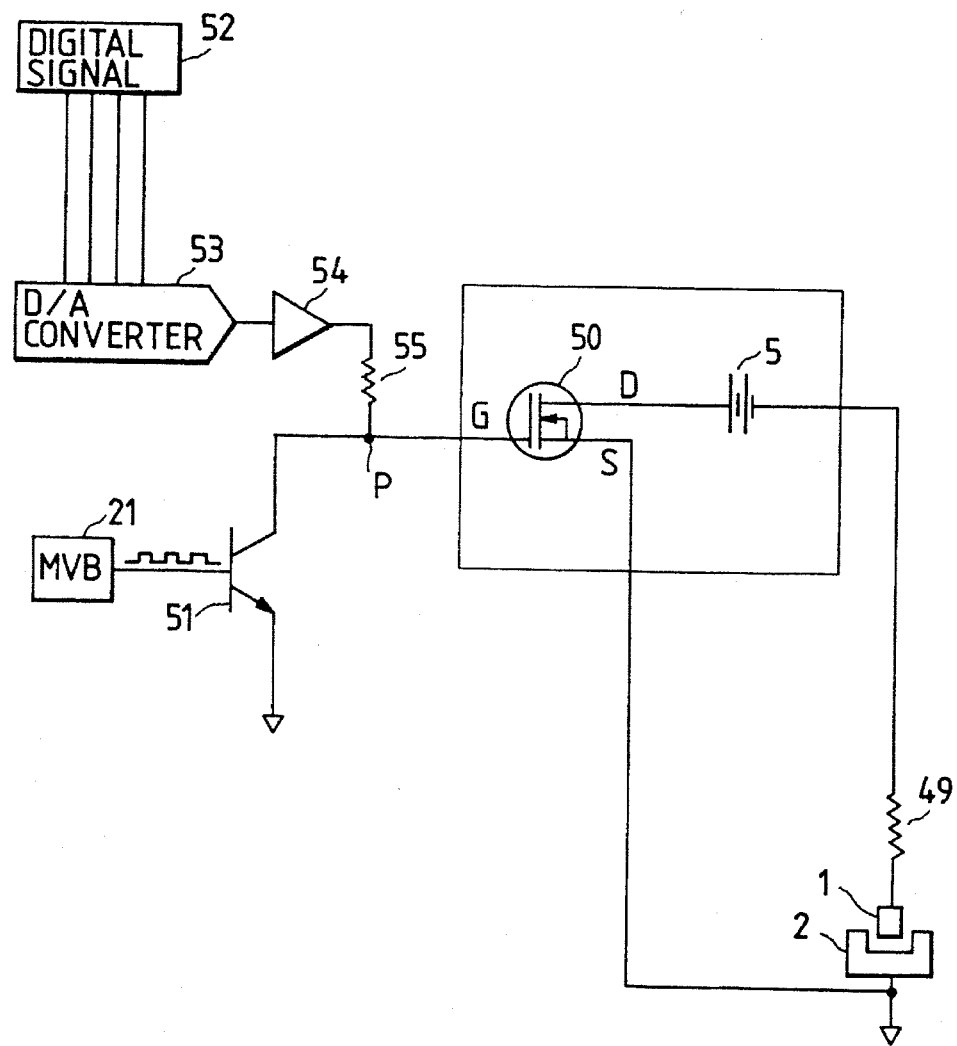
FIG. 63 is a circuit diagram illustrating a fourth conventional art.
Figure 64:
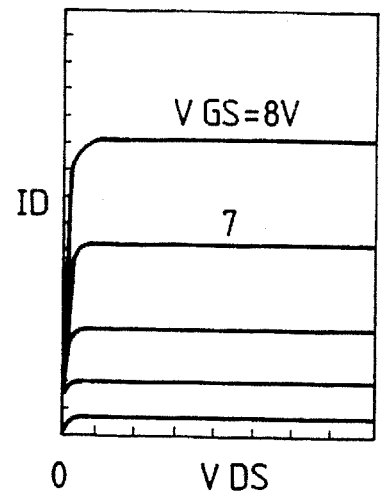
FIG. 64 is a current characteristic diagram of a semiconductor amplifier used in the circuit in FIG. 63.

A second embodiment of the present invention will now be described in accordance with FIG. 6. In this embodiment, the second machining circuit constituted by the plurality of series connections of the second switching devices 100*a* to 100*c* and the resistors 101*a* to 101*c* employed for current compensation in the first embodiment is substituted by a second machining circuit consisting of a series connection of an FET 136 and a resistor 137. As described in connection with FIGS. 63 and 64 which show the conventional art, the FET 136 can be operated as a variable resistor by changing the way of control. Hence, while the second switching devices 100*a* to 100*c* were used only for the purpose of switching in the first embodiment, analog control allows the three second switching devices 100*a* to 100*c* and the three resistors 101*a* to 101*c* shown in the first embodiment to be replaced by one FET 136 and one limit resistor 137 as shown in FIG. 6. The other arrangement is identical to that of the first embodiment.

Since the FET 136 is driven under the control of an analog voltage signal, the analog-to-digital converter 114 required in the first embodiment is not required. After the output signal of the second subtractor 113 is amplified by the amplifier 139, the gate of the FET 136 can be driven directly. Namely, the number of parts can be reduced, and at the same time, current compensation can be made without the analog signal being converted into a digital signal. That is, a so-called current compensation shortage due to a quantization error as shown in FIG. 4 of the first embodiment does not occur. An insufficient current component can be compensated for to the utmost.

Further, in addition to the switching control section comprising the first switching device 4 (first machining circuit), the constant-current characteristic of the FET 136 also allows the compensation circuit (second machining circuit) to provide a constant current. Hence, the current supplied to the machining gap can be made constant, thereby stabilizing machining and ensuring an extremely excellent machining characteristic.

Also, the constant-current characteristic of the FET 136 can increase the current response speed as compared to the method employing the resistors in the first embodiment, thus providing a machining power supply apparatus excellent in both accuracy and ripple relative to the waveform command value.

When the FET 136 is used, the driving timing of the switching device 4 and the relevant upper and lower threshold values are as described in the first embodiment.

Employing the switching type power supply high in power supply efficiency as described above, the power supply apparatus for the electrical discharge machine concerned with the second embodiment can easily reduce the size and price of the power supply. Also, the addition of the semiconductor amplification circuit which will compensate for the current ripple incidental to the switching power supply allows the number of parts to be small, a current ripple to be eliminated, and a stable current to be supplied even in the case of a small current. Also, the current rising speed is extremely high. Therefore, stable machining can be achieved for any current value.

A third embodiment of the present invention will now be described with reference to FIGS. 7 to 9. In this embodiment, a first machining circuit consists of an electrical energy accumulation circuit constituted by connecting in series the power supply 5 and the auxiliary power supply 28 for supplying machining energy and the first switching device 4, the current detector 7, the reactor 22 and the first diode 23 fox intermittently supplying and accumulating electrical energy from the power supply 5, a third switching device 20 connected to supply the machining gap with an output current from the electrical energy accumulation circuit for supplying said output current to the machining gap in a pulse form, and a second diode 6 connected to return to said electrical energy accumulation circuit a residual current generated in the machining gap when the third switching device 20 is switched off.

As in the first embodiment, the plurality of series connections of the current limiting resistors 101*a* to 101*c* and the second switching devices 100*a* to 100*c* constitute a second machining circuit. This second machining circuit is connected in parallel with the first machining circuit to supply the machining gap with a current superimposed on the current from the first machining circuit.

Independently of whether a current flows in the machining gap or not, a current always flows in the electrical energy accumulation circuit and the current is switched on/off by the third switching device 20. Hence, the use of the reactor 22 reduces times concerned with the ON and OFF of the current, i.e., the rising time and falling time of the current in the machining gap. These rising and falling speeds can exceed those of the switching power supply shown in the first and second embodiments, which do not use the reactor 22, thereby further stabilizing machining.

Figure 7:
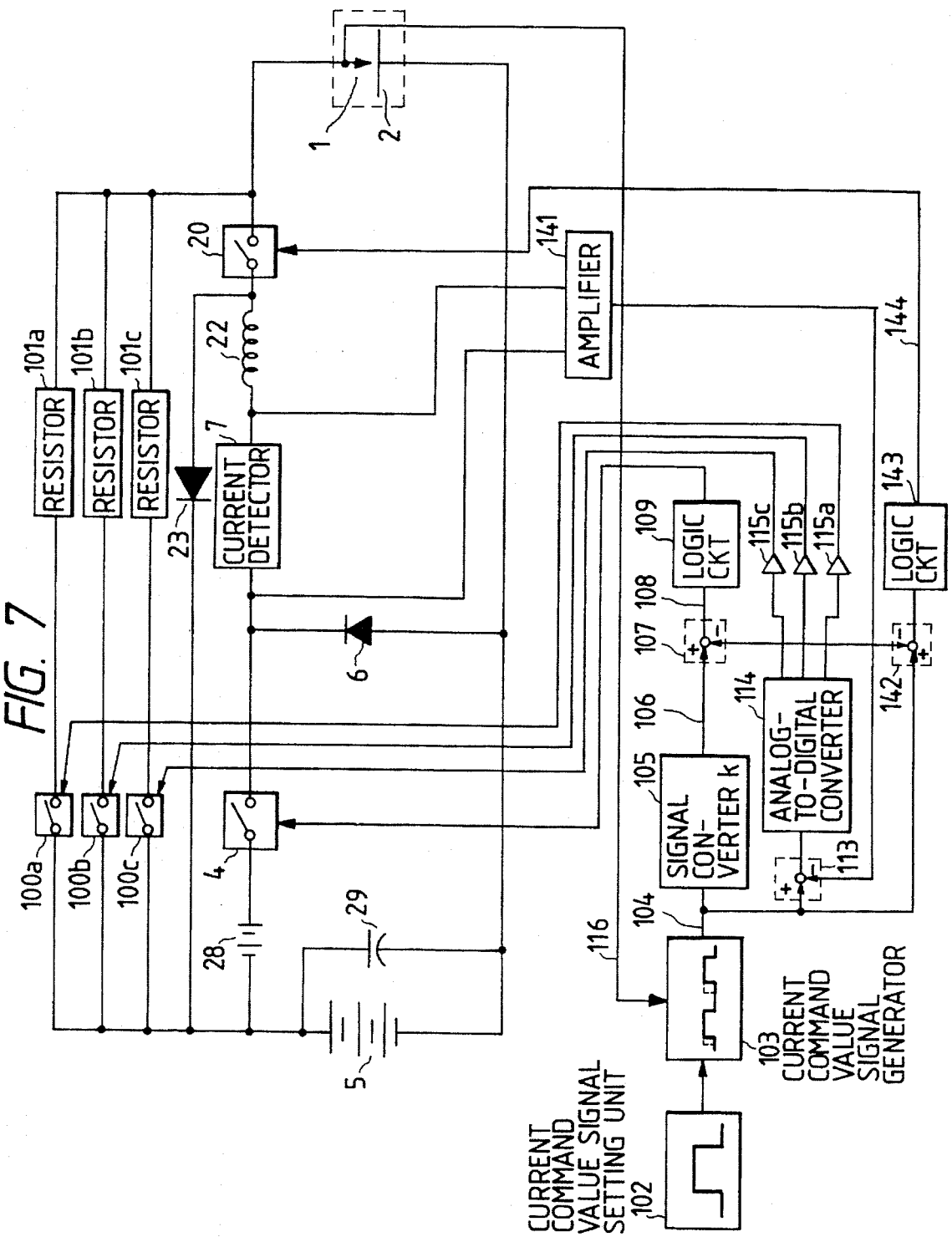
FIG. 7 is a circuit diagram illustrating a third embodiment of the present invention.

In FIG. 7, 29 indicates a capacitor and 141 denotes an amplifier for detecting the present value of the current flowing in the reactor 22. 142 designates a third adder/subtractor which operates on a difference between the current value of the electrical energy accumulation circuit and the current command value 104, and 143 represents a logic circuit which outputs a timing signal for switching the third switching device 20 on/off in response to the output sign of the output signal 104. The other arrangement is identical to that of the first embodiment and will not be described here. Further in FIG. 7, the switching devices 4, 20 and 100a to 100c, which are represented by switch symbols, are written more generally and are totally identical to the switching devices shown previously in FIG. 6.

Figure 8:
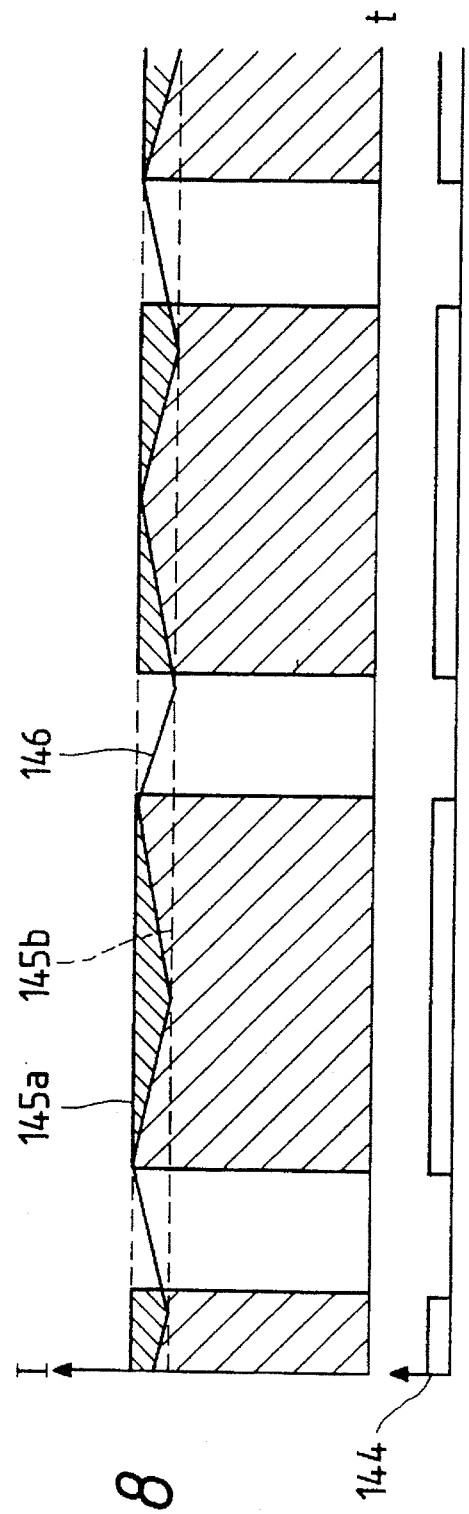
FIG. 8 is a rectangular current waveform diagram in the third embodiment.

FIG. 8 shows a timing relationship between the third switching device 20 and the current waveform when the present embodiment is used to form a rectangular wave. In the present embodiment, upper and lower threshold values 145a, 145b for switching are set also during the stop time to keep a circulating current 146 within a given range. This has an advantage that when a next pulse rises after the stop time, the current waveform can be raised up to the command value at extremely high speed.

Figure 9:
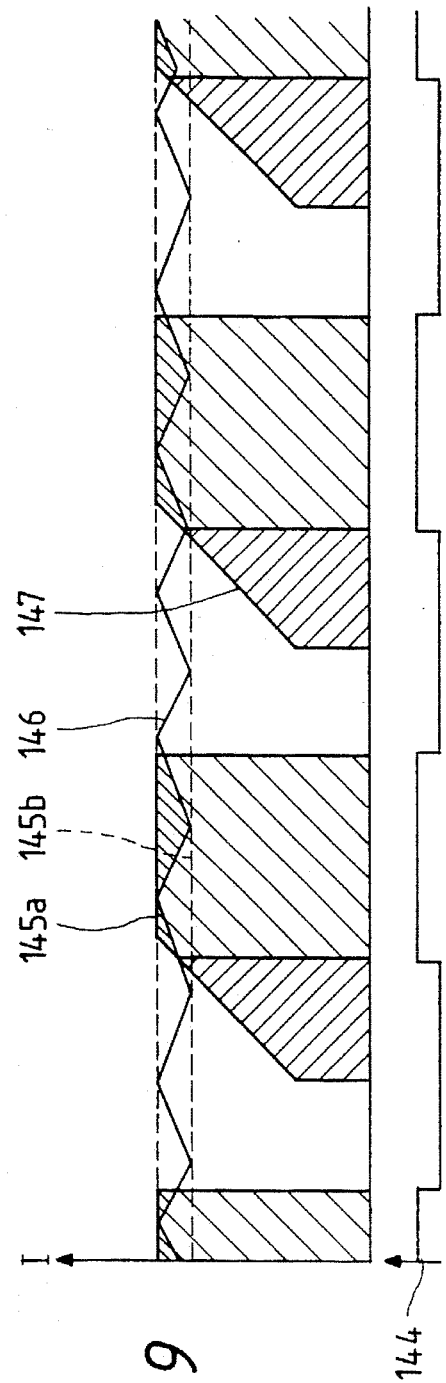
FIG. 9 is a triangular-wave current waveform diagram in the third embodiment.

FIG. 9 is a timing chart of a wave other than a rectangular wave, for example, a kind of triangular wave. To intentionally set the current rise to be slow in this waveform, the circulating current 146 is higher than the current command value in the initial rising stage 147 of the current waveform. Therefore, in the initial stage, the switching device is switched off as indicated by 144 so that the current is not supplied from the circulating circuit to the machining gap. The desired waveform can be provided by supplying the current required for the initial stage of the current waveform from the resistor circuit. This could not be achieved at all only by the conventional switching circuit and circulating circuit systems.

Using the switching type power supply and also having the circuit for circulating the excess current to the power supply as described above, the power supply apparatus for the electrical discharge machine concerned with the third embodiment is extremely high in power supply efficiency and can easily reduce the size and price of the power supply. Also, the addition of the resistor type circuit which will compensate for the current ripple incidental to the switching power supply allows a current ripple to be eliminated and stable machining to be conducted even for a small current. Further, the addition of the circulating circuit ensures accurate control of the machining current pulse width, accomplishing stable and highly reproducible machining.

Figure 10:
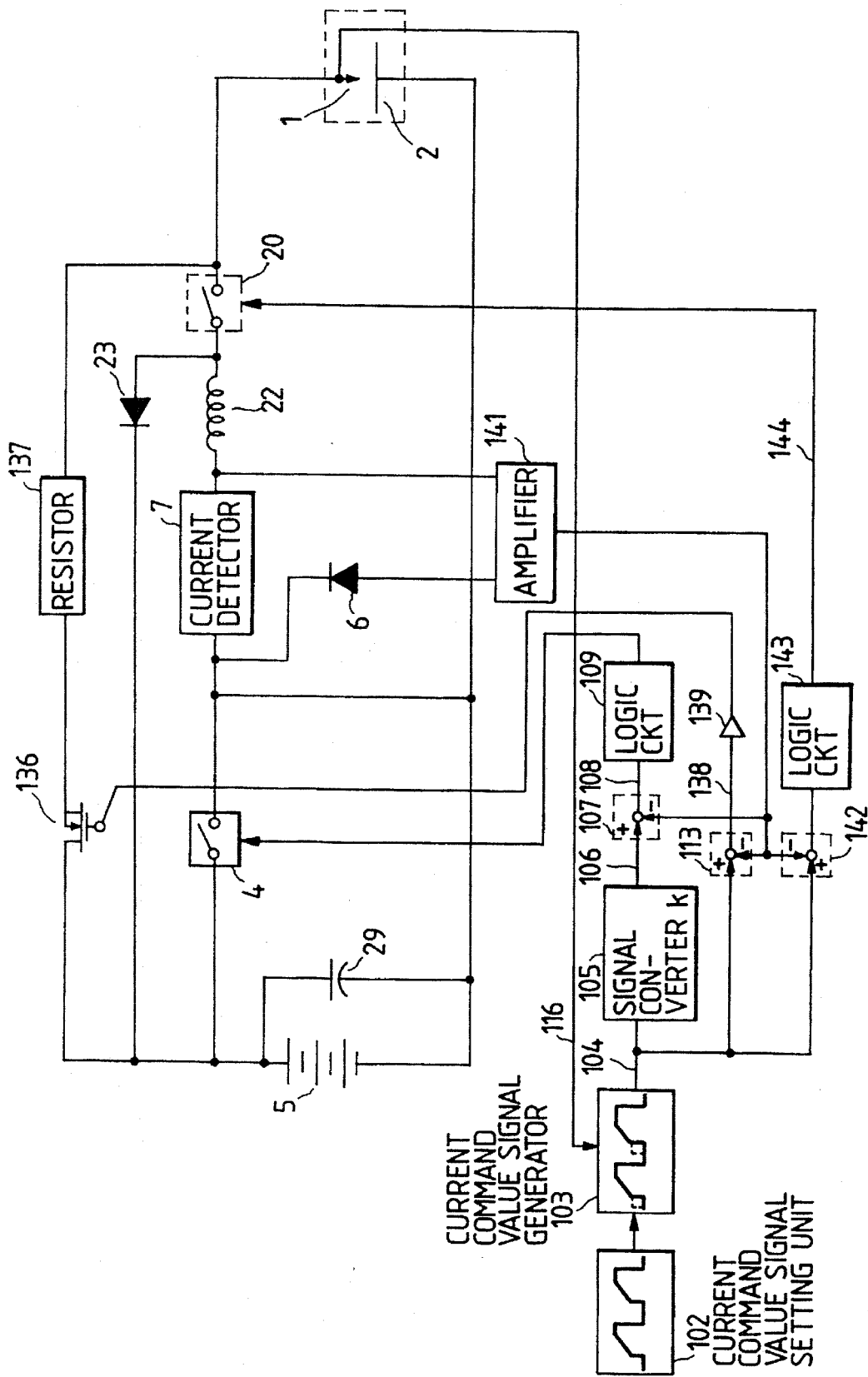
FIG. 10 is a circuit diagram illustrating a fourth embodiment of the present invention.

A fourth embodiment of the present invention will now be described with reference to FIGS. 10 to 13. In FIG. 10, a first machining circuit consists of an electrical energy accumulation circuit constituted by connecting in series the power supply 5 and the auxiliary power supply 28 for supplying machining energy and the first switching device 4, the current detector 7, the reactor 22, the third switching device 20 and the first diode 23 for intermittently supplying and accumulating electrical energy from the power supply 5, and the second diode 6 connected to return to said electrical energy accumulation circuit a residual current generated in the machining gap when the third switching device 20 is switched off. The third switching device 20 is connected to supply the machining gap with an output current from said electrical energy accumulation circuit and supplies said output current to the machining gap in a pulse form.

As in the second embodiment, a series connection of one FET 136 and one resistor 137 constitute a second machining circuit. This second machining circuit is connected in parallel with the first machining circuit to supply the machining gap with a current superimposed on the current from the first machining circuit.

In the embodiment of FIG. 10, the electrical energy accumulation circuit does not have the auxiliary power supply 28 which was required for the third embodiment shown in FIG. 7. However, since the current rise of the FET circuit can be made at sufficiently high speed, circulation need not be done continuously. Rather, with the aid of the high speed operation performed by the FET, the deletion of the circulating auxiliary power supply 28 allows the size and price of the power supply to be further reduced.

Figure 11:
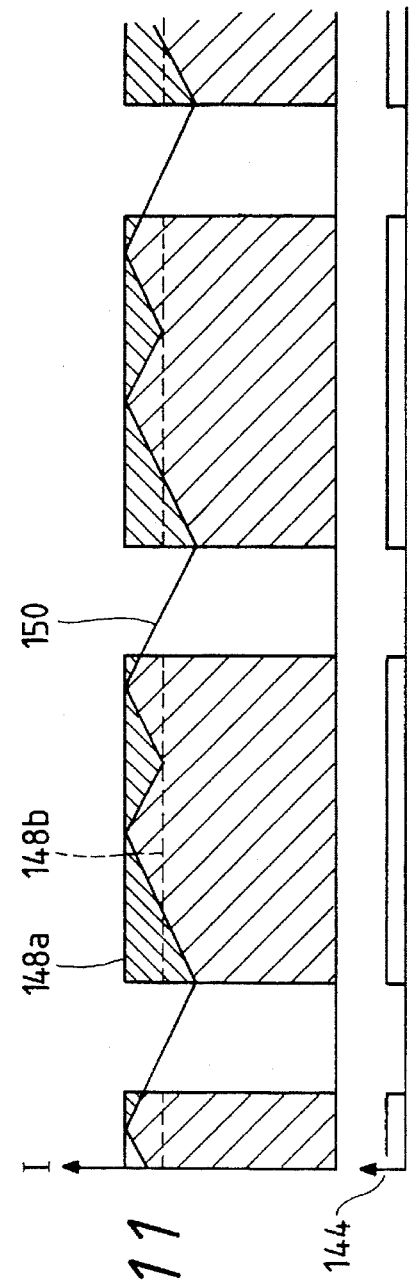
FIG. 11 is a rectangular current waveform diagram in the fourth embodiment.

FIG. 11 shows operation in the circuit of the present embodiment. Though the command current waveform is rectangular, the circulating current value falls gradually as indicated by 150 because the auxiliary power supply 28 for supplying energy during the stop time does not exist. However, the remainder of the circulating current and the high speed operation of the FET provide sufficiently high rising and falling speeds of the current. In FIG. 11, 148a indicates an upper threshold value and 148b denotes a lower threshold value.

FIG. 12 shows operation performed when a kind of triangular wave is given as a current command. While the circulating current falls during the stop time as indicated by 153, a sufficient current is supplied because the rising current value of the next pulse is small. In FIG. 12, 151a designates an upper threshold value and 151b represents a lower threshold value.

FIG. 13 shows that the circulating current is higher than the rising current value of the pulse. In this case, the FET circuit supplies the current until a circulating current value 156 exceeds a current command value 155. While the current supplied by the FET is large, the time is so short that device temperature does not rise so much to pose a problem in the operation of the semiconductor. As shown in FIG. 6 in the second embodiment, since the FET shares the amount of heat with the resistor inserted directly, there is no difficulty in conducting temperature design to prevent the temperature of the FET device from rising. In this case, the heat energy consumed by the FET is minimized in the whole circuit and the circuit arrangement is simplified to permit fast response and supply the current in response to an optional waveform command. Also, the circuit, which itself is designed to be a constant-current circuit, ensures extremely stable machining even when a microcurrent is supplied. In FIG. 13, 154a indicates an upper threshold value and 154b represents a lower threshold value.

Using the switching type power supply and also having the circuit for circulating the excess current to the power supply as described above, the power supply apparatus for the electrical discharge machine concerned with the fourth embodiment is extremely high in power supply efficiency and can easily reduce the size and price of the power supply. Also, the addition of the semiconductor amplification circuit which will compensate for the current ripple incidental to the switching power supply allows a current ripple to be eliminated and stable machining to be done even in the case of a small current. Further, the semiconductor amplification circuit allows the current rising speed to be sufficiently high without the auxiliary power supply being used in the circulation circuit and the number of parts in the circuit to be reduced to arrange the circuit at low costs. Furthermore, the addition of the circulating circuit ensures accurate control of the machining current pulse width, accomplishing stable and highly reproducible machining.

Figure 14:
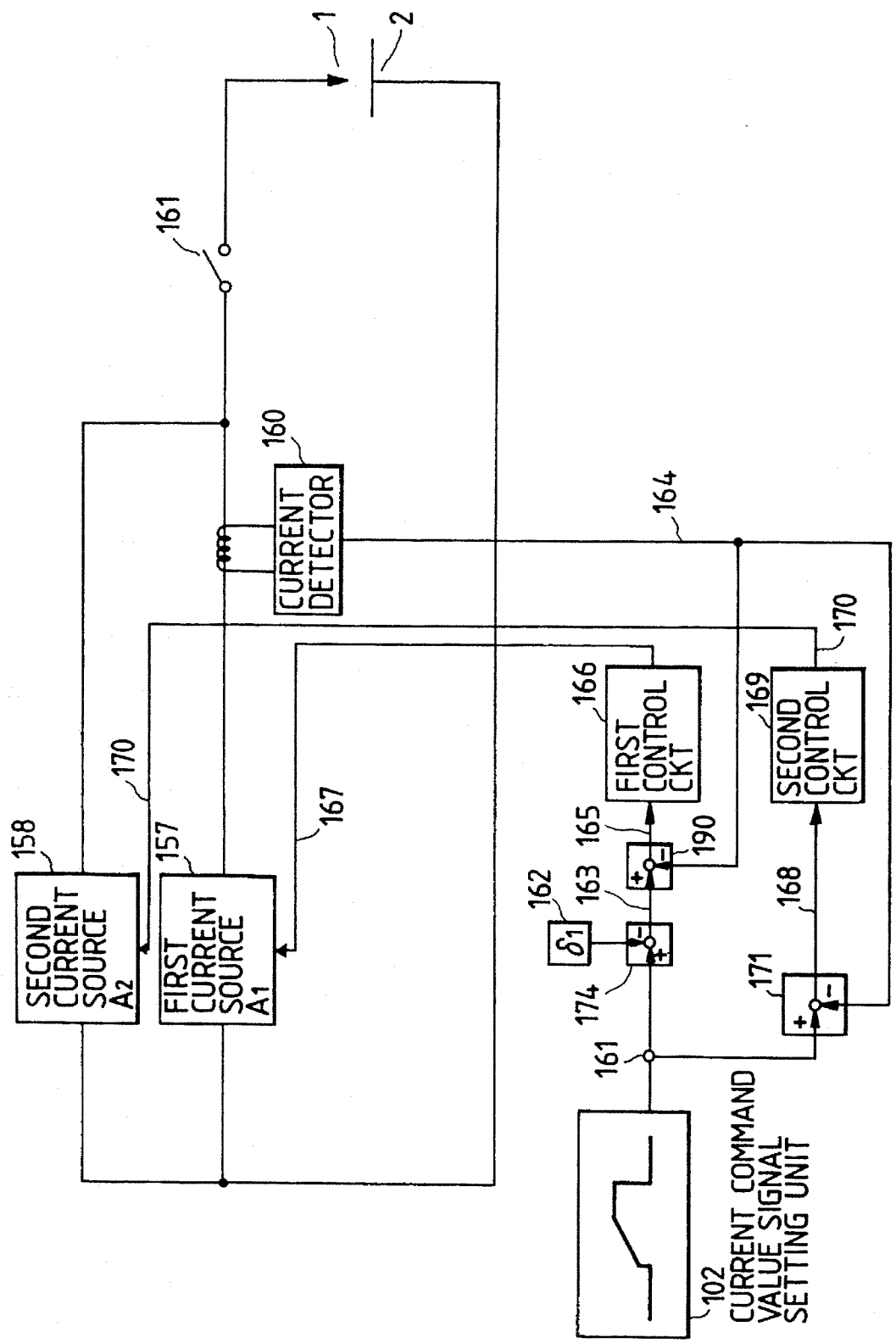
FIG. 14 is a circuit diagram illustrating a fifth embodiment of the present invention.
Figure 17:
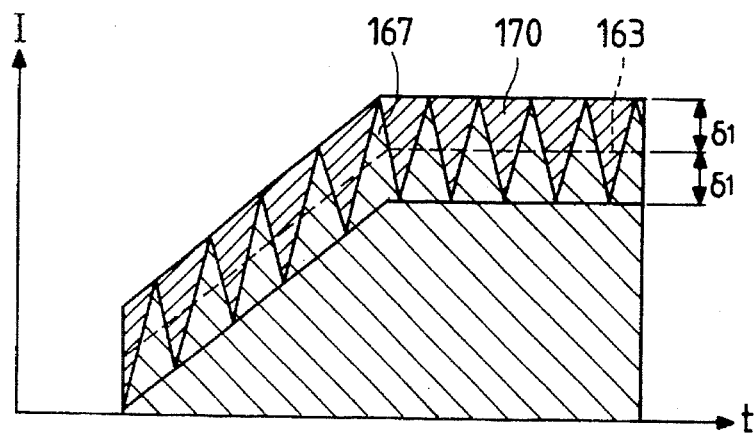
FIG. 17 is a current waveform diagram provided by the fifth embodiment.

A fifth embodiment of the present invention will now be described with reference to FIGS. 14 and 17. In FIG. 14, the machining circuit is constituted by a first current source 157 and a second current source 158. The first current source 157 is higher in power supply efficiency than the second current source 158 and the second current source 158 is higher in response than the first current source 157. To make the best use of the features of the two current sources and to make up for the disadvantages thereof, their currents supplied to the machining gap are superimposed on each other in the present embodiment.

In FIG. 14, 102 indicates a current waveform command value, 161 designates a signal representing it, 162 denotes a setting circuit, 174 represents a subtraction circuit which subtracts the value of δ1 from the command value signal 161 and defines the result of subtraction as a new command value signal 163, 190 indicates a first signal adder/subtractor which operates on a difference between the command value signal 163 and a signal 164 which represents a current detected by the current detector 160 and supplied from the first current source 157 to the machining gap, 165 represents an output signal thereof, 166 denotes a first control circuit which outputs a signal 167 under the control of said signal 165 to control the first current source 157, 171 designates a second signal adder/subtractor which operates on a difference between the command value signal 161 and said signal 164, 168 indicates an output signal thereof, 169 denotes a second control circuit which outputs a signal 170 under the control of said signal 168 to control the second current source 158, and 161 represents a switching device by which the first current source 157 on-off controls the current supplied by the second current source 158 at predetermined timing.

The operation of the present embodiment will now be described with in accordance with FIGS. 14 and 17. Namely, the signal 161 representing the current waveform command value is used as reference and this reference value is divided into two, which are then given to the respective current sources 157, 158 as the command values. At this time, the new command value 163 found by causing the subtraction circuit 174 to subtract the value of δ1 set by the setting circuit 162 from the reference signal 161 is supplied to the first current source 157 as the command value. Further, a difference between the reference current waveform command signal 161 and the current value supplied by the first current source 157, i.e., a component insufficient for the reference current waveform, is supplied as the command value to the second current source 158. This causes the insufficient current value to the machining gap in the first current source 157 to be supplied by the second current source 158 high in response speed, whereby a stable current is supplied to the machining gap to achieve stable machining.

The result of subtracting the value of δ1 from the reference command value by the subtraction circuit 174 was defined as the command value to the first current source 157 to generate the shortage of the current to some extent. If there is no insufficient current to be compensated for by the second current source 158 and the current value of the first current source 157 is higher than the command value of the reference current waveform, compensation cannot be made by the second current source 158 high in response, i.e., the current response to the machining gap is slow, resulting in instable machining.

Figure 15:
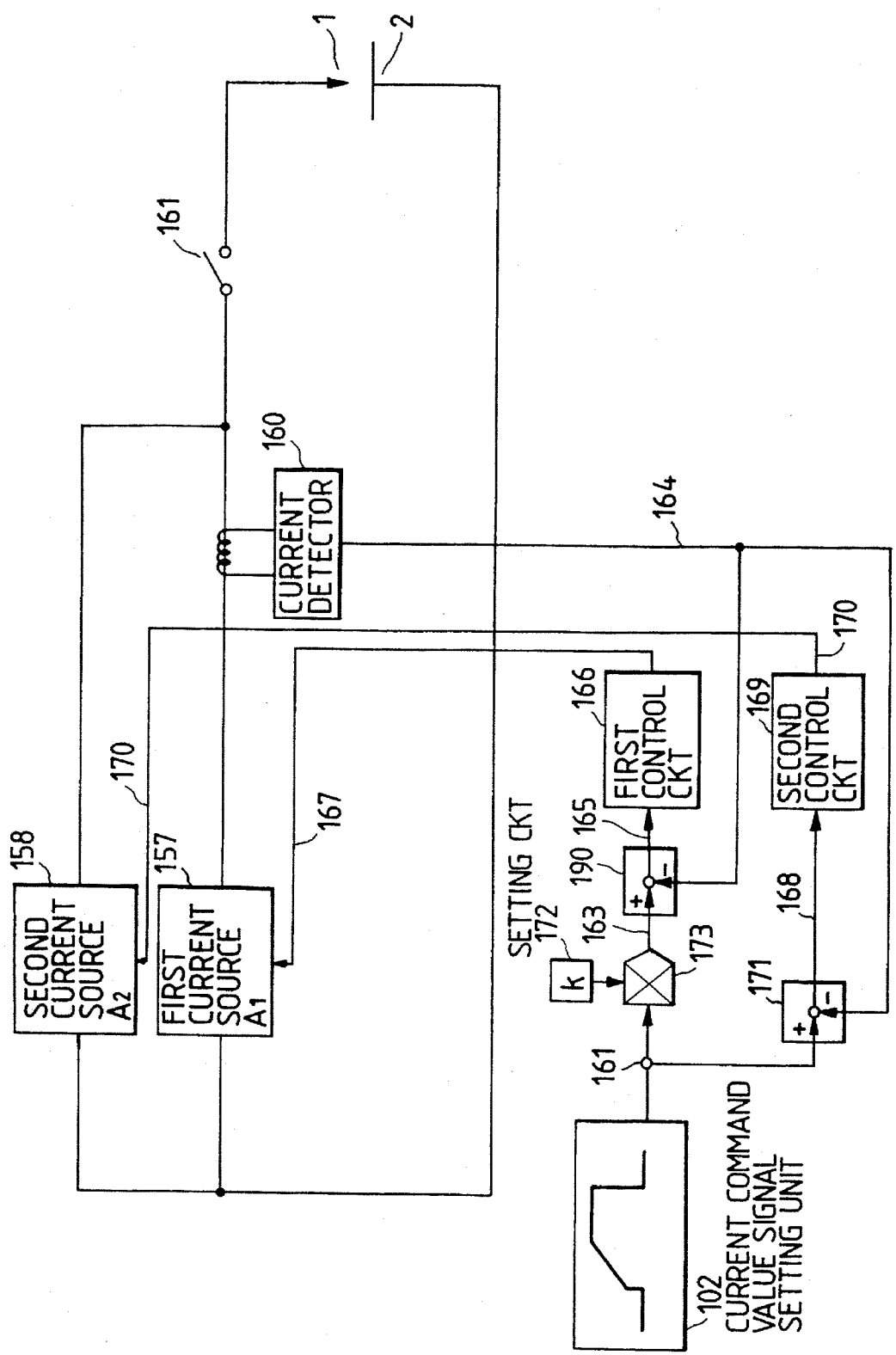
FIG. 15 is a circuit diagram illustrating a sixth embodiment of the present invention.
Figure 18:
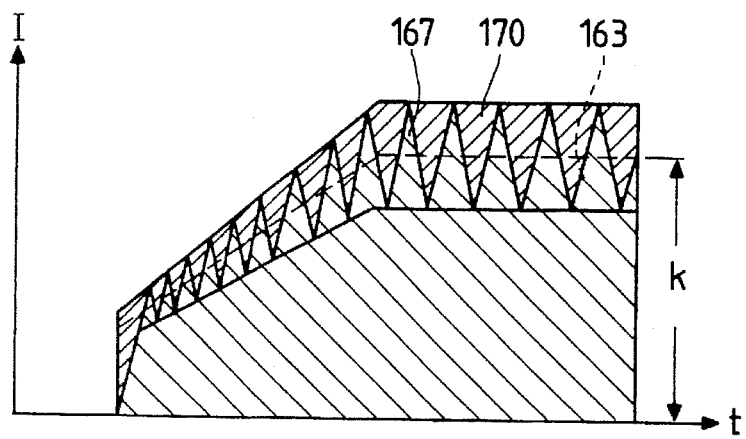
FIG. 18 is a current waveform diagram provided by the sixth embodiment.

A sixth embodiment of the present invention will now be described with reference to FIGS. 15 and 18. In FIG. 15, the machining circuit consists of the first current source 157 and the second current source 158 as in the fifth embodiment. The first current source 157 is higher in power supply efficiency than the second current source 158 and the second current source 158 is higher in response than the first current source 157. To make the best use of the features of the two current sources and to make up for the disadvantages thereof, their currents supplied to the machining gap are superimposed on each other in the present embodiment. In FIG. 15, 172 denotes a setting circuit and 173 represents a multiplication circuit which multiplies the command value signal 161 by a value "k" in excess of "0" and not more than "1" and defines the result of multiplication as a new command value signal 163. The other arrangement is identical to that of the fifth embodiment and will now be described here.

The operation of the present embodiment will now be described with in accordance with FIGS. 15 and 18. Namely, the original current waveform command value 102 and the signal 161 representing it are employed as reference and this reference value is divided into two, which are given to the respective current sources 157, 158 as the command values. At this time, the result found by causing the multiplication circuit 173 to multiply the reference signal 161 by the constant ratio "k" in excess of "0" and not more than "1" is supplied to the first current source 157 as the command value. Further, a difference between the reference current waveform command signal 161 and the current value supplied by the first current source 157, i.e., a component insufficient for the reference current waveform, is supplied as the command value to the second current source 158. This causes the insufficient current value to the machining gap in the first current source 157 to be supplied by the second current source 158 high in response speed, whereby a stable current is supplied to the machining gap to achieve stable machining.

The result of multiplying the reference command value by the value k in excess of "0" and not more than "1" by means of the multiplication circuit 173 was defined as the command value to the first current source 157 to generate the shortage of the current to some extent. If there is no insufficient current to be compensated for by the second current source 158 and the current value of the first current source 157 is above the command value of the reference current waveform, compensation cannot be made by the second current source 158 high in response, i.e., the current response to the machining gap is slow, resulting in instable machining. Further, if the reference current waveform 102 is shaped to change the current value midway, the multiplication of the constant causes the reference value to be divided according to the then command current value, whereby the excellent power supply efficiency of the first current source 157 can be exhibited to the maximum.

Combining the power supply having the current control system high in power supply efficiency and the power supply having the current control system high in response as described above, the power supply apparatus for the electrical discharge machine concerned with the fifth and sixth embodiments achieves a power supply which is high in power supply efficiency and response and does not generate a current ripple, etc., thereby achieving stable machining with a compact, low-cost power supply.

Figure 16:
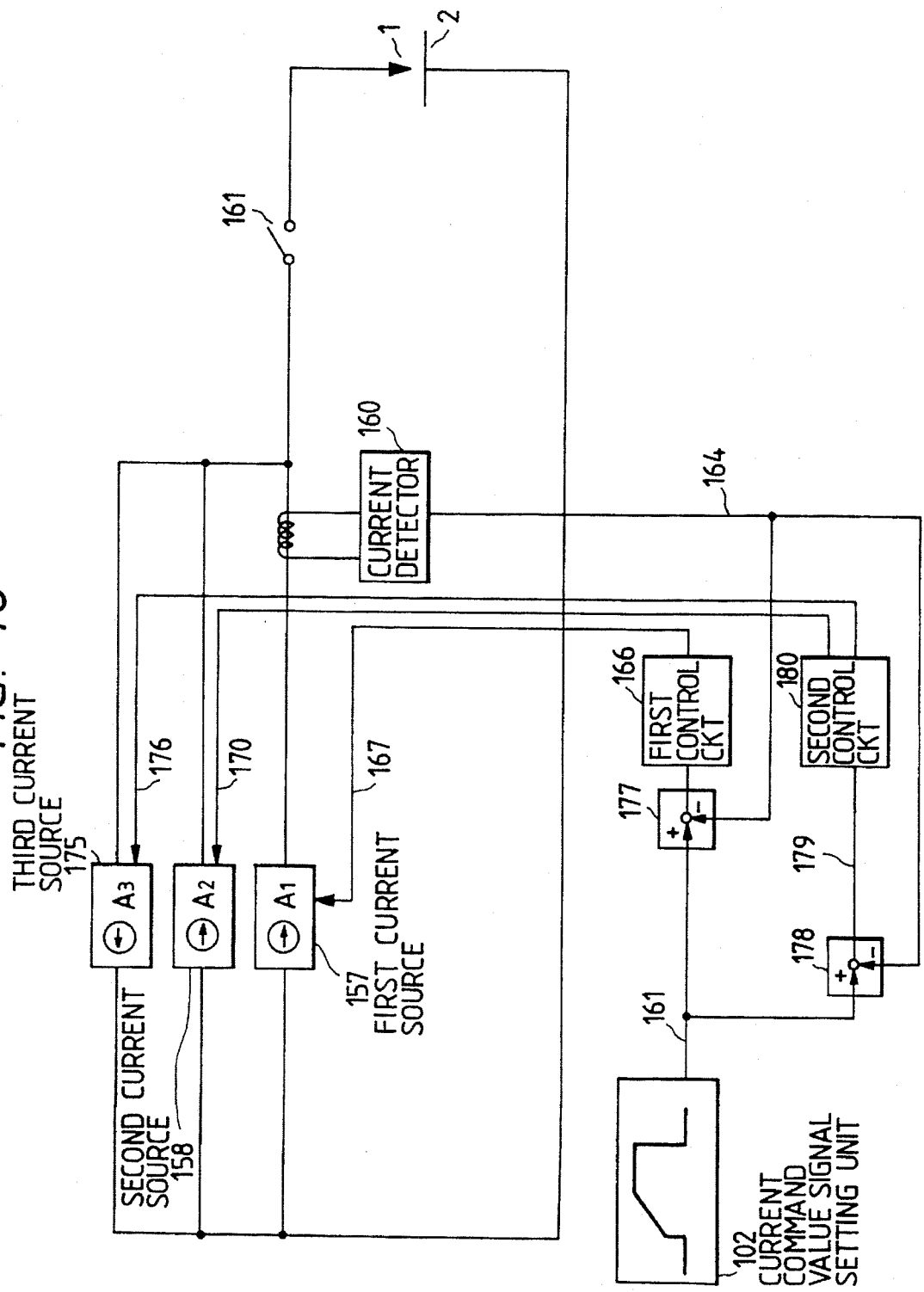
FIG. 16 is a circuit diagram illustrating a seventh embodiment of the present invention.
Figure 19:
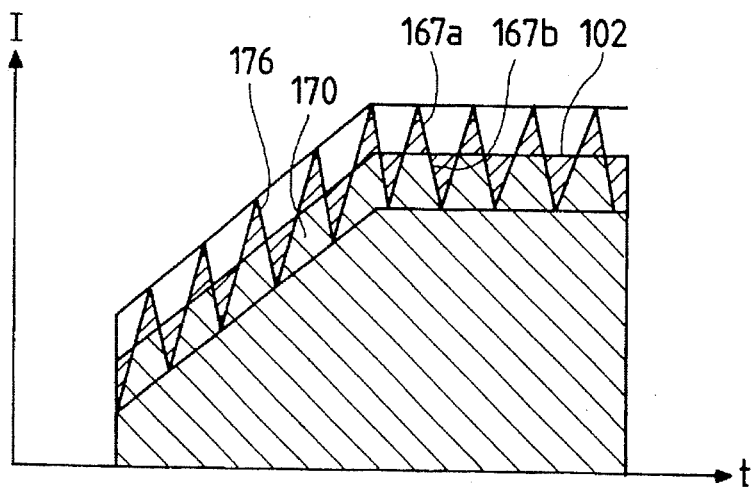
FIG. 19 is a current waveform diagram provided by the seventh embodiment.

A seventh embodiment of the present invention will now be described with reference to FIGS. 16 and 19. In FIG. 16, the machining circuit is constituted by the first current source 157, the second current source 158 and a third current source 175. Especially, the third current source 175 is connected to supply a current in an opposite direction to the first current source 157 and the second current source 158 relative to the machining gap. The first current source 157 is higher in power supply efficiency than the second current source 158 and the third current source 175, and the second current source 158 and the third current source 175 are higher in response than the first current source 157.

To make the best use of the features of the two types of current sources and to make up for the disadvantages thereof, their currents supplied to the machining gap are superimposed on each other and also superimposed negatively to reduce an excess component in the present embodiment. In FIG. 16, 177 indicates a first signal adder/subtractor which operates on and outputs a difference between the command value signal 161 and the signal 164 which represents a current detected by the current detector 160 and supplied from the first current source 157 to the machining gap, 166 denotes a first control circuit which outputs the signal 167 under the control of the output signal of said first signal adder/subtractor 166 to control the first current source 157, 178 designates a second signal adder/subtractor which operates on a difference between the command value signal 161 and said signal 164, 179 indicates an output signal thereof, and 180 denotes a second control circuit which outputs signals 170 and 176 under the control of said signal 179 to control the second and third current sources 158, 175.

The operation of the present embodiment will now be described with in accordance with FIG. 19. The reference current waveform command value 102 also acts as the current command value to the first current source 157. In the case of the switching power supply as shown in FIG. 16, the current waveform supplied to the machining gap by the first current source 157 has a shape indicated by 167a, 167b as shown in FIG. 19.

Namely, it is different from the reference current waveform 102. Hence, an insufficient component 170 is supplied to the second current source 158 as the command value and an excess component 176 is supplied to the third current source 175 as the command value. Since the third current source 175 is opposite in the current supply direction to the first and second current sources 157, 158, the difference between the command value and the present current value generated for any reason in the first current source 157 can be compensated for through the second and third current sources 158, 175. The compensation provided by these power supplies having high response speeds improves the rising and falling speeds of the current supplied to the machining gap and renders the current supply extremely constant whereby machining is stabilized and rapid machining is attained.

Combining the power supply having the current control system high in power supply efficiency and the two power supplies having the current control system high in response as described above, the power supply apparatus for the electrical discharge machine concerned with the seventh embodiment achieves a power supply which is high in power supply efficiency and response, does not generate a current ripple, etc., and accomplishes a power supply simple in control circuit system, thereby achieving stable machining with a compact, low-cost power supply.

Figure 20:
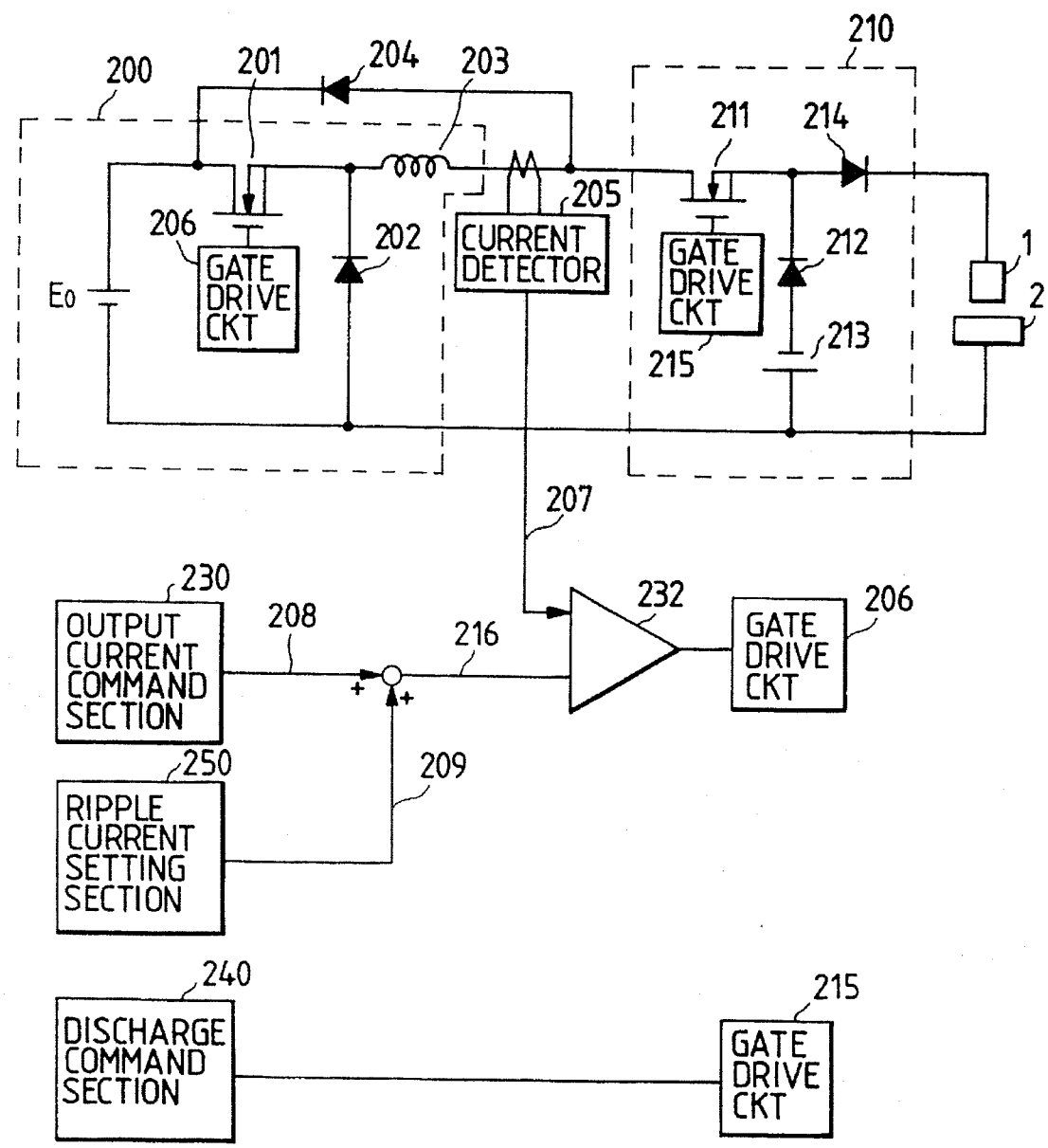
FIG. 20 is a circuit diagram illustrating an eighth embodiment of the present invention.
Figure 23:
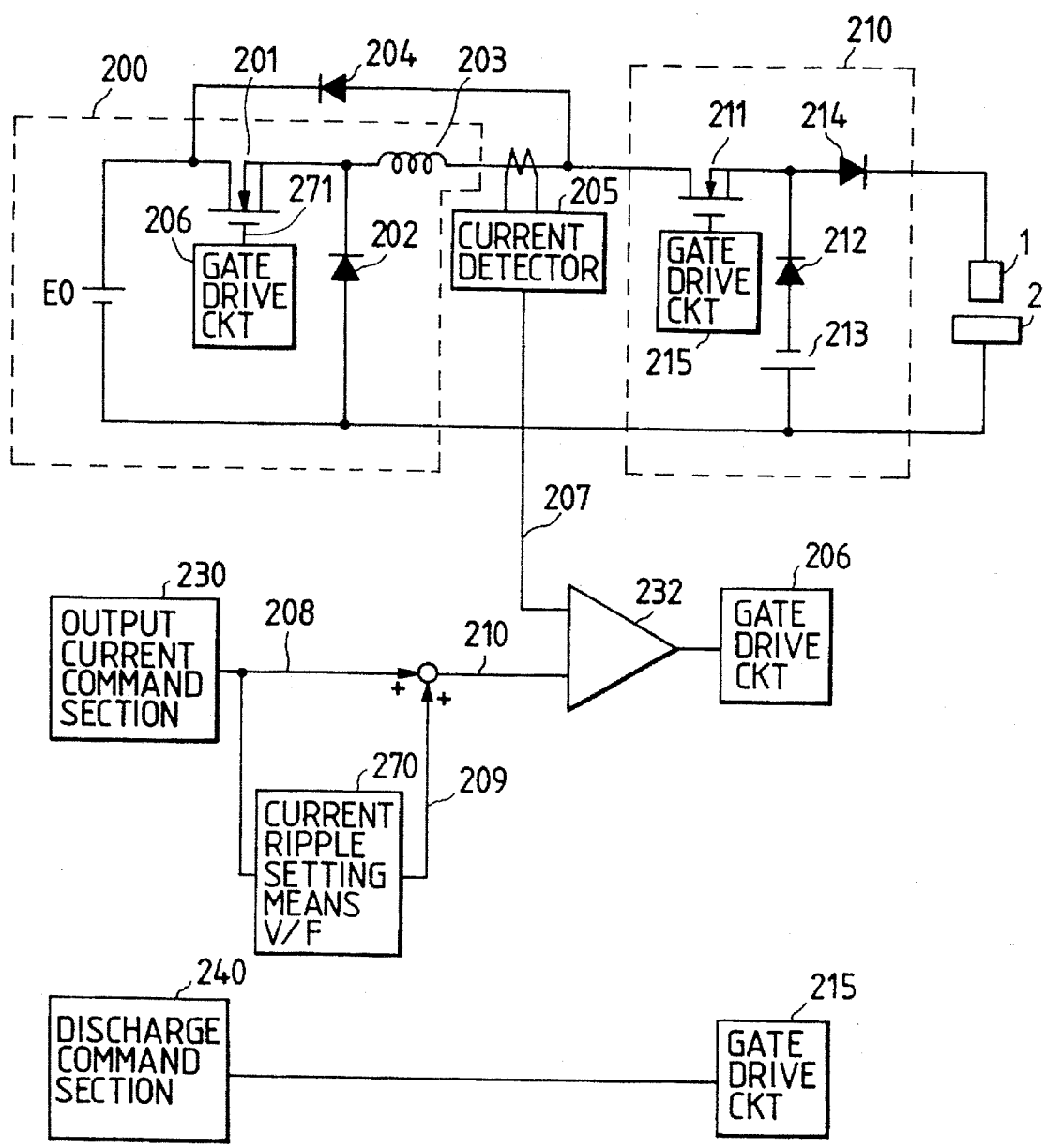
FIG. 23 is a circuit diagram illustrating a ninth embodiment of the present invention.

An eighth embodiment of the present invention will now be described with reference to FIGS. 20 to 22. In FIG. 20, a constant current supply section 200 constituted by a first switching device 201, a first diode 204 and a reactor 203 is connected to a power supply E0 for supplying a direct-current voltage and outputs a current to an output current on-off section 210. The constant current supply section 200 consists of a voltage-drop chopper made up of the first switching device 201, the first diode 204 and the reactor 203, and a second diode 202 is connected between its output and input. It is also provided with a current detector 205 which detects the current of the reactor 203. The output current on-off section 210 is constituted by a series circuit of a second switching device 211, a third diode 212 and a voltage source 213 and by a fourth diode 214. The output of the output current on-off section 210 supplies machining power to between the electrode 1 and the workpiece 2 provided in the dielectric to carry out electrical discharge machining.

This apparatus also has a comparator 232 which adds a signal 209 of a ripple current setting section 250 to a signal 208 of an output current command section 230 to compare a resultant addition signal 216 with the signal of the current detector 205 which detects the current of the reactor 203 in the constant current supply section 200. Further, this apparatus has a gate drive circuit 206 which controls the first switching device 201 to control the output current of the constant current supply section 200 to a predetermined current value and also has a gate drive circuit 215 which switches on/off the second switching device 211 to turn on/off the signal of a discharge command section 240, thereby controlling the output current on-off section 210.

FIG. 21(a) shows the signal of the discharge command section 240. A pulse signal 260 switches on the switching device 211 of the output current on-off section 210 to apply a no-load voltage 261 to between the electrode 1 and the workpiece 2 as shown in FIG. 21(b). When a discharge occurs between the electrode 1 and the workpiece 2 after this, the no-load voltage changes into a discharge voltage as indicated by 262.

When the discharge occurs, a current flows from the power supply E0 to the electrode 1 and the workpiece 2 through the first switching device 201, the reactor 203, the second switching device 211 and the fourth diode 214. Signal 208 in FIG. 21(c) indicates the signal from the output current level setting section 230, which is output in synchronization with the discharge start. 209 in FIG. 21(d) indicates the signal of the ripple current setting means 250, which is also output from the ripple current setting means 250 in synchronization with the discharge start. Further, 216 in FIG. 21(e) indicates a signal obtained by adding the signal 208 of the output current level setting section 230 and the signal 209 of the ripple current setting circuit 250 (hereinafter referred to as the additional signal).

When the discharge is started, the output current of the constant current supply section 200 increases at the time constant of the inductance of the reactor 203 in the circuit and the detection value of the output current is as indicated by a signal 207. The addition signal 216 and the current detection value 207 are compared continuously. When the detection signal 207 falls below the addition signal 216, the comparator 232 outputs a signal which keeps the first switching device 201 on. When the detection signal 207 rises above the addition signal 216, the comparator 232 outputs a signal which keeps the first switching device 201 off.

The details of the constant current control will now be described. FIG. 22(a) is the expanded view of a waveform 263 in FIG. 21(e). When the current value is smaller than the addition signal 216, the waveform keeps increasing as indicated by 264 and the current detection value 207 increases according to the time constant of the inductance. The addition signal 216 keeps changing, beginning with the discharge start. When crossing the waveform of the addition signal 216 during its increase as indicated by 265, the current detection value 207 drops below the addition signal 216 and is turned off. Therefore, switching is forced to repeat in the vicinity of the current detection value 207 and is finally kept within a current ripple setting crest value 266. The triangular wave, which was used as an oscillation signal for the current ripple set value 209 in the description of the present embodiment, may be a rectangular wave 267 or a sine wave 268 as in FIG. 22(b) or 22(c) to produce the same effect.

A ninth embodiment will now be described in accordance with FIGS. 23 to 26. Current ripple setting means 270 in FIG. 23 has a V-f converter which converts the signal of the current command section 230 into a frequency (hereinafter referred to as the V-f conversion), is designed to input the signal 208 of the current setting section 230 to the V-f converter and to input a signal resulting from the addition of the V-f converted signal 209 and the current set value 208 to the comparator 232, and is also built to change the frequency of the transmission signal 209 in response to the signal 208 of the current setting section 230. The other arrangement is identical to that of the eighth embodiment and will not described here.

Figure 24:
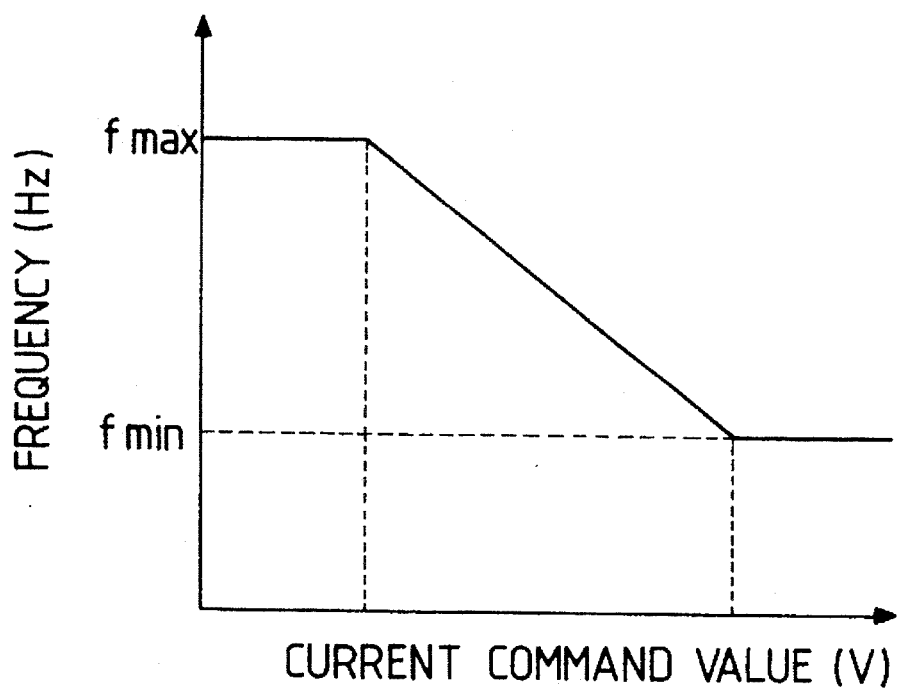
FIG. 24 is a V-f characteristic diagram used to describe the operation of the ninth embodiment.

FIG. 24 shows an example of the characteristic of the V-f conversion. The signal 208 of the current setting section 230 and the frequency of the transmission signal 209 are almost inversely proportional to each other. The frequency of the current is preset to be higher as the level of the signal 208 is lower and the ripple is set to be maximum when the level of the signal 208 is maximum. Since there is a limit on the frequency response of the first switching device 201 when the level of the signal 208 drops to some extent, a maximum frequency value fmax is set to prevent the frequency from rising if the level of the signal 208 reaches or falls below a predetermined value. Reversely, a minimum frequency value fmin is set to prevent the frequency from reaching or rising above a predetermined value.

Figures 25A, 25B, 25C, 25D:
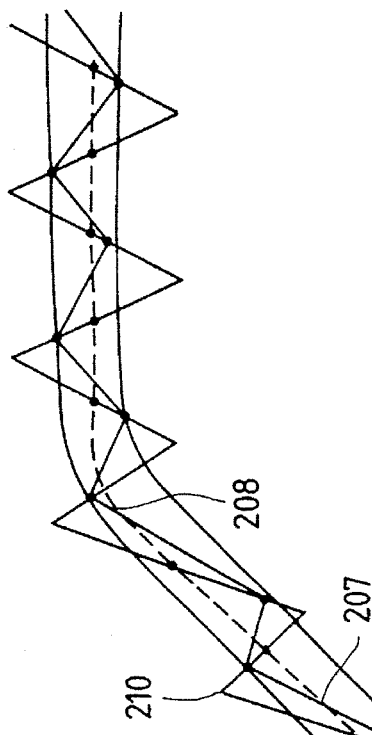
FIG. 25(a)–(d) are waveform diagrams and timing charts used to describe the operation of the ninth embodiment.

FIG. 25(a) shows the addition current 210 and the current detection signal 207 at a time when the current peak is high. The addition signal 210 is low in frequency because of the high peak, and therefore, a switching cycle 271 of the first switching device 201 is long as shown in FIG. 25(b), which accordingly increases the on time and off time, increasing a ripple ΔI1. FIG. 25(c) shows the addition current 216 and the current detection signal 207 at a time when the current peak is low. When the current peak is low, the frequency of the addition signal 216 is high, the switching cycle 271 of the first switching device 201 is short as shown in FIG. 25(d), and therefore the on time and off time reduces, increasing a ripple ΔI2. By modulating the frequency of the addition signal according to the peak current as described above, the ripple can be reduced, whereby uniform machining accuracy is provided finally.

Figure 26:
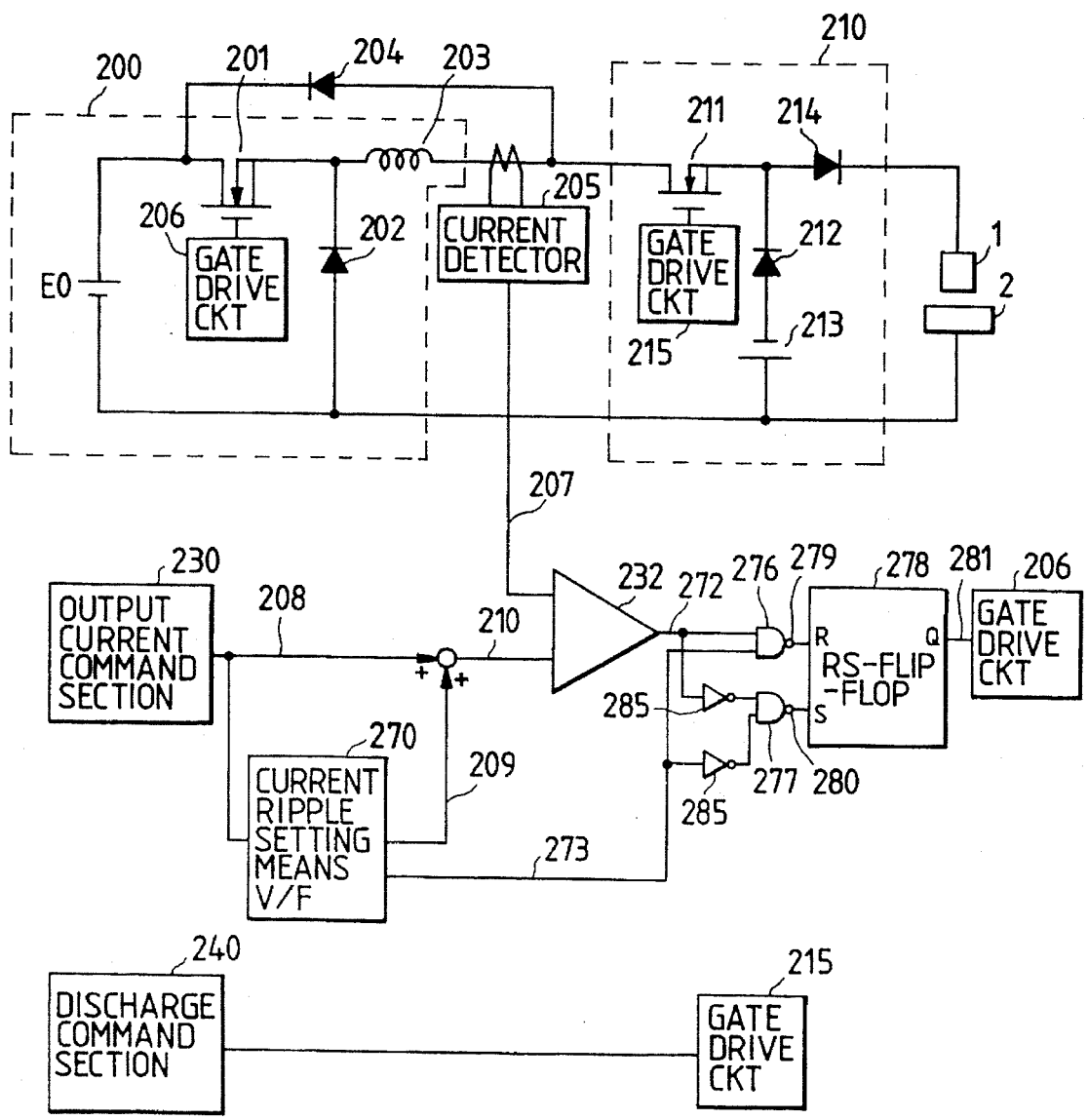
FIG. 26 is a circuit diagram illustrating a tenth embodiment of the present invention.

A tenth embodiment will now be described in accordance with FIGS. 26 and 27. In FIG. 26, the current ripple setting means 270 has means for outputting a synchronization signal 273. This synchronization signal 273 and an output signal 272 of a comparator 232 are input to a gate to drive the first switching device 201 by means of an output 281 of said gate. The gate consists of a first NAND circuit 276 which receives the synchronization signal 273 output from the current ripple setting means 270 and the output signal 272 of the comparator 272, a second NAND circuit 277 which receives the synchronization signal 273 and the output signal 272 via inverters 285, and an RS-flip-flop 278 which receives an output 279 of the first NAND circuit 276 at its reset terminal and receives an output 280 of the second NAND circuit 277 at its set terminal. The other arrangement is identical to that of the ninth embodiment and will not be described here.

FIGS. 27(a)–(g) show a timing chart concerned with the tenth embodiment and operation will be described in accordance with this timing chart. FIG. 27(a) shows a rectangular-wave synchronization signal 273 from the ripple current setting means 270, FIG. 27(b) shows a signal 209 from the ripple current setting means 270, FIG. 27(c) shows the detection signal 207 and the addition signal 216 of the current waveform, and FIG. 27(d) shows the output signal 272 of the comparator 232. In the meantime, when the current detection value 207 exceeds the addition signal 216, the output of the comparator is switched low to switch off the first switching device 201. However, at the time of normal switching, noise 274 takes place as shown in FIG. 27(c).

Therefore, as shown in FIG. 27(d), the comparator 232 always compares the current detection value 207 and the addition signal 216 and compares the noise 274 and the addition signal 216, and an on-off repeating portion 275 occurs in the output signal 272 of the comparator 232 due to the influence of the noise 274, leading to faulty operation. For this reason, as shown in FIGS. 27(e) and (f), the output signal 272 of the comparator 232 and the rectangular-wave synchronization signal 273 of the current ripple setting means 270 are input to the first NAND circuit 276, the inverter 285 and the second NAND circuit 277 and the output signals 279, 280 of the first and second NAND circuits 276, 277 are input to the flip-flop 278 to invert the flip-flop 278 only once relative to the high and low of the rectangular wave, whereby a switching signal 281 as shown in FIG. 27(g) can be provided to eliminate unstable operation at the noise 274 portion. Accordingly, precise switching operation can be performed if the noise 274 enters the input of the comparator 232.

Figure 28:
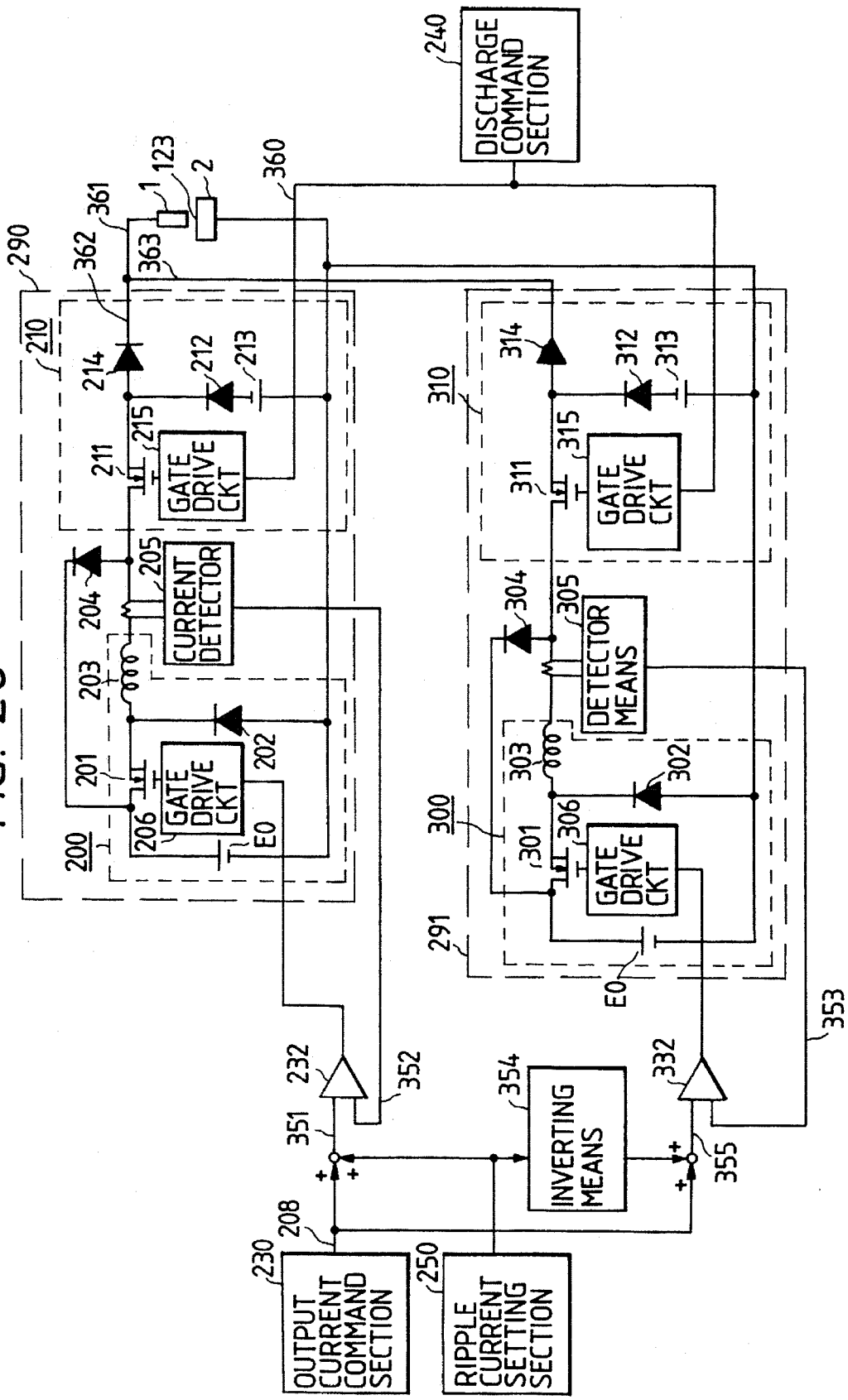
FIG. 28 is a circuit diagram illustrating an eleventh embodiment of the present invention.

An eleventh embodiment will now be described in accordance with FIGS. 28 to 30. The arrangement of a first circuit 290 and that of a second circuit 291 are identical to that of the circuit described in the eighth embodiment and will therefore not detailed here. In FIG. 28, the first circuit 290 and the second circuit 291 are connected in parallel with the machining gap and are equipped with detection means 205 which detects the output current of the first constant current supply section 200 and with detection means 305 which detects the output current of a second constant current supply section 300, respectively. The output of the output current level setting means 230 which commands the output currents of the first and second constant current supply sections is added to the signal of the first ripple current setting means 250 (a first addition signal 351 hereinafter) which commands the ripple current of the output current of the first constant current supply section 200, and is compared by the first comparator 232 with the output of the detection means 205 (a first detection signal 352 hereinafter) which detects the output current of said first constant current supply section 200.

The output of the detection means 305, which detects the output current of the second constant current supply section 300, is a second detection signal 353. A first ripple current setting output 250, which commands the ripple current of the output current of the first constant current supply section 200, is inverted by inverting means 354. The set value of the inverting means 354 is a value 180 degrees out of phase. The set value 208 of said first/second output current level setting means is added to the inversion signal an produces a second addition signal 355. The addition signal 255 and the detection value 353 of the second detection means are compared by a second comparator 332.

Operation will now be described with reference to a timing chart in FIGS. 29(a)–(d). FIG. 29(a) shows an ON signal for the second switching device 215 of the first constant current circuit 200 and a second switching device 315 of the second constant current circuit 300, which is turned on under the control of a command 360 of the discharge command section 240. FIG. 29(b) shows the output signal 208, which is output from the output current level setting means 230 in synchronization with the discharge start. At this time, the output current level signal 208 is set to a value about half of a desired output value. FIG. 29(c) shows the detection signal 352 of the first constant current supply section and the first addition signal 351. The first output signal 352 and the first addition signal 351 are compared by the first comparator 232. When the detection signal 352 of the first constant current supply section 200 is lower than the first addition signal 351, the first switching device 201 is switched on by the gate drive circuit 206. Conversely, when the first output signal 352 is higher than the first addition signal 351, the first switching device 201 is switched off by the gate drive circuit 206.

FIG. 29(d) shows the second output signal 353 and the second addition signal 355. The second output signal 353 and the second addition signal 355 are compared by the second comparator 332. When the second output detection signal 353 is lower than the second addition signal 355, the first switching device 301 of the second constant current supply device 300 is switched on by a gate drive circuit 306. In contrast, when the second output signal 353 is higher than the second addition signal 355, the first switching device 301 is switched off by the gate drive circuit 306.

Figure 30A:
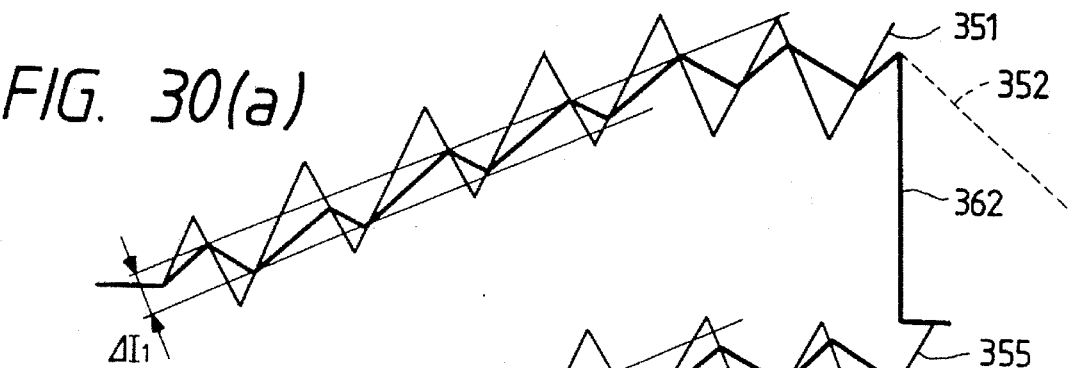
FIGS. 30(a)–(c) are waveform diagrams used to describe the operation of the eleventh embodiment.
Figure 30B:
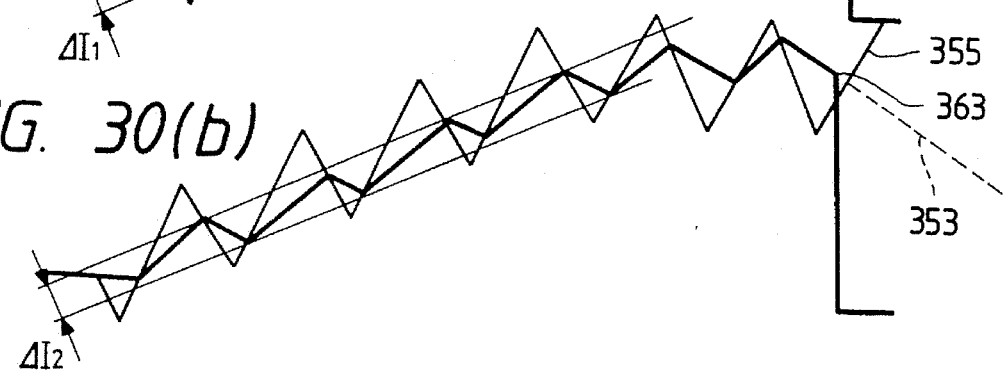

FIG. 30(a) shows an output current 362 of the first circuit and FIG. 30(b) shows an output current 363 of the second circuit. To cause the output currents of the circuits to flow, the outputs of the constant current supply sections are given to the gap formed between the electrode 1 and the workpiece 2 by their respective second switching devices 211, 311 in correspondence with the desired pulse width determined by an output 360 of the discharge command section 250. Since the ripple of the output 352 of the constant current supply section 200 in the first circuit 290 is determined by the addition signal 351, the output current 362 of the first circuit 290 has a ripple width of $\Delta I1$. Also, since the output 353 of the constant current supply section in the second circuit 291 is controlled by the second addition signal 355 which is 180 degrees out of phase with the addition signal 351 that controls the ripple of the constant current supply section 200 in the first circuit 290, the ripple of the output current 363 of the second circuit 291 flowing in the machining gap is 180 degrees out of phase with the ripple of the output current 362 of the first circuit.

Figure 30C:
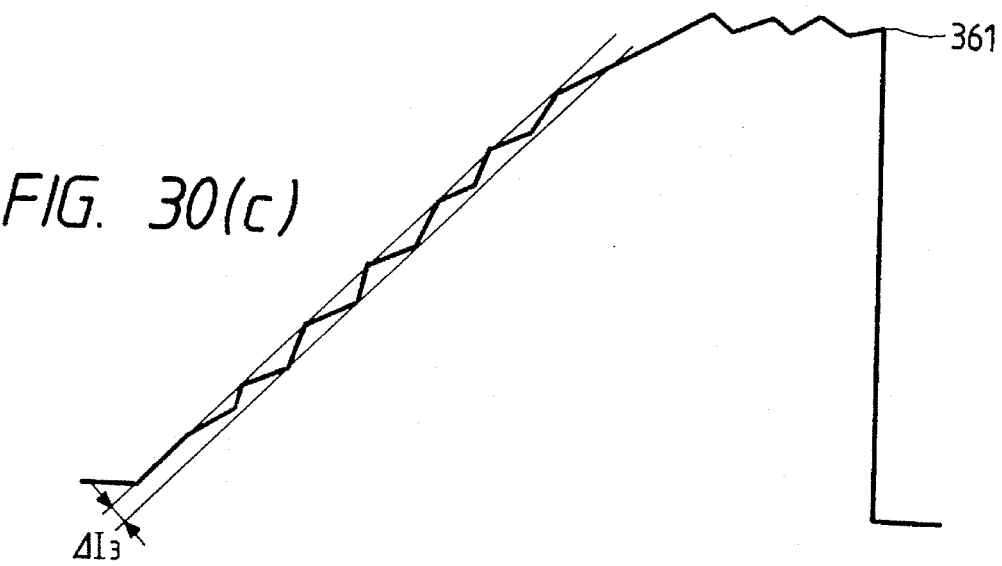

At this time, the ripple $\Delta I2$ of the output current 363 has almost the same width as the ripple $\Delta I1$ of the first output current. Accordingly, as seen in FIG. 30(c), a machining gap current 361 flowing in the machining gap is a current resulting from the addition of the output currents 362 and 363 and serves to offset the ripples of the output currents 362 and 363 each other, and a ripple $\Delta I3$ becomes an incomparably very small value. This circuit system provides a low-ripple current and gives a discharge current which is shaped almost close to the current level command setting.

Figure 32A:
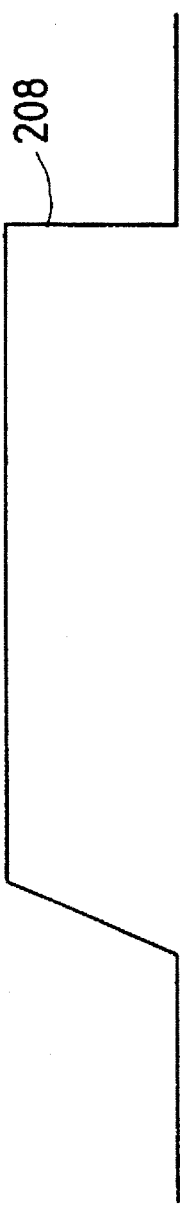
FIGS. 32(a)–(c) show a waveform diagram and a timing chart used to describe the operation of the twelfth embodiment.
Figure 32B:
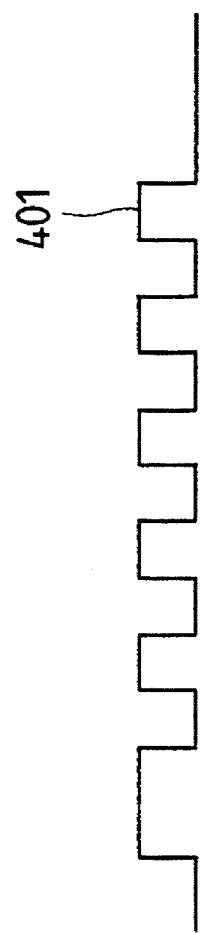

A twelfth embodiment will now be described in accordance with FIGS. 31 and 32(a)-(c). In FIG. 31, 400 indicates a timer which outputs a signal 401 as shown in FIG. 32(b). The other arrangement is essentially identical to that of the eighth embodiment, with the exception that the ripple current setting means 250 does not exist, and therefore, will not be described here.

Figure 32C:
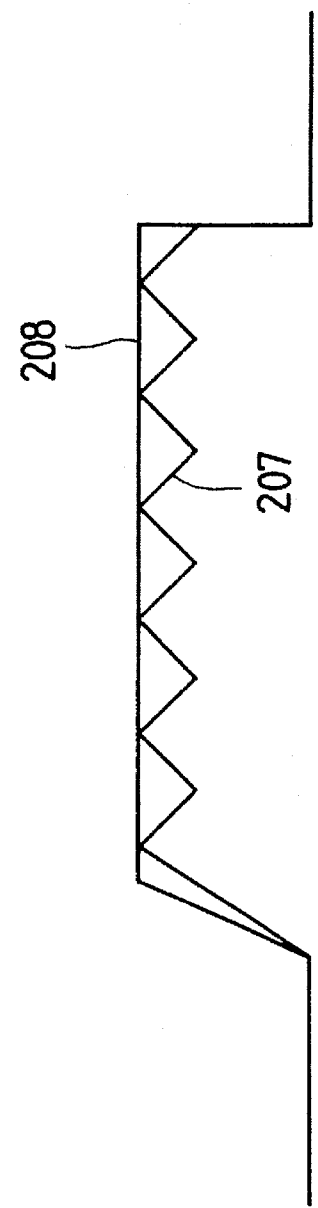

The operation of the present embodiment will now be described in accordance with timing charts in FIG. 32(a)-(c). In FIG. 32(a), 208 indicates the signal of the output current level setting section 230 which is output in synchronization with the discharge start. 401 in FIG. 32(b) designates the output of the timer 400.

When the discharge is started, the output current of the constant current supply section 200 increases at the time constant of the inductance of the reactor 203 in the circuit. When the detection signal 207 rises above the signal 208, the comparator 232 outputs a signal which switches on the first switching device 201. When a predetermined length of time has elapsed after that, the timer 400 outputs a signal which switches on the first switching device 201. Then, the detection signal 207 rises above the signal 208 and the comparator 232 outputs the signal which switches off the first switching device 201. As a result, the current detection value is as indicated by the signal 207 in FIG. 32(c).

When the inductance value of the reactor 203 and the ON/OFF time of the timer 400 are selected properly, this circuit system also provides a low-ripple current and gives a discharge current shaped almost close to the current level command setting.

Figure 33:
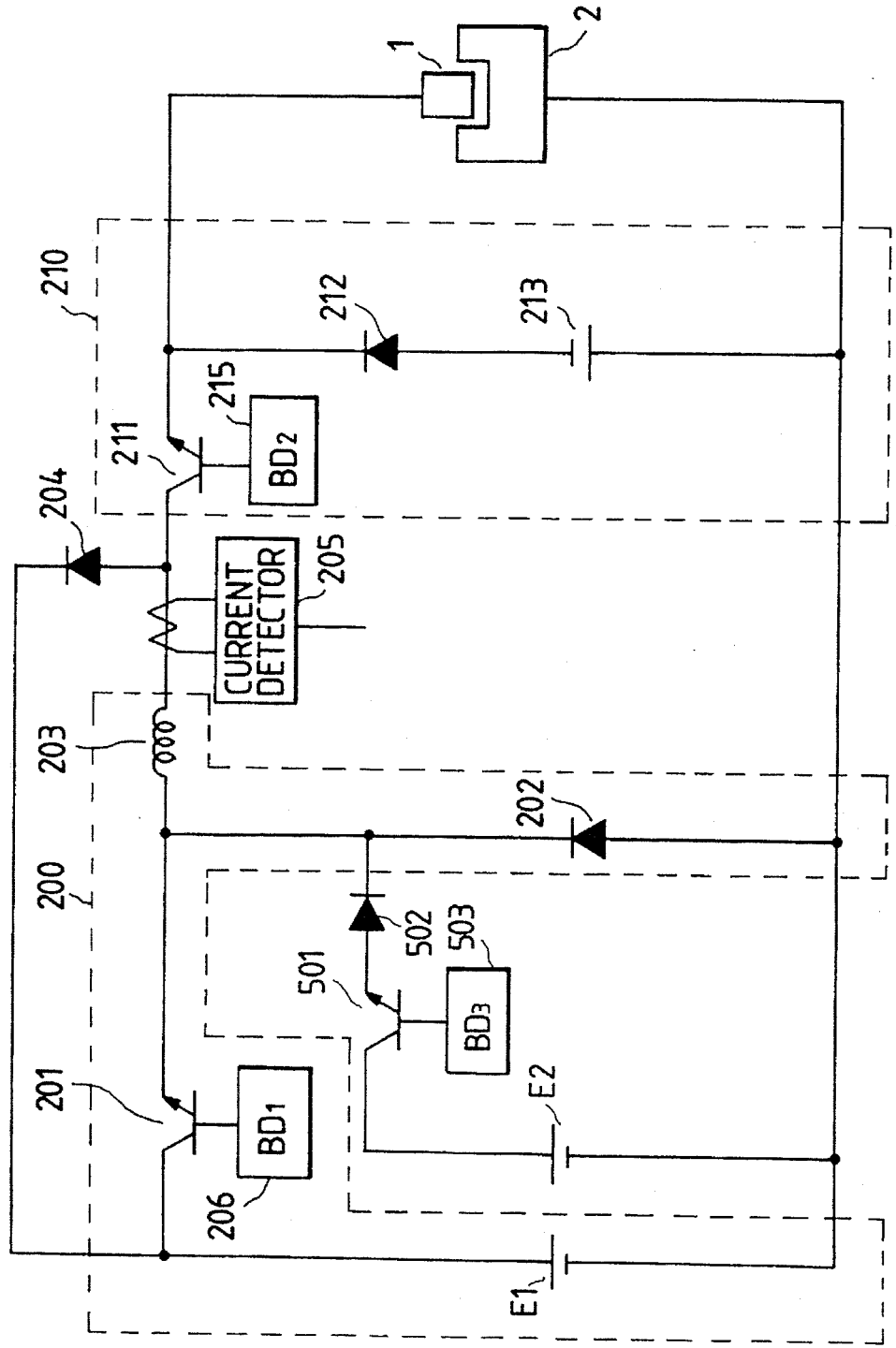
FIG. 33 is a main circuit diagram illustrating a thirteenth embodiment of the present invention.

A thirteenth embodiment of the present invention will now be described with reference to FIGS. 33 to 42. FIG. 33 is a main circuit diagram concerned with the thirteenth embodiment, wherein E1 indicates a first direct-current power supply and 201 designates a first switching device which is switched on/off by the gate drive circuit 206. The reactor 203 is connected between the first switching device 201 and the second switching device 211, and the electrode 1 and the workpiece 2 are connected to the second switching device 211 and the first direct-current power supply E1. The first diode 202 is connected between the connection point of the first switching device 201 and the reactor 203 and the first direct-current power supply E1, and the second diode 204 is connected between the connection point of the first power supply E1 and the first switching device 201 and the connection point of the reactor 203 and the second switching device 211 in a direction in which the current flows to the first direct-current power supply E1.

A series connection of the third diode 212 and the direct-current power supply 213 is connected between the electrode 1 side of the second switching device 211 and the negative voltage side of the first direct-current power supply E1. The current detector 205 is connected to detect the current flowing in the reactor 203. A series connection of the second direct-current power supply E2 having a voltage capable of supplying the machining gap with a voltage substantially equal to or lower than an electrical discharge voltage, a third switching device 501 and a diode 502 is connected in parallel with said first diode 202. This third switching device 501 is switched on/off by a gate drive circuit 503.

It is to be understood that in this embodiment, the first switching device 201, the first diode 202 and the reactor 203 constitute the constant-current supply section 200, and the output current on-off section 210 consists of the second switching device 211 and a series circuit of the third diode 212 and the direct-current power supply 213.

Figure 34:
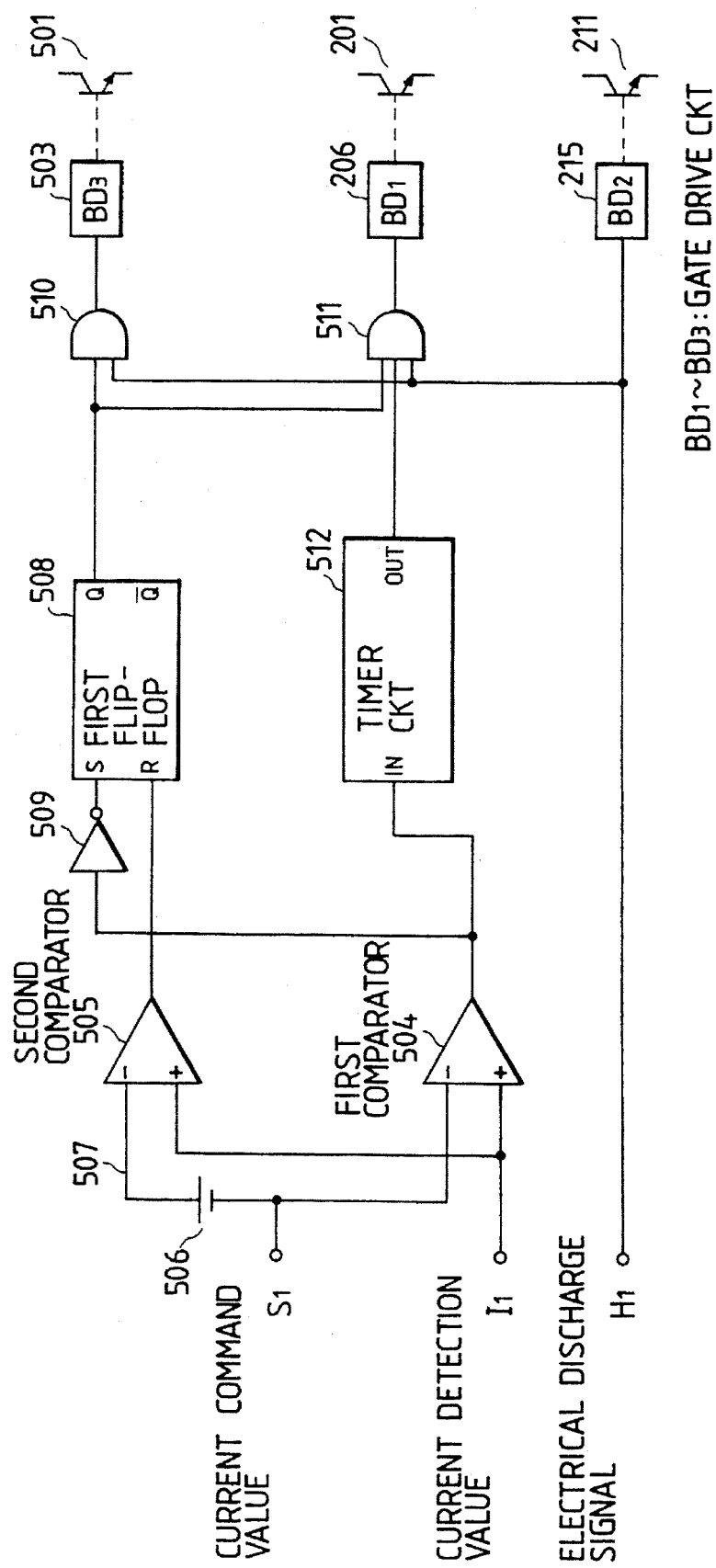
FIG. 34 is a circuit diagram illustrating a control circuit concerned with the thirteenth embodiment of the present invention.

FIG. 34 shows a control circuit of the gate drive circuits 503, 206, 215 shown in FIG. 33, wherein a first comparator 504 compares a current command value S1 with a current detection value I1 of the current detector 205 and outputs a signal to the input terminal of a timer circuit 512. A second comparator 505 compares an overcurrent command value 507 provided by connecting a direct-current voltage 506 in series with the current command value S1 with the current detection value I1 of the current detector 205 and outputs a signal to the reset terminal R of a first flip-flop 508. The output signal of said first comparator 504 is inverted by an inverter 509 and the result of inversion is connected to the set terminal S of the first flip-flop 508.

In the meantime, an electrical discharge signal H1 output from an NC apparatus switches the second switching device 211 on/off under the control of the gate drive circuit 215. Also, the AND condition of the electrical discharge signal H1, the output of the timer circuit 512 and the output of the first flip-flop 508 is fetched by an AND circuit 511 to switch the first switching device 201 on/off under the control of the gate drive circuit 206. Also, the AND condition of the electrical discharge signal H1 and the output of the first flip-flop 508 is fetched by an AND circuit 510 to switch the third switching device 501 on/off under the control of the gate drive circuit 503.

Figure 35:
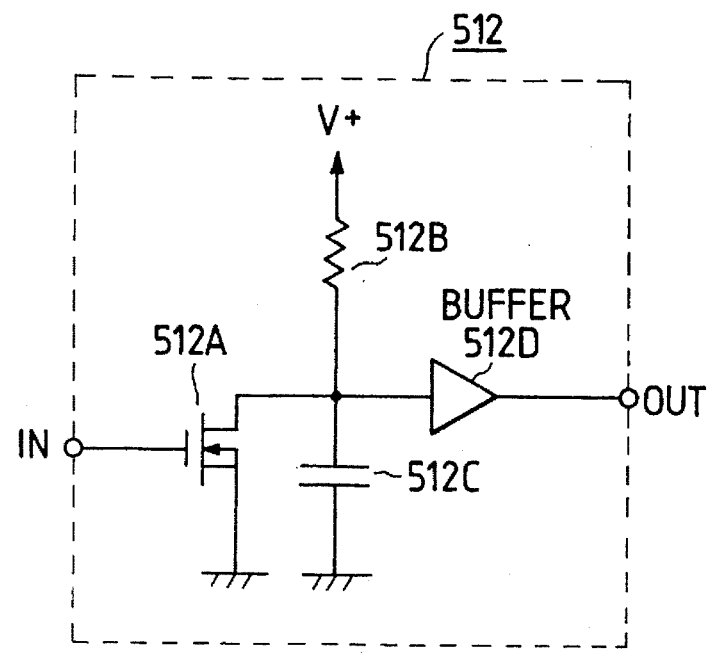
FIG. 35 is a circuit diagram illustrating an example of a timer circuit concerned with the thirteenth embodiment of the present invention.
Figure 36:
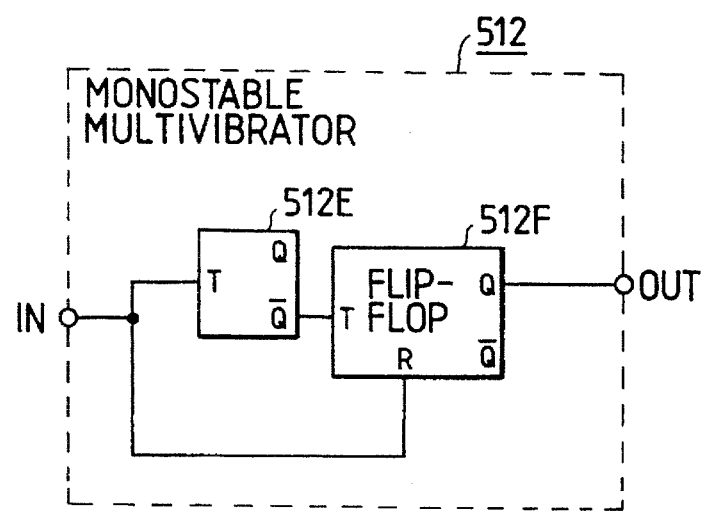
FIG. 36 is a circuit diagram illustrating an alternative example of the timer circuit concerned with the thirteenth embodiment of the present invention.
Figure 37:
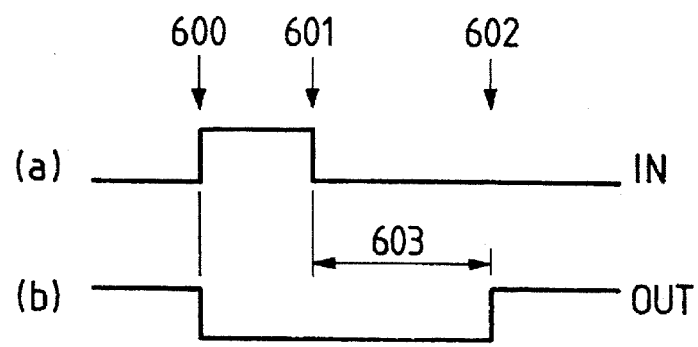
FIG. 37 are timing charts used to describe the operation of the timer circuit concerned with the thirteenth embodiment of the present invention.

FIGS. 35 and 36 show specific examples of the timer circuit 512 in FIG. 34. In the example of the timer circuit 512 in FIG. 35, the output of the first comparator 504 is connected to the input terminal IN. A MOSFET 512A closes/opens a capacitor 512C in a time constant circuit constituted by a resistor 512B and the capacitor 512C. In FIG. 37 wherein an input signal (a) and an output signal (b) thereof are shown, when the output of the first comparator 504 is switched high at a point 600 in the input (a), the MOSFET 512A turns on to close the capacitor 512C, whereby the output (b) is switched low.

Also, when the output (b) of the first comparator 504 is switched low at a point 601 in the input (a), the MOSFET 512A turns off to open the capacitor 512C, whereby the output (b) exceeds the threshold of a buffer 512D and is switched high at a point 602 after a certain length of time 603 by the time constant circuit consisting of the resistor 512B and the capacitor 512C. Namely, the output OUT is switched low when the output of the first comparator 504 is switched high,, and the output OUT is switched high a certain length of time after the output of the first comparator 504 is switched low. The timer circuit 512 operates as described above. In the example of the timer circuit 512 in FIG. 36 which is constituted by a logic circuit of a monostable multivibrator 512E and a flip-flop 512F, the operation of the output OUT switched high after the time set to the monostable multivibrator 512E is identical to that shown in FIG. 37.

Figure 38:
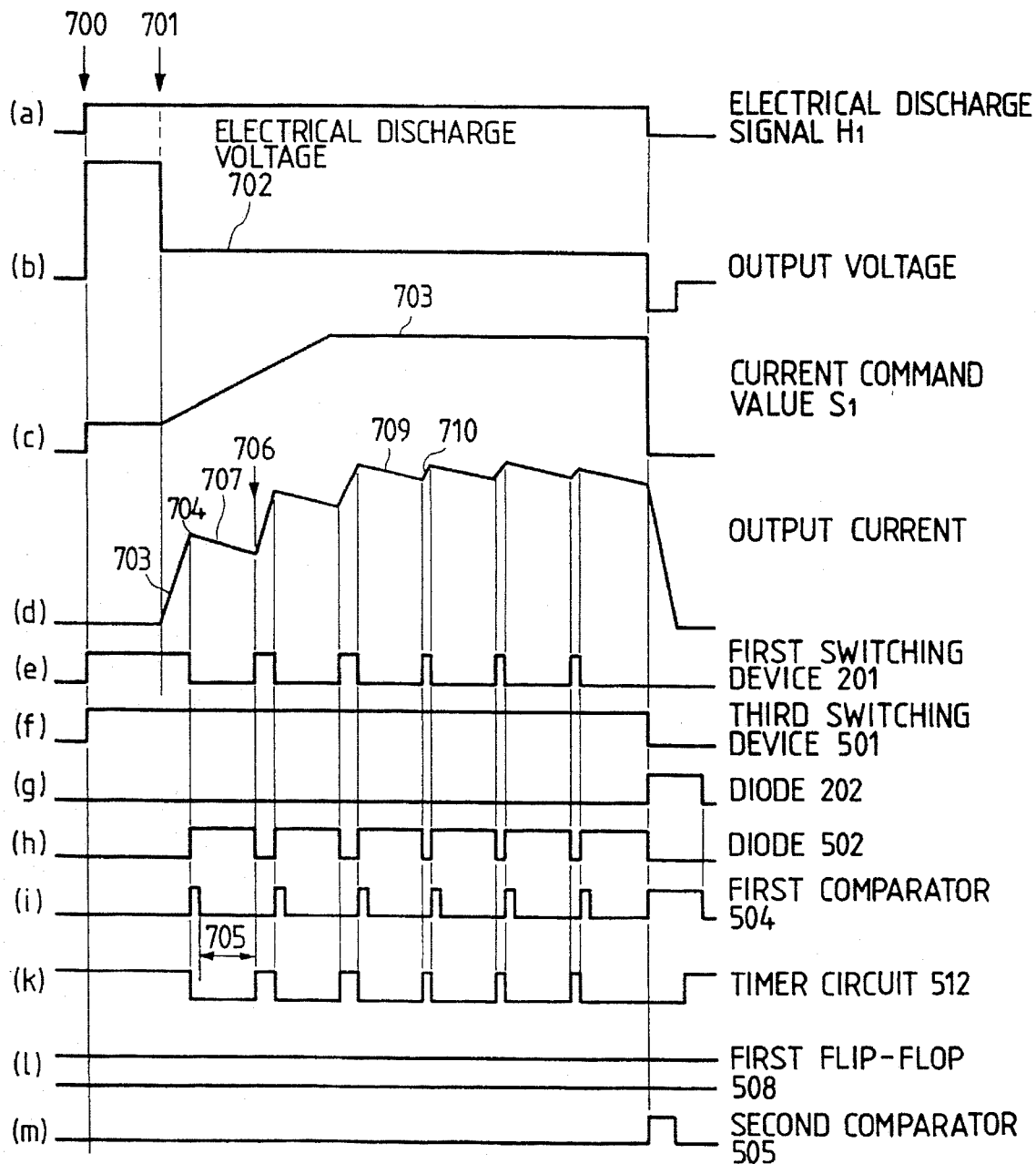
FIG. 38 are waveform diagrams and timing charts used to describe a main operation concerned with the thirteenth embodiment of the present invention.

Timing charts and waveform diagrams shown in FIG. 38 show the operation of this thirteenth embodiment. In FIG. 38, (a) shows the electrical discharge signal H1, (b) shows an output voltage waveform, (c) shows the waveform of the current command value S1 output from a control apparatus (not shown) of the electrical discharge machine, (d) shows an output current waveform, (e) shows the ON/OFF status of the first switching device 201, (f) shows the ON/OFF status of the third switching device 501, (g) shows the current passage status of the diode 202, (h) shows the current passage status of the diode 502, (i) shows the output status of the first comparator 504, (k) shows the output status of the timer circuit 512, (l) shows the output status of the first flip-flop 508, and (m) shows the output status of the second comparator 505.

When the electrical discharge signal H1 is switched on at a point 700 in waveform (a), the second switching device 211 is switched on by the gate drive circuit 215. Since the first switching device 201 in FIG. 33 is switched on at this time as shown in (e), the voltage of the first direct-current power supply E1 is applied to between the electrode 1 and the workpiece 2 as shown in (b). The gap between the electrode 1 and the workpiece 2 is filled with the dielectric fluid, such as oil or water, and is controlled extremely precisely by a servo mechanism, a numerical control apparatus, etc., (not shown). When dielectric breakdown occurs at that extremely small gap, an electrical discharge is generated between the electrode 1 and the workpiece 2. This is indicated by 701 in waveform (a) and the output voltage in (b) acts as an electrical discharge voltage 702. This electrical discharge voltage is almost constant between approximately 25 and 30 volts. As soon as the electrical discharge occurs, the current begins to flow between the electrode 1 and the workpiece 2. The current indicated by 703 in (d) flows through the first direct-current power supply E1, the first switching device 201, the reactor 203 and the second switching device 211, and rises rapidly because the first direct-current power supply E1 voltage of approximately 80 volts is higher than the electrical discharge voltage 702.

When the output current, i.e., the current of the reactor 203, has reached the current command value S1, the output of the first comparator 504 is switched high at a point 704 as shown in (i). Accordingly, the output of the timer circuit 512 shown in (k) is switched low and the first switching device 201 is switched off as shown in (e). When the output of the first comparator 504 is switched high, the output of the timer circuit 512 is switched low only for a preset length of time indicated by 705 in (k) and is then switched high, whereby the first switching device 201 is switched on again.

During this preset time of the timer circuit 512, i.e., the period 705 when the first switching device 201 is off, the current is supplied from the second direct-current power supply E2 to between the electrode 1 and the workpiece 2 through the third switching device 501 already switched on, the diode 502 and the reactor 203. Since the second direct-current power supply E2 is set in voltage to be equal to or slightly lower than the electrical discharge voltage 702, the output current reduces slightly as indicated by 707 in (d). This is due to the slight variation of the current because the terminal voltage of the reactor 203 is reduced. This is repeated to cause the output current to follow up the current command value S1 as shown in (d).

When the current command value S1 reaches a certain value as indicated by 703 in (c), the output current decreases slowly as indicated by 709 in (d) but increases rapidly as indicated by 710 in (d). Since the time of decrease at 709 is the set time of the timer circuit 512 as at 707, the switching frequency of the first switching device 201 does not fall below the period of time 709 if 710 approaches zero. Also, since the current indicated by 709 decreases slowly, the ripples of the output current become small. Therefore, by connecting the second direct-current power supply E2 while said first switching device 201 is off for the certain period, a power supply apparatus for an electrical discharge machine can be arranged which provides an output current waveform with a few ripples.

Figure 39:
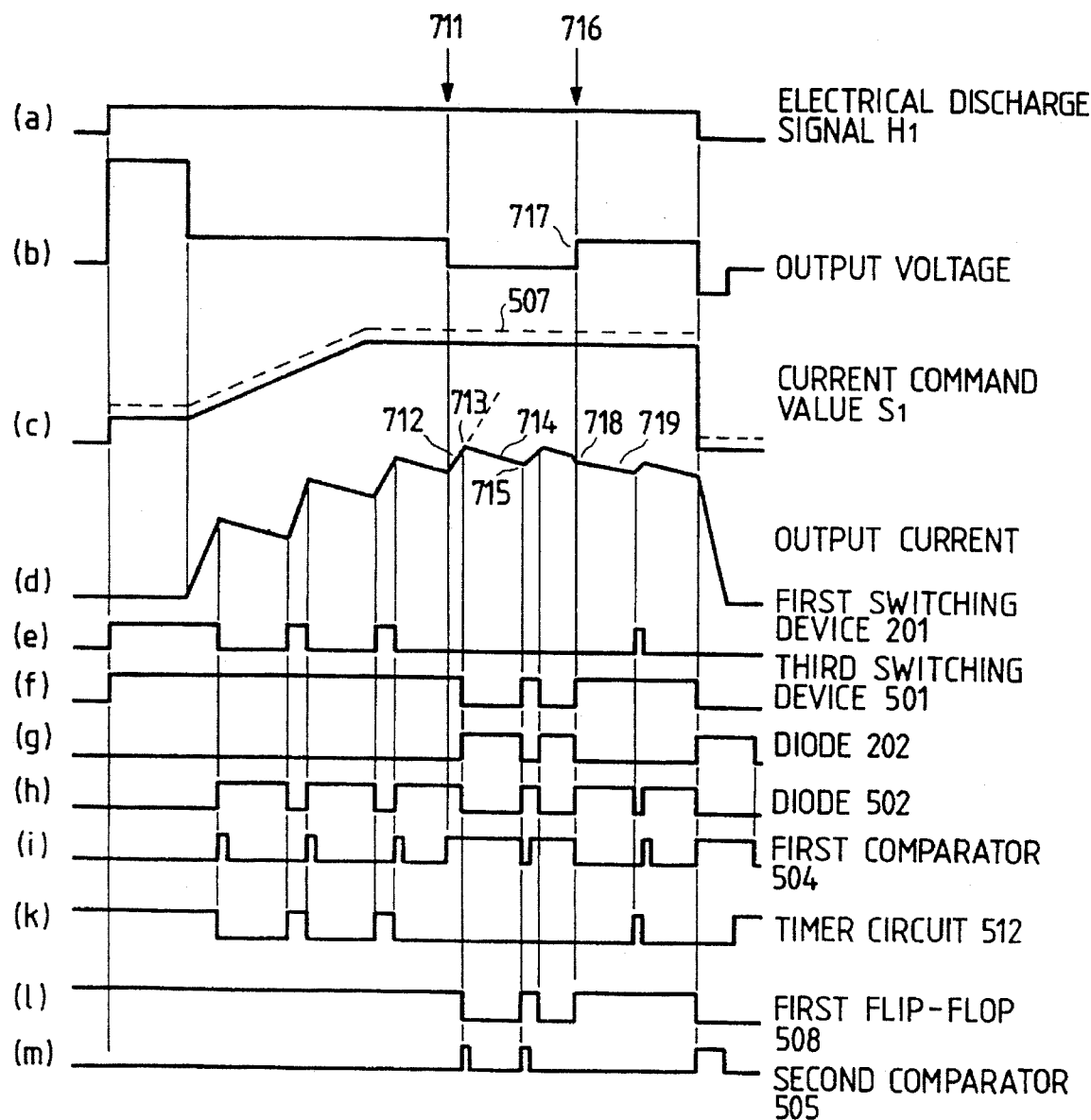
FIG. 39 are waveform diagrams and timing charts used to describe an operation at the time of a machining gap short circuit concerned with the thirteenth embodiment of the present invention.

FIG. 39 gives waveform diagrams and timing charts which are used to describe operation when a short circuit occurs between the electrode 1 and the workpiece 2 during the generation of an electrical discharge. If a short circuit takes place at a point 711 when the electrical discharge current is flowing as in FIG. 38, the output voltage (b) drops below the voltage of the second direct-current power supply E2, whereby the output current in (d) increases as indicated by 712. When this current, which is also the current of the reactor 203, increases and reaches the overcurrent detection value 507 indicated by 713 in (d), the output of the second comparator 505 which compares the current detection value I1 of the current detector 205 with the overcurrent command value 507 resulting from the addition of the voltage of a direct-current power supply 506 to the current command value S1 is switched high.

Hence, the output Q of the first flip-flop 508 is switched low and the third switching device 501 is switched off by the AND circuit 510. It is to be noted that at this time, the first switching device 201 is already off. Accordingly, the Output current is supplied through the second diode 202, the reactor 203 and the second switching device 211, and decreases as indicated by 714. When the output current further decreases down to the current command value S1, the output of the first comparator 504 is switched low in (i) at a point 715, whereby the signal inverted by the inverter 509 sets the first flip-flop 508 to switch the output Q high. This switches the third switching device 501 on to increase the output current. Thus, when a short circuit occurs between the electrode 1 and the workpiece 2, the output current increases and decreases between the current command value S1 and the overcurrent command value 507 and does not increase rapidly as a short-circuit current, thereby preventing the electrode 1 or the workpiece 2 from being damaged by a large current.

When the short circuit state is overcome for some reason, the output voltage returns to the electrical discharge current at a point 716 as indicated by 717 in (b). Therefore, the output current in (d) decreases sharply, and when it has decreased down to the current command value S1 indicated by 718, the output of the first comparator 504 is switched low and the first flip-flop 508 is set by the inverter 509, whereby the output Q thereof is switched high, the third switching device 501 is switched on, and the output current decreases slowly as indicated by 719. The timer circuit 512 outputs a low signal during the set time after the output of the first comparator 504 is switched low, and returns to its normal operation.

Figure 40:
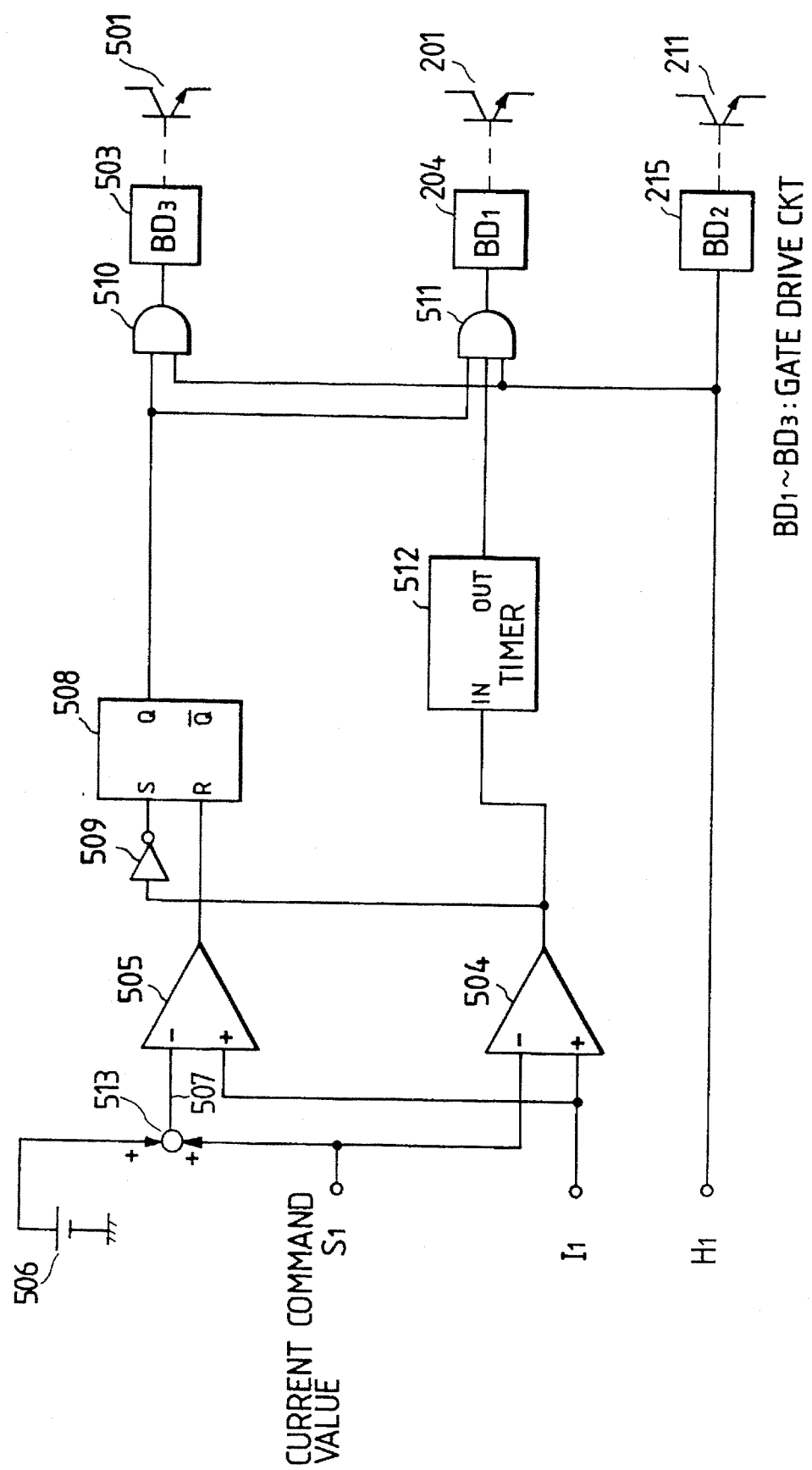
FIG. 40 is a circuit diagram illustrating an alternative example of the control circuit concerned with the thirteenth embodiment of the present invention.

FIG. 40 shows a modification to the control circuit for the gate drive circuits 206, 215, 503 shown in FIG. 34, and illustrates a method of adding the direct-current voltage 506 of the circuit in FIG. 34 to the current command value S1 by means of an adder 513 to find the overcurrent command value 507. This modification can perform operation identical to that of the circuit in FIG. 34.

Figure 41:
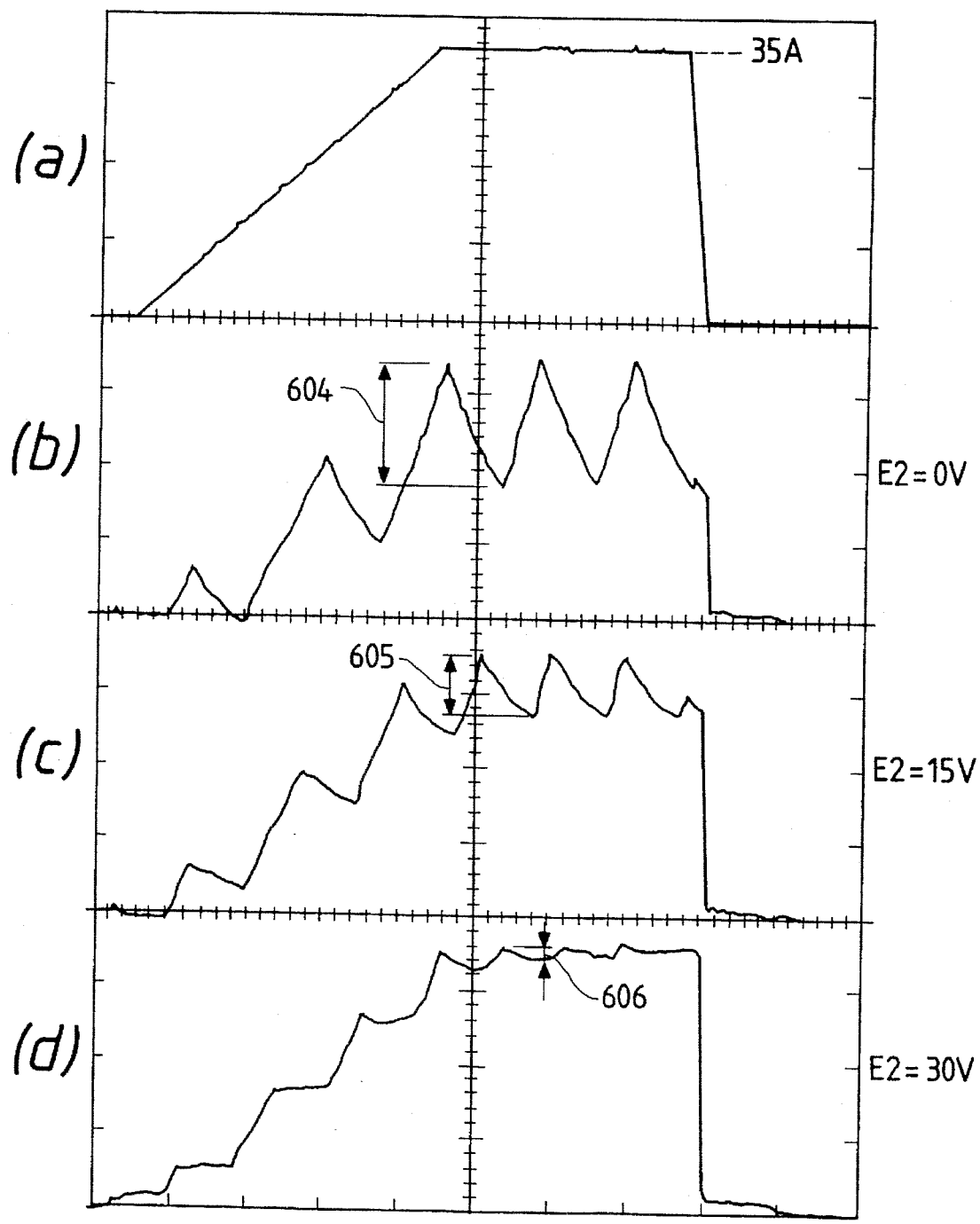
FIG. 41 are waveform diagrams used to describe an actual operation concerned with the thirteenth embodiment of the present invention.

FIG. 41 gives waveform diagrams wherein actual output currents were measured when the peak value of the current command value S1 is 35A in the apparatus concerned with this thirteenth embodiment. (a) shows the changes in current command value S1, whose peak value is 35A. (b) shows a waveform at a time when the first direct-current power supply E1 voltage is 80 V and the second direct-current power supply E2 voltage is 0 V, (c) shows a waveform at a time when the first direct-current power supply E1 voltage is 80 V and the second direct-current power supply E2 voltage is 15 V, and (d) shows a waveform at a time when the first direct-current power supply E1 voltage is 80 V and the second direct-current power supply E2 voltage is 30 V. These diagrams indicate that while there were ripples 604 of nearly 16A when the voltage of the second direct-current power supply E2 was 0, i.e., in the conventional apparatus wherein the second direct-current power supply E2 was absent, ripples are extremely smaller as in (c) where ripples 605 are 7A when the voltage of the second direct-current power supply E2 is 15 V and as in (d) where ripples 606 are 2A when the voltage of the second direct-current power supply E2 is 30 V.

Figure 42:
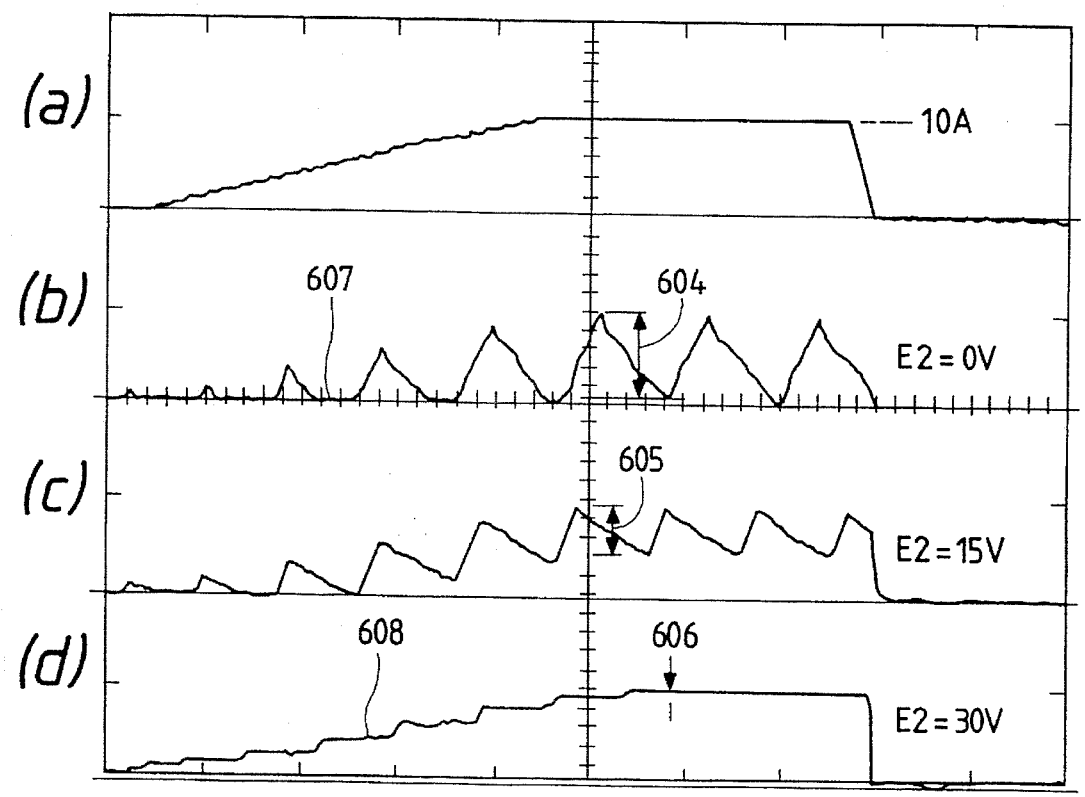
FIG. 42 are waveform diagrams used to describe an actual operation concerned with the thirteenth embodiment of the present invention.

Also, FIG. 42 gives waveform diagrams wherein actual output currents were measured when the peak value of the current command value S1 is 10A in the apparatus concerned with this thirteenth embodiment. (a) shows the changes in current command value S1, whose peak value is 10A. (b) shows a waveform at a time when the first direct-current power supply E1 voltage is 80 V and the second direct-current power supply E2 voltage is 0 V, (c) shows a waveform at a time when the first direct-current power supply E1 voltage is 80 V and the second direct-current power supply E2 voltage is 15 V, and (d) shows a waveform at a time when the first direct-current power supply E1 voltage is 80 V and the second direct-current power supply E2 voltage is 30 V. These diagrams indicate that while there were ripples 604 of nearly 10A when the voltage of the second direct-current power supply E2 was 0, ripples are extremely smaller as in (c) where ripples 605 are 5A when the voltage of the second direct-current power supply E2 is 15 V and as in (d) where ripples 606 are almost zeroed when the voltage of the second direct-current power supply E2 is 30 V.

Especially in (b) wherein the output current value is zero on a leading edge 607 of the current, electrical discharge machining carried out with such a waveform will stop the electrical discharge generated, disallowing the current waveform of the command value (a) from being output. Meanwhile, when the second direct-current power supply E2 is 30 V, the current waveform similar to the command value can be provided as indicated by 608 and the ripples are nearly zero as indicated by 606. Whereas 30 V was chosen for the second direct-current power supply E2 herein, there are the third switching device 501, the diode 502, the direct-current resistance value of the reactor 203 and the ON voltage of the second switching device 211, and therefore a voltage having a value obtained by subtracting said ON voltage from the 30 V of the second direct-current power supply E2 will actually be the direct-current voltage source which causes the current to flow to the voltage across the electrode 1 and the workpiece 2. It is to be understood that the anticipated object can be achieved if the voltage supplied to the machining gap by the second direct-current power supply E2 if it is about 1 to 2 V higher than the electrical discharge voltage.

Figure 43:
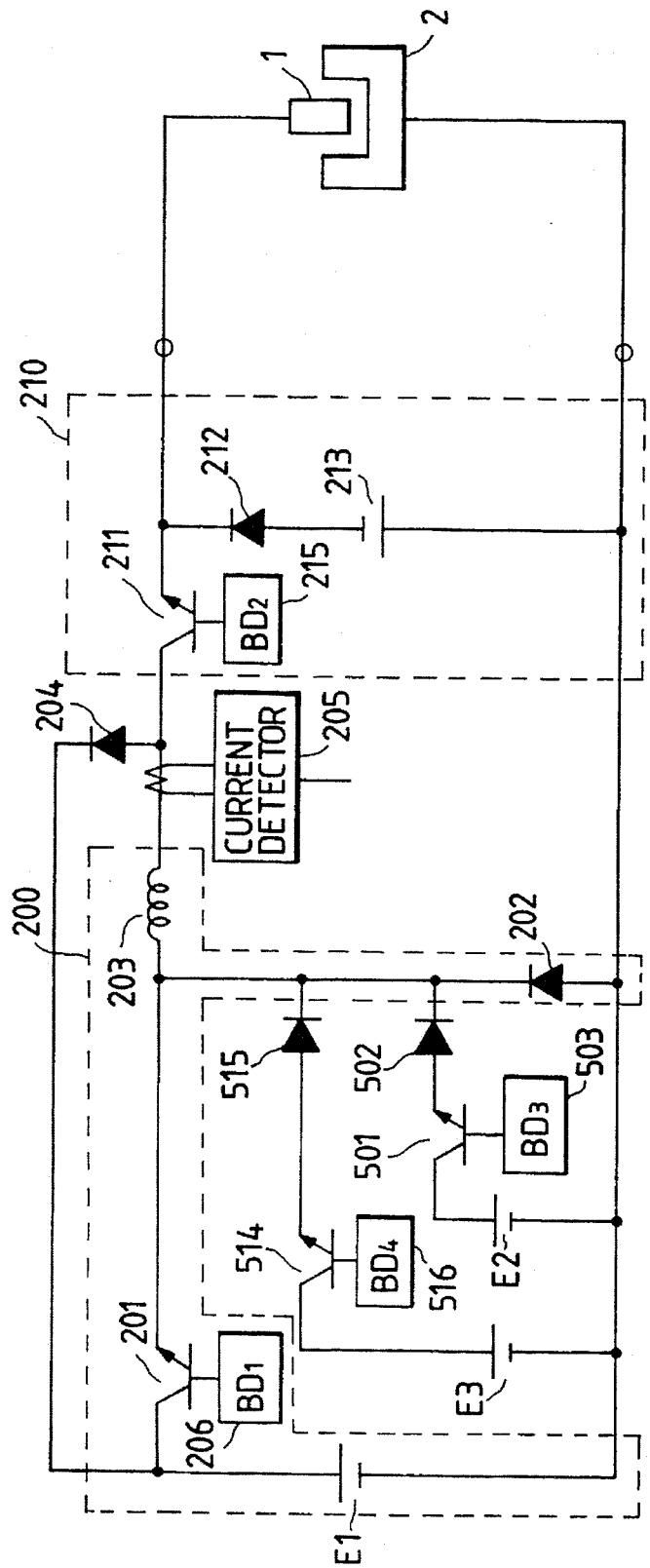
FIG. 43 is a main circuit diagram illustrating a fourteenth embodiment of the present invention.

A fourteenth embodiment of the present invention will now be described with reference to FIGS. 43 to 45. FIG. 43 is a main circuit diagram concerned with the fourteenth embodiment, wherein E1 indicates a first direct-current power supply, 201 designates a first switching device which is switched on/off by the gate drive circuit 206. The reactor 203 is connected between the first switching device 201 and the second switching device 211, and the electrode 1 and the workpiece 2 are connected to the second switching device 211 and the first direct-current power supply E1. The first diode 202 is connected between the connection point of the first switching device 201 and the reactor 203 and the first direct-current power supply E1, and the second diode 204 is connected between the connection point of the first direct-current power supply E1 and the first switching device 201 and the connection point of the reactor 203 and the second switching device 211 in a direction in which the current flows to the first direct-current power supply E1.

A series connection of the third diode 212 and the direct-current power supply 213 is connected between the electrode side of the second switching device 211 and the negative voltage side of the first direct-current power supply E1. The current detector 205 is connected to detect the current flowing in the reactor 203. A series connection of the second direct-current power supply E2 having a voltage capable of supplying the machining gap with a voltage substantially equal to or lower than the electrical discharge voltage, the third switching device 501 and the diode 502 is connected in parallel with said first diode 202. This third switching device 501 is switched on/off by the gate drive circuit 503. A series connection of a third direct-current power supply E3 having a voltage capable of supplying the machining gap with a voltage higher than the electrical discharge voltage and lower than a voltage supplied by said first direct-current power supply, a fourth switching device 514 and a diode 515 is connected in parallel with said first diode 202. This fourth switching device 514 is switched on/off by a gate drive circuit 516.

Figure 44:
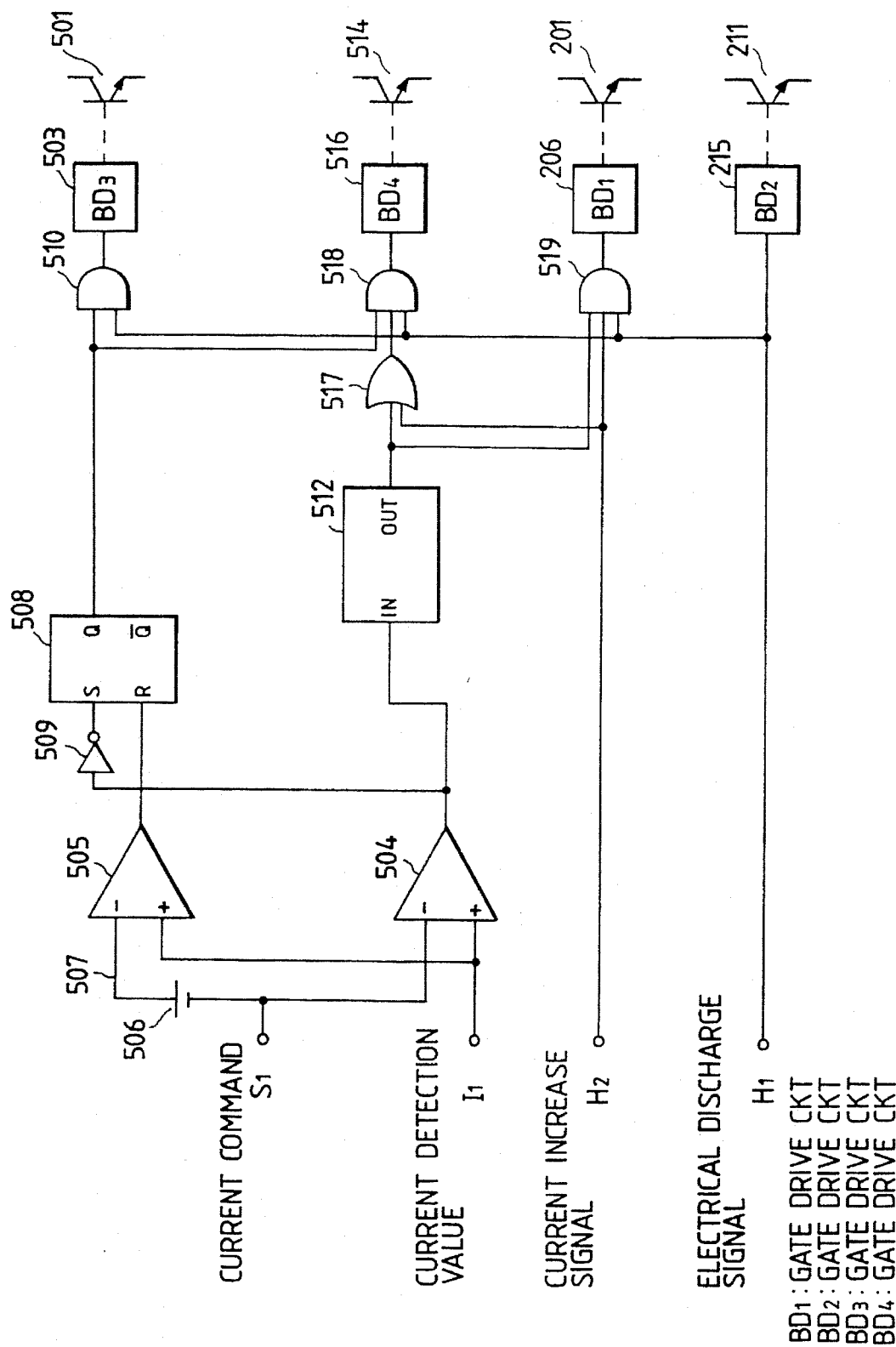
FIG. 44 is a circuit diagram illustrating a control circuit concerned with the fourteenth embodiment of the present invention.

FIG. 44 shows a control circuit of the gate drive circuits 503, 516, 206, 215 shown in FIG. 43, wherein the first comparator 504 compares the current command value S1 with the current detection value I1 of the current detector 205 and outputs a signal to the input terminal of the timer circuit 512. The second comparator 505 compares the overcurrent command value 507 provided by connecting the direct-current voltage 506 in series with the current command value S1 with the current detection value I1 of the current detector 205 and outputs a signal to the reset terminal R of the first flip-flop 508. The output signal of said first comparator 504 is inverted by the inverter 509 and the result of inversion is connected to the set terminal S of the first flip-flop 508.

Meanwhile, the electrical discharge signal H1 switches the second switching device 211 on/off under the control of the gate drive circuit 215. The AND condition of a current increase signal H2, the output of the timer circuit 512 and the electrical discharge signal H1 is fetched by an AND circuit 519 to switch the first switching device 201 on/off under the control of the gate drive circuit 206. The AND condition of the output of an OR circuit 517 which provides the OR condition of the current increase signal H2 and the output of the timer circuit 512, the electrical discharge signal H1 and the output of the first flip-flop 508 is fetched by an AND circuit 518 to switch the fourth switching device 514 on/off under the control of the gate drive circuit 516. Also, the AND condition of the electrical discharge signal H1 and the output of the first flip-flop 508 is fetched by the AND circuit 510 to switch the third switching device 501 on/off under the control of the gate drive circuit 503.

Figure 45:
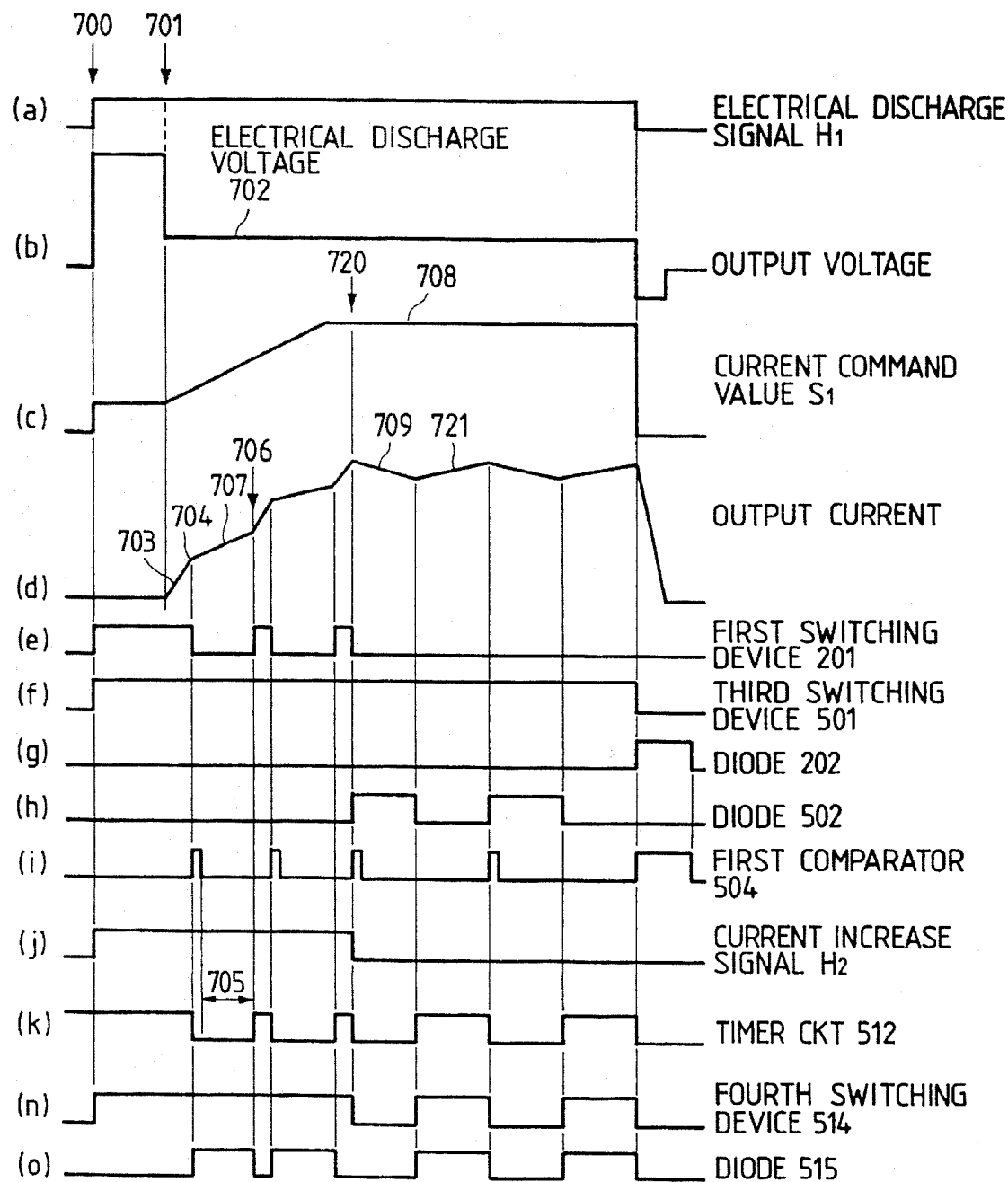
FIG. 45 are waveform diagrams and timing charts used to describe a main operation concerned with the fourteenth embodiment of the present invention.

Timing charts and waveform diagrams shown in FIG. 45 show the operation of this fourteenth embodiment. In FIG. 45, (a) shows the electrical discharge signal H1, (b) shows the output voltage waveform, (c) shows the waveform of the current command value S1 output from a control apparatus (not shown) of the electrical discharge machine, (d) shows the output current waveform, (e) shows the ON/OFF status of the first switching device 201, (f) shows the ON/OFF status of the third switching device 501, (g) shows the current passage status of the diode 202, (h) shows the current passage status of the diode 502, (i) shows the output status of the first comparator 504, (j) shows the current increase signal H2, (k) shows the output status of the timer circuit 512, (n) shows the ON/OFF status of the fourth switching device 514, and (o) shows the current passage status of the diode 515.

When the electrical discharge signal H1 is switched on at a point 700 in FIG. 45(a), the second switching device 211 is switched on by the gate drive circuit 215. The current increase signal H2 is also switched on at the point 700. Since the first switching device 201 in FIG. 43 is switched on at this time as shown in (e), the voltage of the first direct-current power supply E1 is applied to between the electrode 1 and the workpiece 2 as a no-load voltage, as shown in (b). The gap between the electrode 1 and the workpiece 2 is filled with the dielectric fluid, such as oil or water, and is controlled extremely precisely by a servo mechanism, a numerical control apparatus, etc., (not shown). When dielectric breakdown occurs at that extremely small gap, an electrical discharge is generated between the electrode 1 and the workpiece 2. This is indicated by 701 in FIG. 45(a) and the output voltage in (b) serves as the electrical discharge voltage 702. This electrical discharge voltage is almost constant between approximately 25 and 30 volts. As soon as the electrical discharge occurs, the current begins to flow between the electrode 1 and the workpiece 2. The current indicated by 703 in (d) flows through the first direct-current power supply E1, the first switching device 201, the reactor 203 and the second switching device 211, and rises rapidly because the first direct-current power supply E1 voltage of approximately 80 volts is higher than the electrical discharge voltage 702.

When the output current, i.e., the current of the reactor 203, has reached the current command value S1, the output of the first comparator 504 is switched high at a point 704 as shown in (i). Accordingly, the output of the timer circuit 512 shown in (k) is switched low and the first switching device 201 is switched off as shown in (e). When the output of the first comparator 504 is switched low, the output of the timer circuit 512 is switched low only for a preset length of time indicated by 705 in (k) and is then switched high, whereby the first switching device 201 is switched on again.

During this preset time of the timer circuit 512, i.e., the period 705 when the first switching device 201 is off, the fourth switching device 514 shown in FIG. 45(n) is already on, whereby the current is supplied from the third direct-current power supply E3 to between the electrode 1 and the workpiece 2 through the fourth switching device 514 already switched on, the diode 515, the reactor 203 and the second switching device 211. Since the third direct-current power supply E3 is set in voltage to be little by little higher than the electrical discharge voltage 702, the output current increases slightly as indicated by 707 in (d). This is due to the slight increase of the current because the terminal voltage of the reactor 203 is slightly high. This is repeated to cause the output current to follow up the current command value S1 as shown in (d).

When the current increase signal H2 in (j) is switched low at a point 720 in (c) of FIG. 45 where the current command value S1 that was rising reaches a certain value, the output current decreases slowly as indicated by 709 because the third switching device 501 is on, but since the third direct-current power supply E3 is connected when the fourth switching device 514 is switched on, the output current also increases slowly as indicated by 721. Since the time of decrease indicated by 709 at this time is the set time of the timer circuit 512 as at 707 and the current increases slowly, the switching frequency is about twice the period of this 709, the ripples of the output current are small, and the switching frequency is low. Hence, a power supply apparatus for an electrical discharge machine can be arranged which provides an output current waveform with a few ripples if the inductance value of the reactor 203 is small. Particularly when the current increase signal H2 is switched on to increase the current command value, the current is supplied by the third direct-current power supply E3 to keep the output current increasing if the first switching device 201 is switched off, whereby a power supply apparatus for an electrical discharge machine can be arranged which provides an output current waveform with a few ripples.

Figure 46:
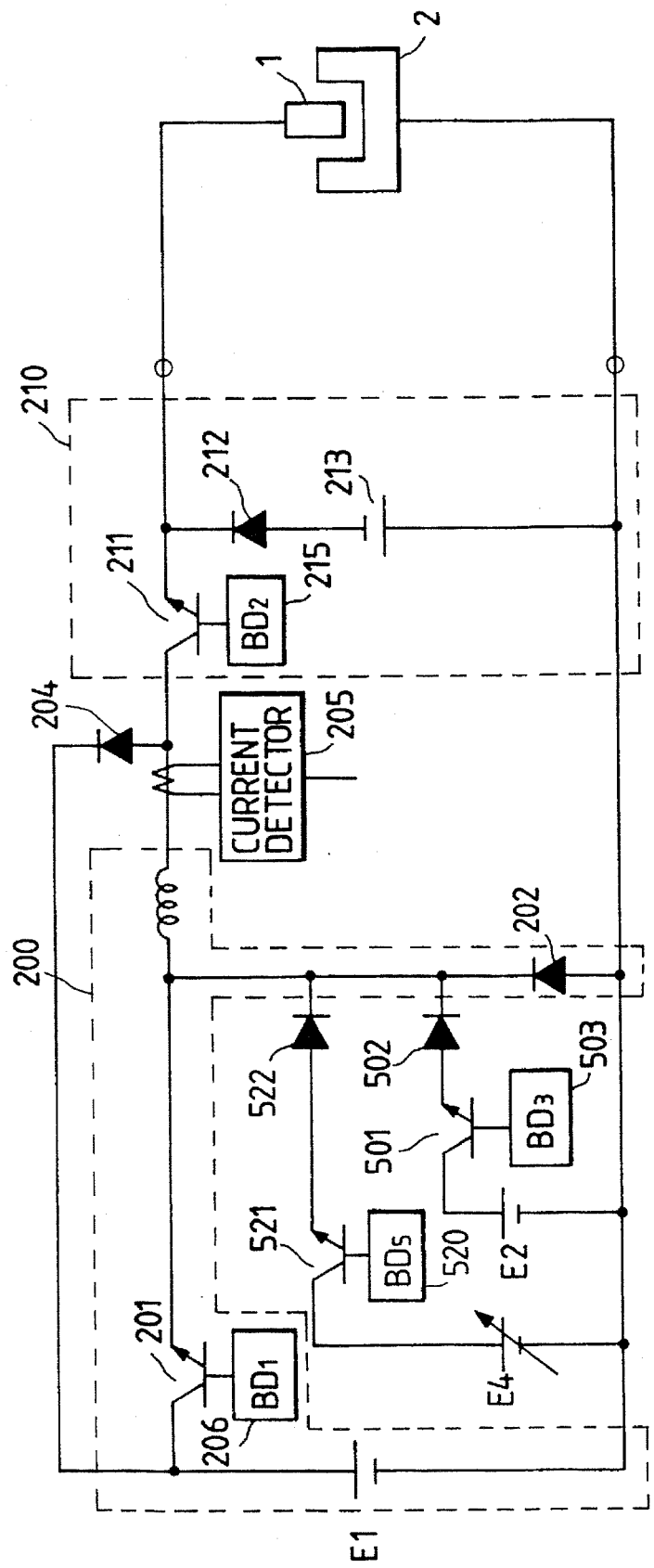
FIG. 46 is a main circuit diagram illustrating a fifteenth embodiment of the present invention.

A fifteenth embodiment of the present invention will now be described with reference to FIGS. 46 to 48. FIG. 46 is a main circuit diagram concerned with the fifteenth embodiment, wherein E1 indicates a first direct-current power supply, 201 designates a first switching device which is switched on/off by the gate drive circuit 206. The reactor 203 is connected between the first switching device 201 and the second switching device 211, and the electrode 1 and the workpiece 2 are connected to the second switching device 211 and the first direct-current power supply. The first diode 202 is connected between the connection point of the first switching device 201 and the reactor 203 and the first direct-current power supply E1, and the second diode 204 is connected between the connection point of the first direct-current power supply E1 and the first switching device 201 and the connection point of the reactor 203 and the second switching device 211 in a direction in which the current flows to the first direct-current power supply E1.

A series connection of the third diode 212 and the direct-current power supply 213 is connected between the electrode 1 side of the second switching device 211 and the negative voltage side of the first direct-current power supply E1. The current detector 205 is connected to detect the current flowing in the reactor 203. A series connection of the second direct-current power supply E2 having a voltage capable of supplying the machining gap with a voltage substantially equal to or lower than the electrical discharge voltage, the third switching device 501 and the diode 502 is connected in parallel with said first diode 202. This third switching device 501 is switched on/off by the gate drive circuit 503. A series connection of a variable fourth direct-current power supply E4, a fifth switching device 521 and a diode 522 is connected in parallel with said first diode 202. This fifth switching device 521 is switched on/off by a gate drive circuit 520.

Figure 47:
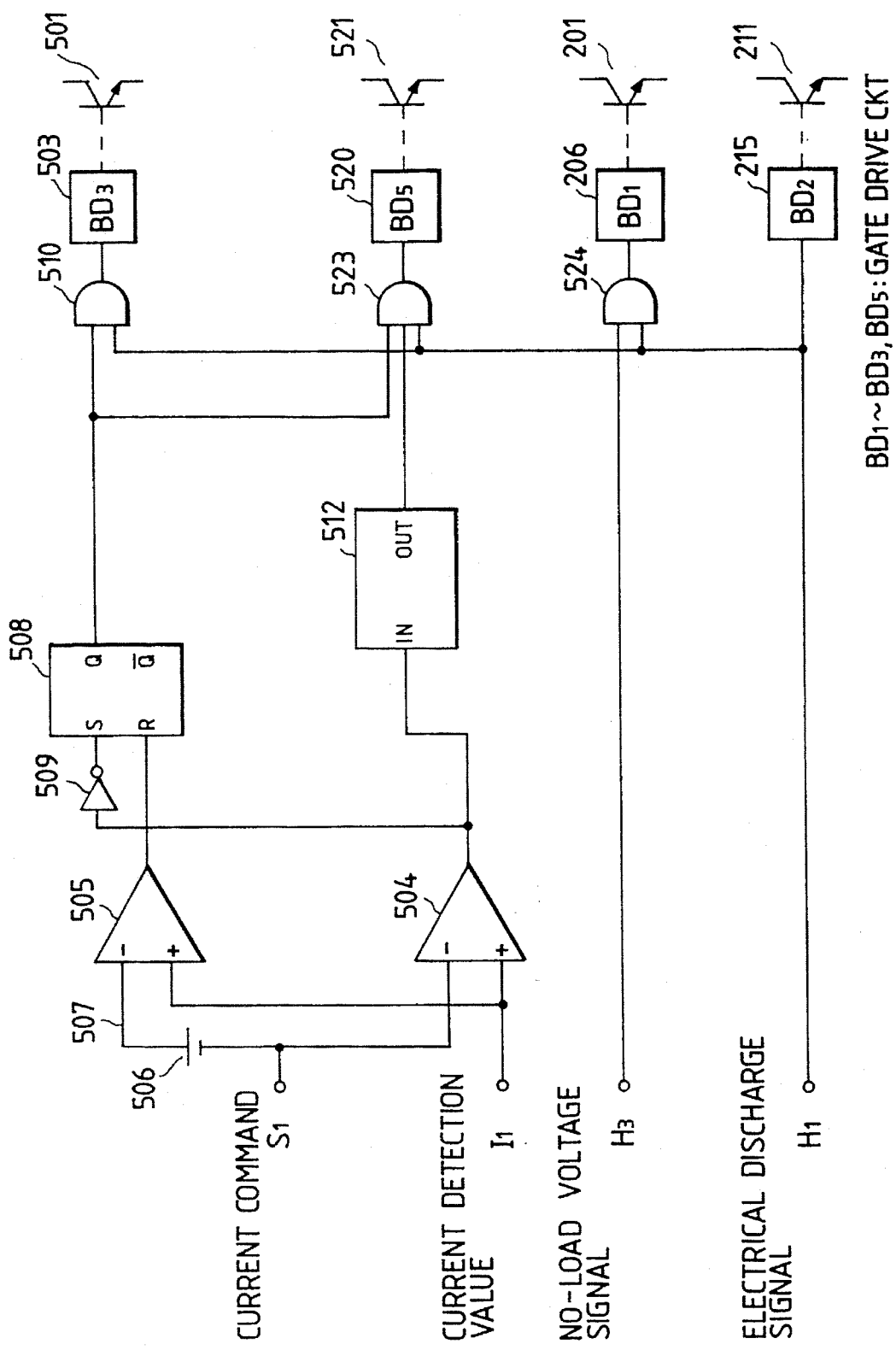
FIG. 47 is a circuit diagram illustrating a control circuit concerned with the fifteenth embodiment of the present invention.

FIG. 47 shows a control circuit of the gate drive circuits 503, 520, 206, 215 shown in FIG. 46, wherein the first comparator 504 compares the current command value S1 and the current detection value I1 of the current detector 205 and outputs a signal to the input terminal of the timer circuit 512. The second comparator 505 compares the overcurrent command value 507 provided by connecting the direct-current voltage 506 in series with the current command value S1 with the current detection value I1 of the current detector 205 and outputs a signal to the reset terminal R of the first flip-flop 508. The output signal of said first comparator 504 is inverted by the inverter 509 and the result of inversion is connected to the set terminal S of the first flip-flop 508.

In the meantime, the electrical discharge signal H1 switches the second switching device 211 on/off under the control of the gate drive circuit 215. The AND condition of a no-load voltage signal H3 and the electrical discharge signal H1 is fetched by an AND circuit 524 to switch the first switching device 201 on/off under the control of the gate drive circuit 206. The AND condition of the output of the timer circuit 512, the electrical discharge signal H1 and the output of the first flip-flop 508 is fetched by an AND circuit 523 to switch the fifth switching device 521 on/off under the control of the gate drive circuit 520. Also, the AND condition of the electrical discharge signal H1 and the output of the first flip-flop 508 is fetched by the AND circuit 510 to switch the third switching device 501 on/off under the control of the gate drive circuit 503.

Figure 48:
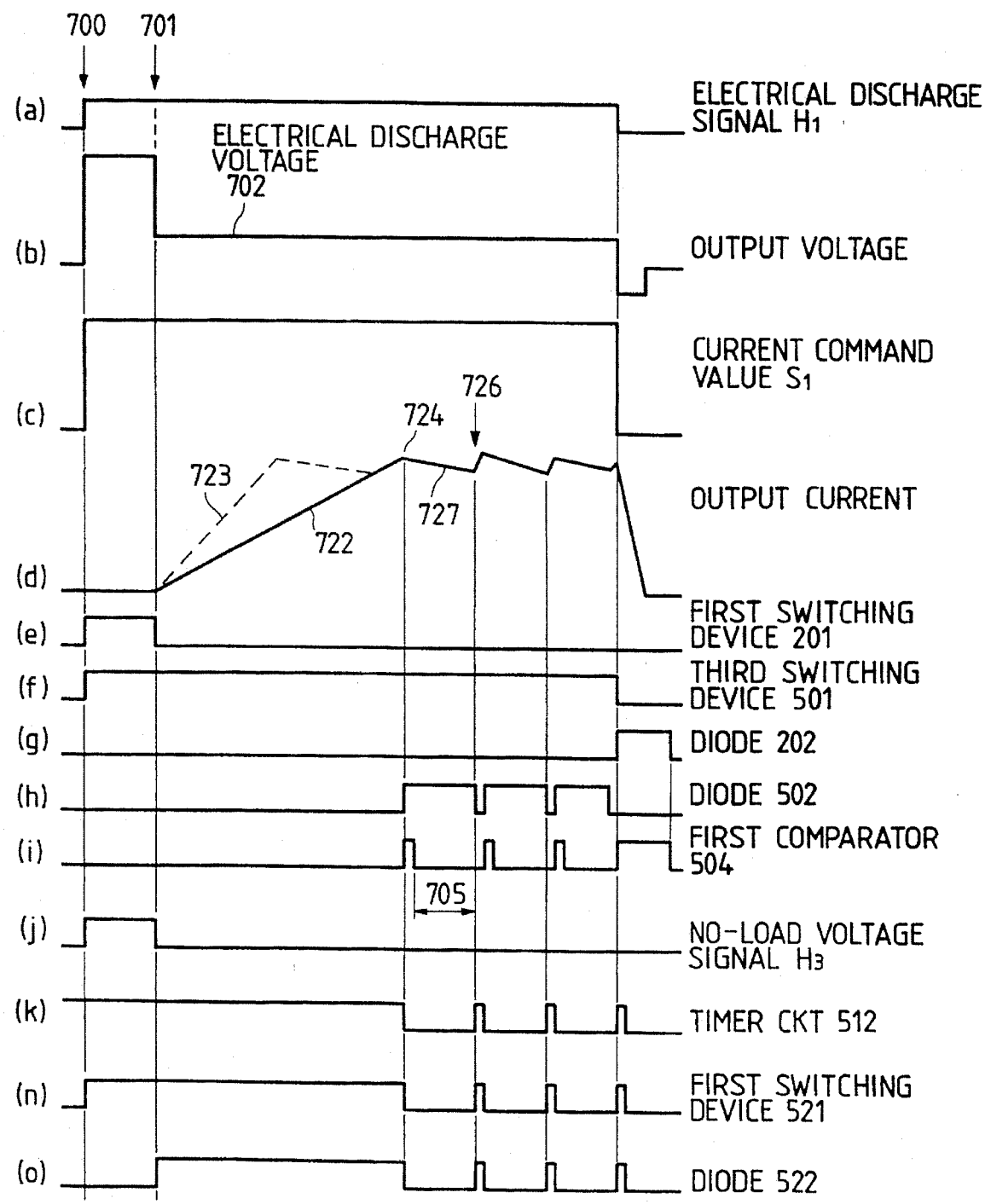
FIG. 48 are waveform diagrams and timing charts used to describe a main operation concerned with the fifteenth embodiment of the present invention.

Timing charts and waveform diagrams shown in FIG. 48 show the operation of this fifteenth embodiment. In FIG. 48, (a) shows the electrical discharge signal H1, (b) shows the output voltage waveform, (c) shows the waveform of the current command value S1 output from a control apparatus (not shown) of the electrical discharge machine, (d) shows the output current waveform, (e) shows the ON/OFF status of the first switching device 201, (f) shows the ON/OFF status of the third switching device 501, (g) shows the current passage status of the diode 202, (h) shows the current passage status of the diode 502, (i) shows the output status of the first comparator 504, (j) shows the no-load voltage signal H3, (k) shows the output status of the timer circuit 512, (n) shows the ON/OFF status of the fifth switching device 521, and (o) shows the current passage status of the diode 522.

When the electrical discharge signal H1 is switched on at a point 700 in FIG. 48(a), the second switching device 211 is switched on by the gate drive circuit 215. The no-load voltage signal H3 is also switched on at the point 700. Since the first switching device 201 in FIG. 46 is switched on at this time as shown in (e), the voltage of the first direct-current power supply E1 is applied to between the electrode 1 and the workpiece 2 as a no-load voltage, as shown in (b). The current command value S1 in the present embodiment may also have a waveform which commands only the peak of the electrical discharge current as shown in (c).

The gap between the electrode 1 and the workpiece 2 is filled with the dielectric fluid, such as oil or water, and is controlled extremely precisely by a servo mechanism, a numerical control apparatus, etc., (not shown). When dielectric breakdown occurs at that extremely small gap, an electrical discharge is generated between the electrode 1 and the workpiece 2. This is indicated by 701 in FIG. 48 and the output voltage in (b) acts as the electrical discharge voltage 702. This electrical discharge voltage is almost constant between approximately 25 and 30 volts. As soon as the electrical discharge occurs, the current begins to flow between the electrode 1 and the workpiece 2, and the no-load voltage signal H3 is switched low as shown in (j). Accordingly, the first switching device 201 is switched off as shown in (e).

Since the output current indicated by 722 in (d) flows through the fourth direct-current power supply E4, the fifth switching device 521, the reactor 203 and the second switching device 211 and the fourth direct-current power supply E4 is at the preset voltage (approximately 25 to 100 volts), the output current increases on the leading edge of the output current indicated by 722 in (d) which is determined by a differential voltage between the voltage of the fourth direct-current power supply E4 and the voltage across the electrode 1 and the workpiece 2 and the inductance value of the reactor 203. At 723 in (d) which indicates that the voltage of the fourth direct-current power supply E4 has been increased, changing the voltage of the fourth direct-current power supply E4 provides the output current leading edge of a desired slope. Also, since this leading edge of the output current has no ripples, even a low-level output current is not zeroed to ensure stable electrical discharge machining.

Subsequently, when the output current, i.e., the current of the reactor 203, has reached the current command value S1, the output of the first comparator 504 is switched high at a point 724 as shown in (i). Accordingly, the output of the timer circuit 512 shown in (k) is switched low and the fifth switching device 521 is switched off as shown in (n). When the output of the first comparator 504 is switched low, the output of the timer circuit 512 is switched low only for a preset length of time indicated by 705 in (k).

During this preset time of the timer circuit 512, i.e., the period 705 when the fifth switching device 521 is off, the third switching device 501 shown in (n) is already on, whereby the current is supplied from the second direct-current power supply E2 to between the electrode 1 and the workpiece 2 through the third switching device 501, the diode 502 and the reactor 203. Since the second direct-current power supply E2 is set in voltage to be slightly lower than the electrical discharge voltage 702, the output current decreases little by little as indicated by 727 in (d). Then, the output of the timer circuit 512 is switched high at a point 726, whereby the fifth switching device 521 is switched on again to increase the current. This is repeated to cause the output current to follow up the current command value S1 as shown in (d).

According to this fifteenth embodiment, the output current increases on a certain slope as indicated by 722 and 723 during the increase of the current to provide no ripples, and the fifth switching device 521 is kept on during this period so that no switching is required. After reaching the command value, the output current decreases slowly as indicated by 727, the time of decrease indicated by 727 is the set time of the timer circuit 512 indicated by 705, the switching frequency is about the period of this 705, the ripples of the output current are small, and the switching frequency is low. Hence, a power supply apparatus for an electrical discharge machine can be arranged which provides an output current waveform with a few ripples if the inductance value of the reactor 203 is small.

Figure 49:
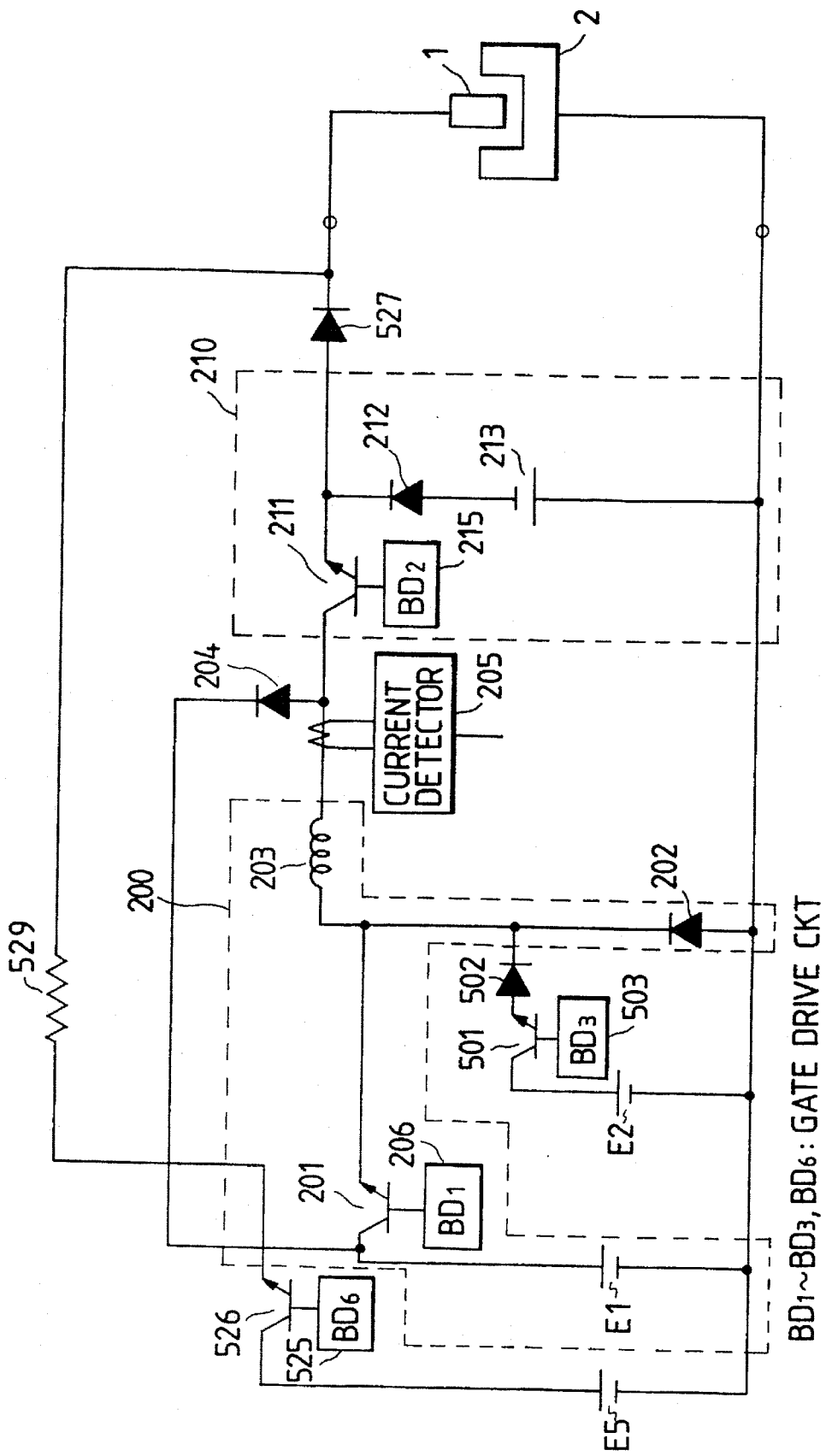
FIG. 49 is a main circuit diagram illustrating a sixteenth embodiment of the present invention.

A sixteenth embodiment of the present invention will now be described with reference to FIGS. 49 to 51. FIG. 49 is a main circuit diagram concerned with the sixteenth embodiment, wherein a series connection of a fifth direct-current power supply E5, a sixth switching device 526 and a resistor 529 is connected in parallel with the machining gap formed by the electrode 1 and the workpiece in the thirteenth embodiment. The second switching device 211 is provided with a diode 527 for inverse current prevention. The fifth direct-current power supply E5 should have a voltage capable of supplying the machining gap with a voltage higher than said first direct-current power supplies. It is to be understood that 525 indicates a gate drive circuit of the switching device 526.

Figure 50:
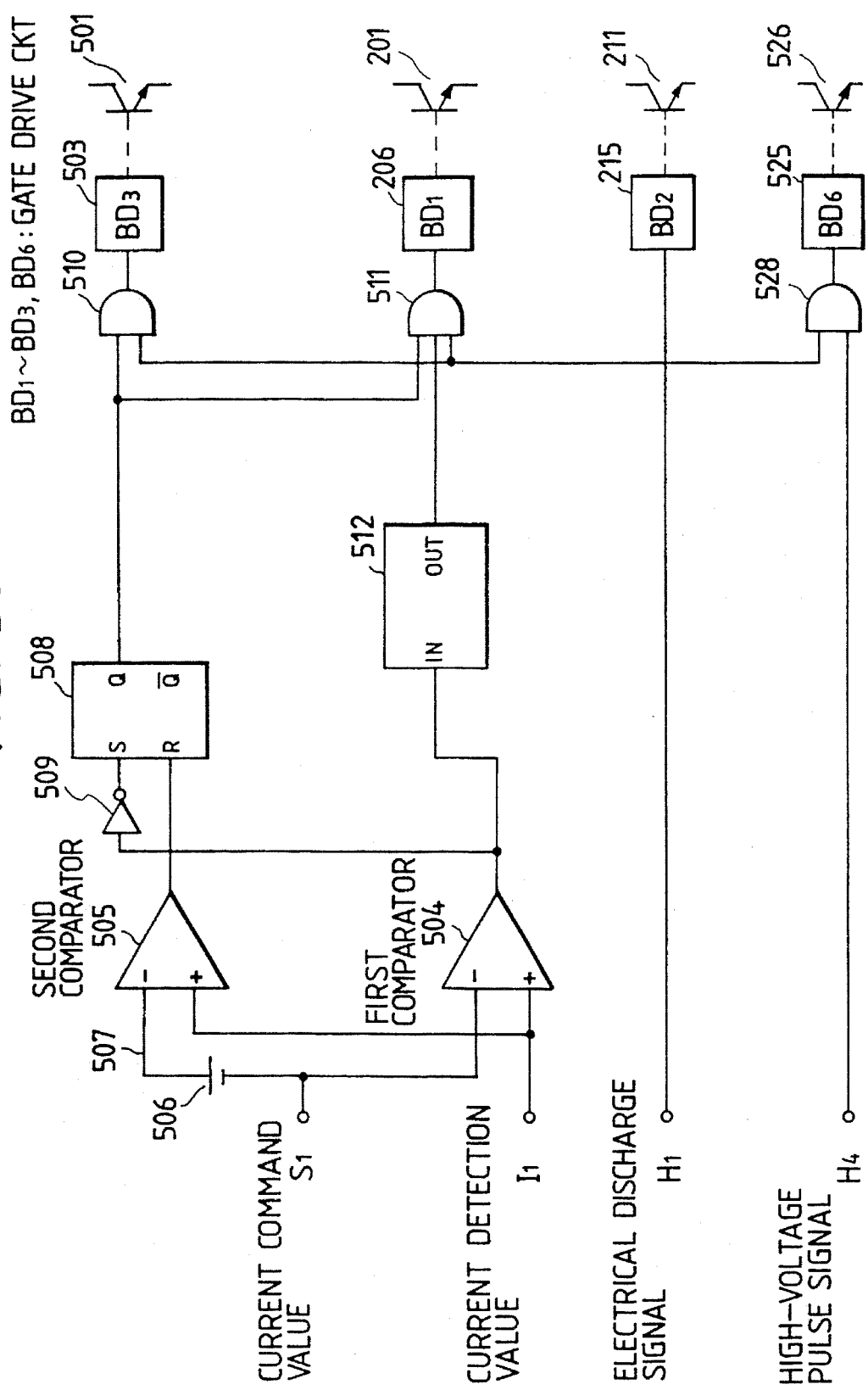
FIG. 50 is a circuit diagram illustrating a control circuit concerned with the sixteenth embodiment of the present invention.

FIG. 50 shows a control circuit of the gate drive circuits 503, 206, 215, 525 shown in FIG. 49, wherein the AND condition of a high-voltage pulse signal H4 and the electrical discharge signal H1 is fetched by an AND circuit 528 to switch the sixth switching device 526 on/off under the control of the gate drive circuit 525 in the control circuit shown in FIG. 34 concerned with the thirteenth embodiment. It is to be understood that the other arrangement is identical to that of the control circuit shown in FIG. 34 concerned with the thirteenth embodiment, and will not be described here.

Figure 51:
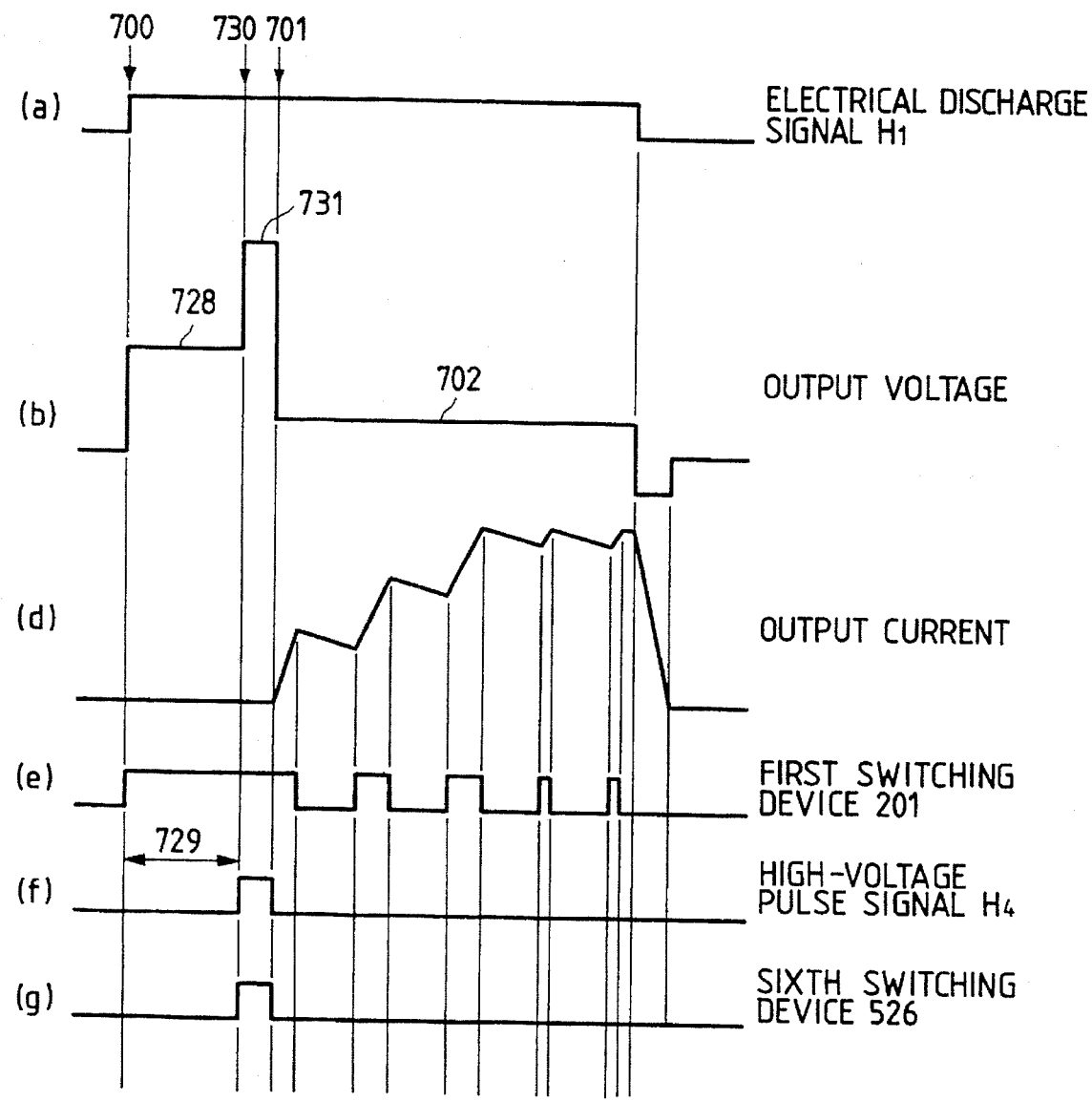
FIG. 51 are waveform diagrams and timing charts used to describe a main operation concerned with the sixteenth embodiment of the present invention.

Timing charts and waveform diagrams shown in FIG. 51 show the operation of this sixteenth embodiment. In FIG. 51, (a) shows the electrical discharge signal H1, (b) shows the output voltage, (d) shows the output current, (e) shows the ON/OFF status of the first switching device 201, (f) shows the high-voltage pulse signal, and (g) shows the ON/OFF status of the sixth switching device 526. When the electrical discharge signal H1 is switched on at a point 700 in FIG. 51(a), the switching device 211 is switched on by the gate drive circuit 215. Since the switching device 201 in FIG. 49 is switched on at this time as shown in (e), the voltage of the first direct-current power supply E1 is applied to between the electrode 1 and the workpiece 2 as a no-load voltage, as indicated by 728 in (b).

The gap between the electrode 1 and the workpiece 2 is filled with the dielectric fluid, such as oil or water, and is controlled extremely precisely by a servo mechanism, a numerical control apparatus, etc., (not shown). When dielectric breakdown occurs at that extremely small gap, an electrical discharge is generated between the electrode 1 and the workpiece 2. Rarely, however, the electrical discharge does not take place readily, resulting in an instable electrical discharge machining state.

To prevent this, if the electrical discharge does not occur within time 729 after the electrical discharge signal H1 has turned on, the high-voltage pulse signal H4 is provided as shown in (f) at a point 730 to switch on the sixth switching device 526 in (g), thereby outputting the voltage of the fifth direct-current power supply E5. This voltage is indicated by 731 in (b). The actual voltage of the fifth direct-current power supply E5 is as high as 150 to 300 volts.

When the electrical discharge is generated, the high-voltage pulse H4 is switched low at a point 701 to switch off the sixth switching device 526, whereby the voltage of the first direct-current power supply E1 is connected between the electrode 1 and the workpiece by the first switching device 201 which has already switched on, and the output current increases. The instant that this electrical discharge occurs, a current flows in the resistor 529 but the resistor 529 consumes virtually no power because the sixth switching device 526 turns off immediately. Since this direct-current power supply E5 voltage of 150 to 300 volts is higher than the first direct-current power supply E1 voltage of 80 volts, the electrical discharge takes place reliably, stabilizing the electrical discharge machining. It is to be understood that the other operations are identical to those of the thirteenth embodiment and therefore will not be described here.

While the present sixteenth embodiment was described by using the apparatus wherein the series connection of the fifth direct-current power supply E5, the sixth switching device 526 and the resistor 529 was connected in parallel with the machining gap formed by the electrode 1 and the workpiece 2 in the thirteenth embodiment, the series connection of the fifth direct-current power supply E5, the sixth switching device 526 and the resistor 529 may be connected in parallel with the machining gap formed by the electrode 1 and the workpiece 2 in the fourteenth or the fifteenth embodiment to produce the same effects. In this case, it is needless to mention that the fifth direct-current power supply E5 is set in voltage to be higher than the other direct-current power supplies E1, E2, E3, E4.

Figure 52:
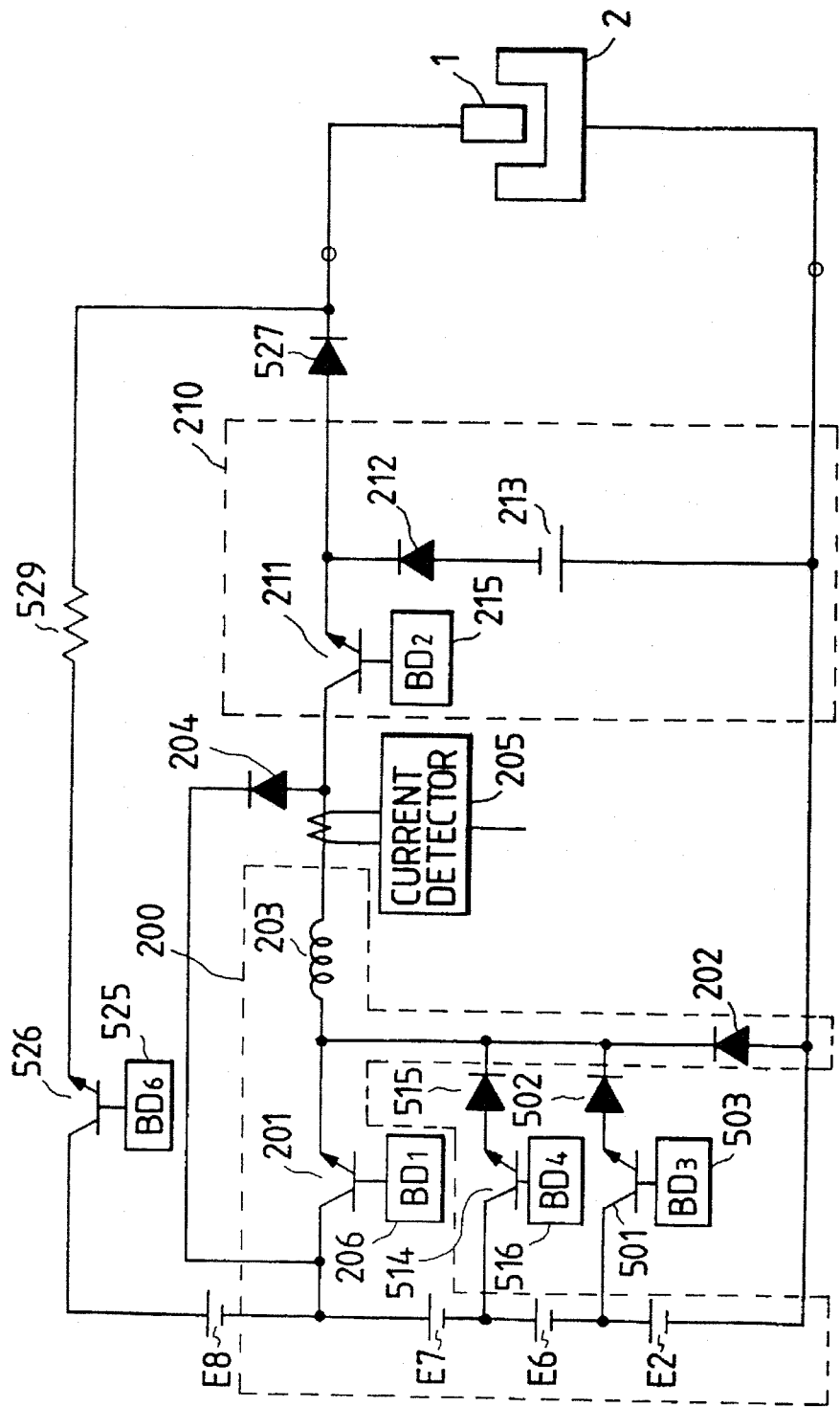
FIG. 52 a main circuit diagram illustrating a seventeenth embodiment of the present invention.

A seventeenth embodiment of the present invention will now be described with reference to FIG. 52. FIG. 52 is a main circuit diagram concerned with the seventeenth embodiment, wherein said second direct-current power supply E2, a sixth direct-current power supply E6, a seventh direct-current power supply E7 and an eighth direct-current power supply E8 are connected in series, one end of the series connection of the third switching device 501 and the diode 502 is connected to the connection point of the second direct-current power supply E2 and the sixth direct-current power supply E6, and the other end thereof is connected to the connection point of the reactor 203 and the diode 202. Also, one end of the series connection of the fourth switching device 514 and the diode 515 is connected to the connection point of the sixth direct-current power supply E6 and the seventh direct-current power supply E7, and the other end thereof is connected to the connection point of the reactor 203 and the diode 202. Also, one end of the first switching device 201 is connected to the connection point of the seventh direct-current power supply E7 and the eighth direct-current power supply E8, and the other end thereof is connected to the connection point of the reactor 203 and the diode 202. Further, one end of the series connection of the sixth switching device 526 and the resistor 529 is connected to one end of the eighth direct-current power supply E8 and the other end thereof is connected to the electrode 1 (or the workpiece 2). It is to be understood that 527 indicates a diode in FIG. 52.

Accordingly, in the thirteenth, the fourteenth and the sixteenth embodiments, since the relationship of the first, second, third and fifth direct-current power supplies E1, E2, E3, E5 voltages to the electrical discharge voltage is E5>E1>E3≧electrical discharge voltage≧E2, the voltage of the sixth direct-current power supply E6 may be defined as E3–E2, that of the seventh direct-current power supply E7 as E1–E6–E2, and that of the eighth direct-current power supply E8 as E5–E7–E6–E2=E5–E1. Specifically, the E2, E6, E7, and E8 direct-current voltages are approximately 20 to 30 volts, 5 to 15 volts, 40 to 60 volts, and 70 to 230 volts, respectively, and the direct-current power supplies used have low voltages and the power supplies can be employed efficiently.

When it is desired to perform the operation of the thirteenth embodiment in the present embodiment, the fourth switching device 514 and the six switching device 526 may be switched off and the first switching device 201 and the third switching device 501 controlled on/off as in the thirteenth embodiment. Also, when it is desired to perform the operation of the fourteenth embodiment, the sixth switching device 526 may be switched off and the first switching device 201, the third switching device 501 and the fourth switching device 514 controlled on/off as in the fourteenth embodiment. Further, when it is desired to perform the operation of the sixteenth embodiment, the fourth switching device 514 may be switched off and the first switching device 201, the third switching device 501 and the sixth switching device 526 controlled on/off as in the sixteenth embodiment. Since the details of these operations will be understood easily in the operational explanations already given, they will not be described here.

Figure 53:
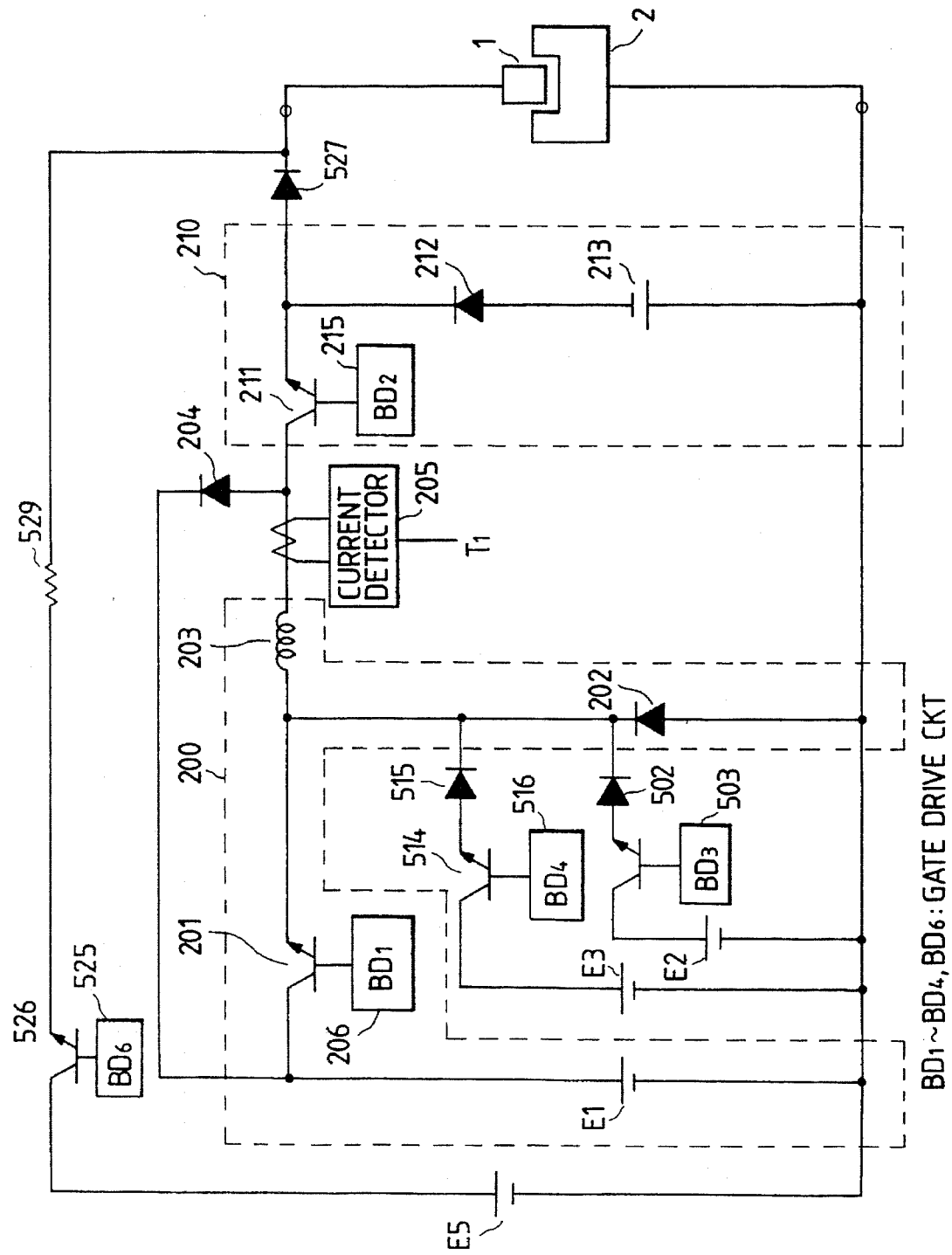
FIG. 53 is a main circuit diagram illustrating an eighteenth embodiment of the present invention.
Figure 54:
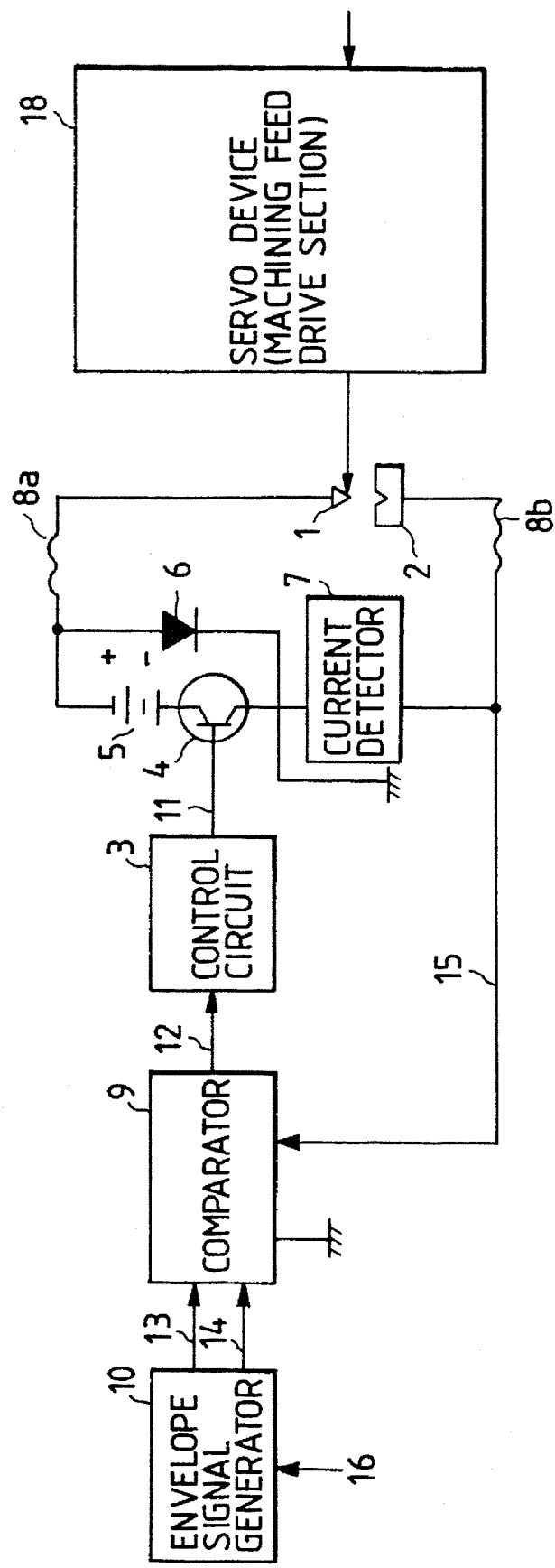
FIG. 54 is a circuit diagram illustrating a first conventional art.
Figure 55:
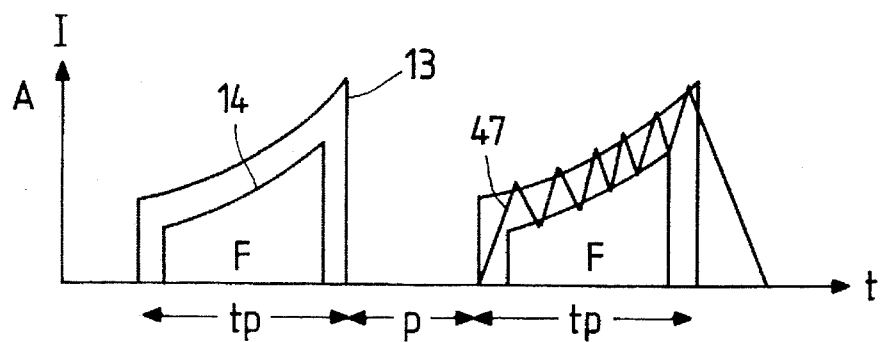
FIG. 55 is a current waveform diagram generated by the circuit in FIG. 54.
Figure 56:
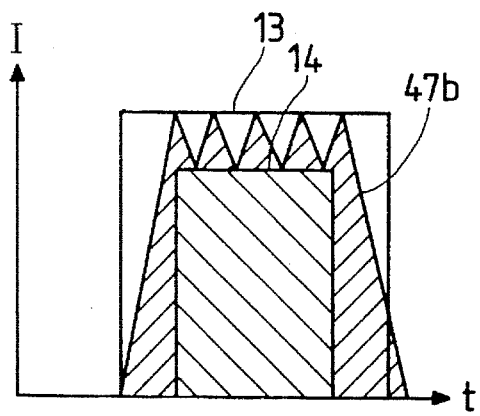
FIG. 56 is a current waveform diagram used to describe the disadvantages of the first conventional art.
Figure 57:
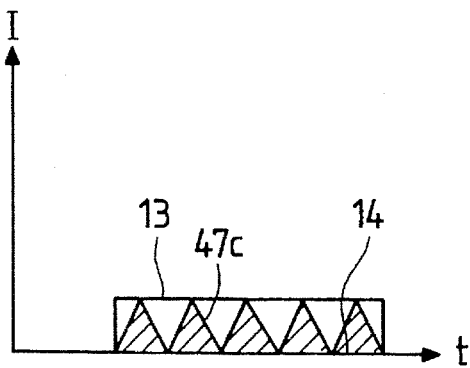
FIG. 57 is a current waveform diagram used to describe the disadvantages of the first conventional art.
Figure 58:
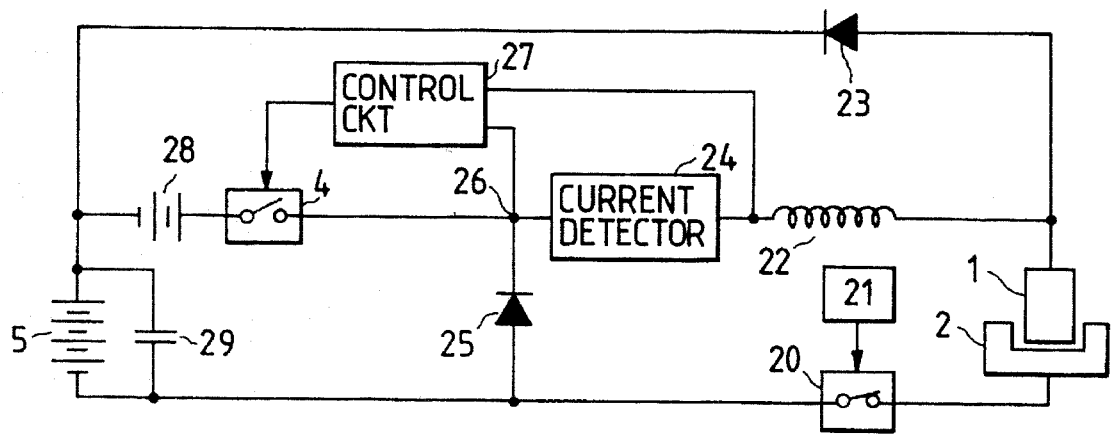
FIG. 58 is a circuit diagram illustrating a second conventional art.
Figure 59:
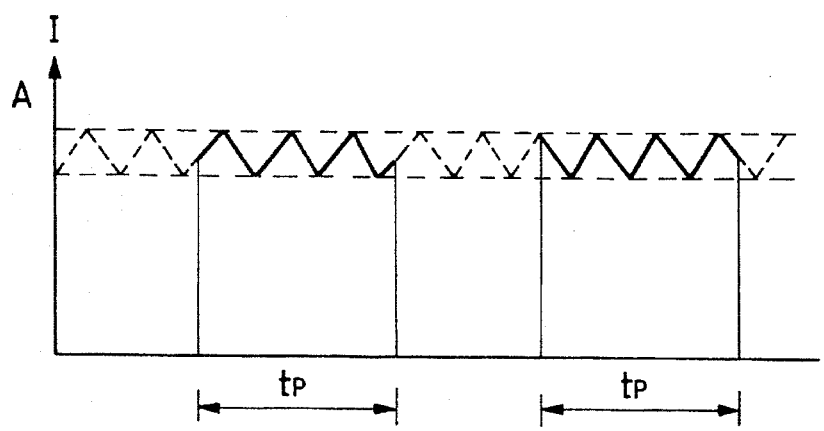
FIG. 59 is a current waveform diagram generated by the circuit in FIG. 58.
Figure 60:
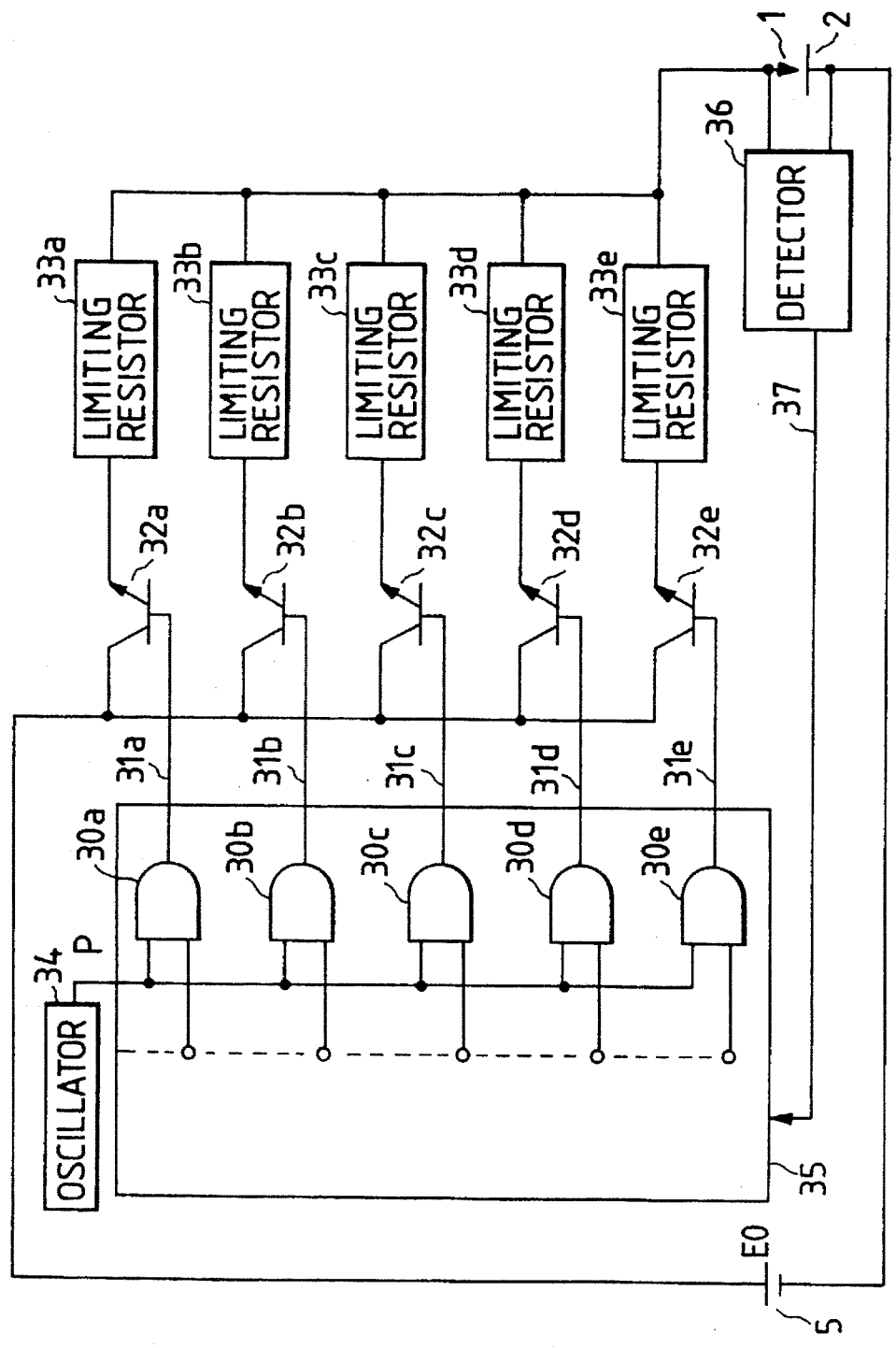
FIG. 60 is a circuit diagram illustrating a third conventional art.
Figure 61:
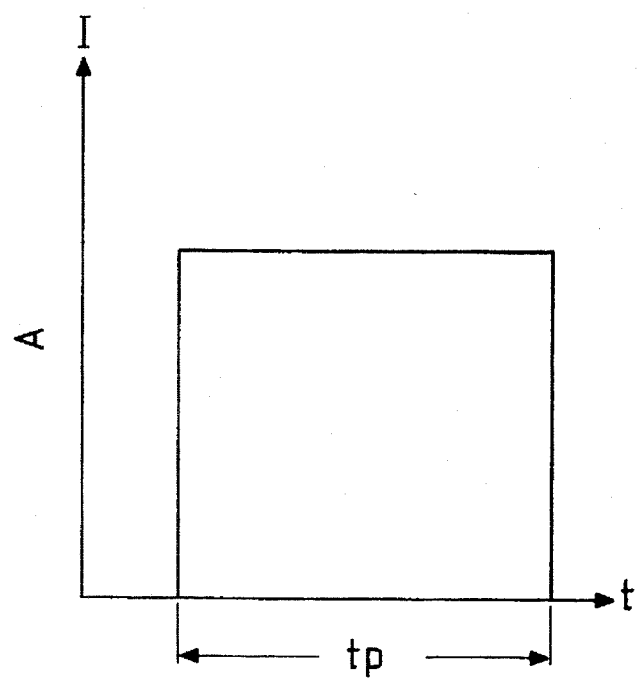
FIG. 61 is a current waveform diagram generated by the circuit in FIG. 60.
Figure 62:
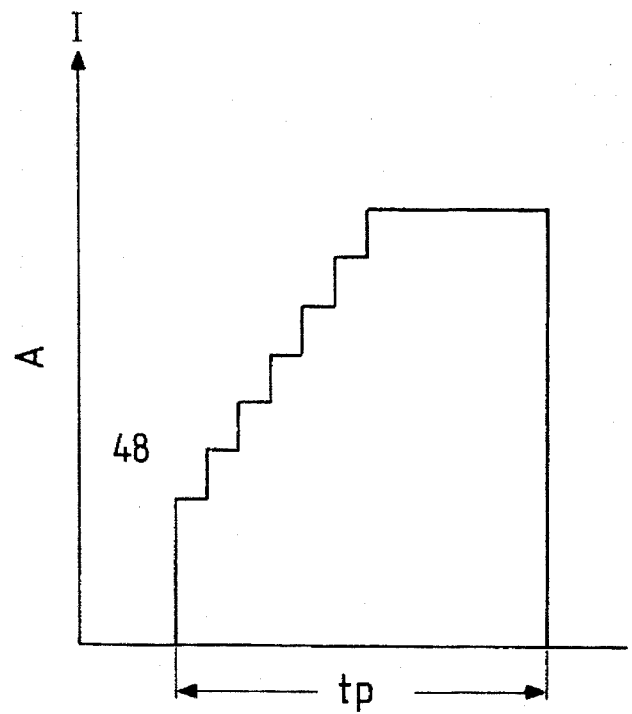
FIG. 62 is a current waveform diagram generated by the circuit in FIG. 60.

An eighteenth embodiment of the present invention will now be described with reference to FIG. 53. FIG. 53 is a main circuit diagram concerned with the eighteenth embodiment, and this embodiment is a combination of the fourteenth embodiment and the sixteenth embodiment. Namely, the series circuit of the third direct-current power supply E3, the fourth switching device 514 and the diode 515 in the fourteenth embodiment is connected in parallel with the first diode 202 in the sixteenth embodiment.

Its operation is easily understood in the operational explanation already given and therefore will not be described.

The transistors employed as the switching devices in the thirteenth to the eighteenth embodiments may be any devices that can be switched on/off electrically and may be replaced by such switching devices as MOSFETs, IGBTs and SITs to have the same effects.

The comparators, timer circuits, flip-flops, command values, AND circuits and inverters arranged on an analog basis as the control circuits in the eighth to the seventeenth embodiments may be substituted by DPSs (digital signal processors), microprocessors, etc., on a digital basis to provide the same effects.

It will be apparent that the present invention, as described above, achieves a power supply which is high in power supply efficiency, generates a desired electrical discharge current, is high in response speed, and provides an extremely few current ripples. Namely, the present invention accomplishes a compact, low-cost power supply which ensures stable machining.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A method for machining a workpiece using a power supply and switches for supplying pulse-shaped electric power to a machining gap between an electrode and a workpiece provided in a dielectric to machine the workpiece comprising the steps of:

switching on/off said switching devices in an optional cycle under the control of a current command value signal corresponding to an optional waveform shape of a current pulse to be supplied to said machining gap;

superimposing a current component, for compensating for a current ripple generated by said switching at the supply time of said current, on said optional waveform shape of a current pulse in order to generate a resultant current; and supplying said resultant current to said machining gap.

2. A method for machining a workpiece as set forth in claim 1, wherein said current component is provided by selectively switching a plurality of parallel resistors.

3. A method for machining a workpiece as set forth in claim 1, wherein said current component is provided by selectively operating an analog switching device in series with at least one resistor.

4. A method for machining a workpiece as set forth in claim 1, further comprising accumulating and supplying electrical energy intermittently to said machining gap.

5. A power supply apparatus for an electrical discharge machine for supplying a predetermined pulse-shaped electric power to a machining gap between an electrode and a workpiece comprising:

a first machining circuit comprising a power supply for generating a first current and for supplying machining energy to said machining gap, and a first switching device and a first resistor, said power supply, first switching device and first resistor being connected in series;

current detection means for detecting said first current flowing in said first machining circuit;

a second machining circuit comprising at least one series circuit, said series circuit comprising at least one second switching circuit means and being connected in parallel with said first switching device and said first resistor in said first machining circuit to supply said machining gap with a second current superimposed on said first current from said first machining circuit;

means for setting a current command value signal corresponding to the waveform shape of a current pulse to be supplied to said machining gap;

first signal addition/subtraction means for operating on and outputting a difference between at least a part of said current command value signal and a part of the output from said current detection means;

first control means for outputting a signal to said first switching device in said first machining circuit according to the output of said first signal addition/subtraction means;

second signal addition/subtraction means for operating on and outputting a difference between said current command value signal and the output of said current detection means; and second control means for outputting a switching signal to one or more of said at least one second switching circuit means in said second machining circuit according to the output of said second signal addition/subtraction means.

6. A power supply apparatus for an electrical discharge machine as set forth in claim 5, wherein said at least one second switching circuit means comprises a series connection of a second switching device and a second resistor.

7. A power supply apparatus for an electrical discharge machine as set forth in claim 5, wherein said at least one second switching circuit means comprises a semiconductor amplifier.

8. A power supply apparatus for an electrical discharge machine as set forth in claim 5, wherein said first machining circuit comprises:

an electrical energy accumulation circuit comprising said first switching device, a reactor and a first diode connected in series for intermittently supplying and accumulating electrical energy from said power supply;

a third switching device connected to supply said machining gap with an output current from said electrical energy accumulation circuit for supplying said output current to said machining gap in a pulse shape; and a second diode connected to return to said electrical energy accumulation circuit a residual current generated in said machining gap when said third switching device is switched off.

9. A power supply apparatus for an electrical discharge machine as set forth in claim 8 wherein:

said second machining circuit comprises at least one semiconductor amplifier connected in parallel with said electrical energy accumulation circuit in said first machining circuit to supply said machining gap with said second current.

10. A power supply apparatus for an electrical discharge machine for supplying pulse-shaped electric power to a machining gap between an electrode and a workpiece provided in dielectric, comprising:

a first current source for supplying a first current to said machining gap, said current being defined by a pulse form and response speed;

current detection means for detecting said first current supplied to said machining gap by said first current source;

a second current source connected in parallel with said first current source and being operative to supply said machining gap with a second current superimposed on said first current to form a resultant current, said second current source being higher in output current response speed than said first current source;

means for setting a current command value signal corresponding to the waveform shape of the current pulse to be supplied to said machining gap;

arithmetic means for arithmetically modifying said current command value signal;

first control means for providing the output of said arithmetic means as a current command value to said first current source; and second control means for outputting a difference between said current command value signal and an output from said current detection means as the current command of said second current source.

11. A power supply apparatus for an electrical discharge machine as set forth in claim 10, wherein said arithmetic means comprises means for subtracting a predetermined value from said current command value.

12. A power supply apparatus for an electrical discharge machine as set forth in claim 10, wherein said arithmetic means comprises means for multiplying a predetermined value in excess of 0 and not greater than 1 times said current command value.

13. A power supply apparatus for an electrical discharge machine for supplying pulse-waveform-shaped electric current to a machining gap between an electrode and a workpiece comprising:

a first current source for supplying a current pulse defined by an output response speed to said machining gap;

current detection means for detecting a current supplied to said machining gap by said first current source;

a second current source connected in parallel with said first current source, constituted to supply said machining gap with a current superimposed on the current from said first current source, and higher in output current response speed than said first current source;

a third current source connected in parallel with said first current source, capable of supplying a current in a direction opposite to the current supplying direction of said second current source, and higher in output current response speed than said first current source;

means for setting a current command value signal corresponding to the waveform shape of the current pulse to be supplied to said machining gap;

first control means for outputting said current command value signal to said first current source;

second control means for outputting a first polarity difference between said current command value signal and a current signal detected by said current detection means as the current command of said second current source; and third control means for outputting a second polarity difference between said current command value signal and a current signal detected by said current detector as the current command of said third current source.

14. A method for controlling a power supply for an electrical discharge machine comprising a constant current supply section having at least a first switching device and an output current on-off section having a second switching device to supply machining power to a machining gap between an electrode and a workpiece provided in dielectric, said method comprising the steps of:

setting the output current level and output current ripple of said constant current supply section;

defining the addition result of said set output current level and output current ripple as the output current command signal of said constant current supply section and comparing said output current command signal with the output current of said constant current supply section; and controlling the switching device of said constant current supply section according to the result of said comparing step.

15. A power supply apparatus for an electrical discharge machine comprising a constant current supply section having at least a first switching device and an output current on-off section having a second switching device to supply machining power to a machining gap between an electrode and a workpiece provided in dielectric, comprising:

- detection means for detecting the output current of said constant current supply section and outputting a detection value;
- output current level setting means for setting the value of the output current level of said constant current supply section;
- ripple current setting means for setting the value of the output current ripple of said constant current supply section;
- comparing means for comparing a set value found by adding the set value of said ripple current setting means to the set value of said output current level setting means with said detection value of said detection means; and
- means for on-off controlling said first switching device in the constant current supply section according to the comparison of said comparing means.

16. The power supply apparatus for the electrical discharge machine as defined in claim 15, wherein said ripple current setting means comprises modulating means for modulating the set signal frequency of said ripple current set value according to the set value of said output current level setting means.

17. A power supply apparatus for an electrical discharge machine comprising a constant current supply section having at least a first switching device and an output current on-off section having a second switching device to supply machining power to a machining gap between an electrode and a workpiece provided in dielectric, comprising:

- detection means for detecting the output current of said constant current supply section;
- output current level setting means for commanding the output current level of said constant current supply section;
- ripple current setting means for outputting a ripple current set value setting signal for setting the ripple in the output current of said constant current supply section;
- means for outputting a synchronization signal synchronized with the ripple current set value setting signal of said ripple current setting means;
- comparing means for comparing a set value, found by adding the set value of said ripple current setting means to the set value of said output current level setting means, with the detection value of said detection means;
- gate means for receiving the output of said comparing means and said synchronization signal to eliminate noise generated when said first switching device is switched on/off; and
- means for on-off controlling said first switching device according to the output of said gate means.

18. A power supply apparatus for an electrical discharge machine comprising constant current supply sections having at least first switching devices and output current on-off sections having second switching devices to supply machining power to a machining gap between an electrode and a workpiece provided in dielectric, comprising:

- a first constant current supply section;
- a second constant current supply section;
- first detection means for detecting the output current of said first constant current supply section;
- second detection means for detecting the output current of said second constant current supply section;
- output current level setting means for setting the output current levels of said first and second constant current supply sections;
- first ripple current setting means for setting the output current ripple of said first constant current supply section;
- second ripple current setting means for setting a set value 180 degrees out of phase with the set value of said first ripple current setting means;
- first comparing means for comparing a set value, found by adding the set value of said first ripple current setting means to the set value for said first and second constant current supply sections for said output current level setting means, with the detection value of said first detection means;
- second comparing means for comparing a set value, found by adding the set value of said second ripple current setting means to the set value for said first and second constant current supply sections for said output current level setting means, with the detection value of said second detection means; and
- means for on-off controlling said first switching devices in the first and second constant current supply sections according to the comparison results of said first and second comparing means.

19. A power supply apparatus for an electrical discharge machine comprising a constant current supply section having at least a first switching device and an output current on-off section having a second switching device to supply machining power to a machining gap between an electrode and a workpiece provided in dielectric, comprising:

- detection means for detecting the output current of said constant current supply section;
- output current level setting means for commanding the output current level of said constant current supply section;
- comparing means for comparing the set value of said output current level setting means with the detection value of said detection means to output a signal which switches off the first switching device in the constant current supply section according to the result of said comparison;
- timer means for receiving the comparison output of said comparing means and outputting a signal which switches on the first switching device in said constant current supply section when a predetermined period of time elapses after said comparing means has output a signal which switches off the first switching device in said constant current supply section; and
- means for on-off controlling the first switching device according to the output of said timer means.

20. A method for controlling a power supply for an electrical discharge machine comprising a constant-current supply section with a first direct-current power supply, a first switching device, a diode and a reactor for supplying a machining power to a machining gap between an electrode and a workpiece disposed in a dielectric fluid, comprising the steps of:

- switching said first switching device on/off at desired intervals to supply said machining gap with said current corresponding to a current command value signal from said first direct-current power supply; and
- adding a current for suppressing the reduction of an output current occurring at the off time of said first switching device.

21. A power supply apparatus for an electrical discharge machine comprising a constant-current supply section having a first direct-current power supply, a first switching device connected to one pole of said first direct-current power supply, a reactor connected in series with said first switching device, a first diode one end of which is connected to the other pole of said first direct-current power supply and the other end of which is connected to the connection point of said first switching device and said reactor, an output current on-off section having a second switching device for supplying a machining power to a machining gap between an electrode and a workpiece disposed in a dielectric fluid, a series connection of a second direct-current power supply having a voltage capable of supplying said machining gap with a voltage substantially equal to or lower than an electrical discharge voltage, a third switching device and a second diode connected in parallel with said first diode of said constant-current supply section.

22. The power supply apparatus for an electrical discharge machine as defined in claim 21, further comprising:

first comparing means for comparing a current command value with a current detection value of said reactor and generating an inversion output signal;

second comparing means for comparing an overcurrent command value with said current detection value of said reactor;

timer means whose input is connected to the output of the first comparing means; and first status storing means having a reset input connected to the output of said second comparing means and a set input connected to the output inversion signal of said first comparing means;

wherein said first switching device is controlled by the product of the output of said timer means, the output of said first status storing means and an electrical discharge signal, said third switching device is controlled by the product of the output of said first status storing means and the electrical discharge signal, said second switching device is controlled by the electrical discharge signal; and wherein said first switching device is switched off for a period of time set by said timer means when the current detection value of said reactor exceeds the current command value, and said third switching device also is switched off when the current detection value of said reactor exceeds the overcurrent command value.

23. A method for controlling a power supply for an electrical discharge machine comprising a constant-current supply section comprising a first direct-current power supply, a first switching device, a diode and a reactor for supplying a machining power to a machining gap between an electrode and a workpiece disposed in a dielectric fluid, comprising the steps of:

supplying said machining gap from a second direct-current power supply with a voltage higher than an electrical discharge voltage and lower than a voltage supplied by said first direct-current power supply and switching said first switching device off when an output current is at a predetermined current level; and switching on/off a switching device different from the first switching device at desired intervals to control the current from said second direct-current power supply.

24. A power supply apparatus for an electrical discharge machine comprising a constant-current supply section having a first direct-current power supply, a first switching device connected to one pole of said first direct-current power supply, a reactor connected in series with said first switching device, and a diode one end of which is connected to the other pole of said first direct-current power supply and the other end of which is connected to the connection point of the first switching device and the reactor, and an output current on-off section having a second switching device for supplying a machining power to a machining gap between an electrode and a workpiece disposed in a dielectric fluid, wherein a series connection of a second direct-current power supply has a voltage capable of supplying said machining gap with a voltage substantially equal to or lower than an electrical discharge voltage, a third switching device and a diode is connected in parallel with the diode of said constant-current supply section, and a series connection of a third direct-current power supply having a voltage capable of supplying the machining gap with a voltage higher than the electrical discharge voltage and lower than a voltage supplied by said first direct-current power supply, a fourth switching device and a diode is connected in parallel with the diode of said constant-current supply section.

25. The power supply apparatus for an electrical discharge machine as defined in claim 24, further comprising first comparing means for comparing a current command value with a current detection value of said reactor and generating an inversion output, second comparing means for comparing an overcurrent command value with the current detection value of said reactor, timer means whose input terminal is connected to the output of said first comparing means, and first status storing means having a reset input terminal connected to the output of said second comparing means and a set input terminal connected to the inversion output of said first comparing means;

wherein said fourth switching device is controlled by the output of said timer means and a current increase signal, the output of said first status storing means and an electrical discharge signal;

said first switching device is controlled by the product of the output of said timer means, the current increase signal and the electrical discharge signal;

said third switching device is controlled by the product of the output of said first status storing means and the electrical discharge signal;

said second switching device is controlled by the electrical discharge signal; and further, said fourth switching device is switched off for a period of time set in the timer means when the current detection value of the reactor exceeds the current command value, and said third and fourth switching devices also are switched off when the current detection value of the reactor exceeds the overcurrent command value.

26. A power supply apparatus for an electrical discharge machine comprising a constant-current supply section having a first direct-current power supply, a first switching device connected to one pole of said first direct-current power supply, a reactor connected in series with said first switching device, and a diode one end of which is connected to the other pole of said first direct-current power supply and the other end of which is connected to the connection point of the first switching device and the reactor, and an output current on-off section having a second switching device for supplying a machining power to a machining gap between an electrode and a workpiece disposed in a dielectric fluid, said apparatus further comprising:

a series connection of a second direct-current power supply having a voltage capable of supplying said machining gap with a voltage substantially equal to or lower than an electrical discharge voltage;

a third switching device and a diode connected in parallel with the diode of said constant-current supply section; and a series connection of a fourth direct-current power supply capable of changing a voltage, a fourth switching device and a diode connected in parallel with the diode of said constant-current supply section.

27. The power supply apparatus for an electrical discharge machine as defined in claim 26, further comprising:

first comparing means for comparing a current command value with a current detection value of said reactor;

second comparing means for comparing an overcurrent command value with the current detection value of said reactor;

timer means having an input terminal connected to the output of said first comparing means; and first status storing means having a reset input terminal connected to the output of said second comparing means and a set input terminal connected to the inversion output of said first comparing means;

wherein said fourth switching device is controlled by the product of the output of said timer means, the output of said first status storing means and an electrical discharge signal, said first switching device is controlled by the product of a no-load voltage signal and the electrical discharge signal, said third switching device is controlled by the product of the output of said first status storing means and the electrical discharge signal, said second switching device is controlled by the electrical discharge signal, and further said fourth switching device is switched off for a period of time set by said timer means when the current detection value of said reactor exceeds said current command value, and said third and fourth switching devices also are switched off when the current detection value of the reactor exceeds the overcurrent command value.

28. A power supply apparatus for an electrical discharge machine comprising a constant-current supply section having a first direct-current power supply, a first switching device connected to one pole of said first direct-current power supply, a reactor connected in series with said first switching device, and a diode one end of which is connected to the other pole of said first direct-current power supply and the other end of which is connected to the connection point of said first switching device and the reactor, and an output current on-off section having a second switching device for supplying a machining power to a machining gap between an electrode and a workpiece disposed in a dielectric fluid, said apparatus further comprising:

a series connection of a second direct-current power supply having a voltage capable of supplying said machining gap with a voltage substantially equal to or lower than an electrical discharge voltage;

a third switching device and a diode connected in parallel with the diode of said constant-current supply section; and a series connection of a third direct-current power supply having a voltage capable of supplying the machining gap with a voltage higher than a voltage supplied by said first direct-current power supply, a fourth switching device and a resistor, connected in parallel with said machining gap.

29. The power supply apparatus for an electrical discharge machine as defined in claim 28, further comprising:

first comparing means for comparing a current command value with a current detection value of said reactor;

second comparing means for comparing an overcurrent command value with the current detection value of said reactor;

timer means whose input terminal is connected to the output of said first comparing means; and first status storing means having a reset input terminal connected to the output of said second comparing means and a set input terminal connected to the inversion signal of the output of said first comparing means;

wherein said first switching device is controlled by the product of the output of said timer means, the output of said first status storing means and an electrical discharge signal, said third switching device is controlled by the product of the output of said first status storing means and the electrical discharge signal, said second switching device is controlled by the electrical discharge signal, and further said first switching device is switched off for a period of time set by said timer means when the current detection value of said reactor exceeds the current command value, said third switching device also being switched off when the current detection value of said reactor exceeds the overcurrent command value, and said fourth switching device is switched on by the product of a high-voltage pulse signal and the electrical discharge signal.

30. A power supply apparatus for an electrical discharge machine comprising a constant-current supply section having a first direct-current power supply, a first switching device connected to one pole of said first direct-current power supply, a reactor connected in series with said first switching device, and a diode one end of which is connected to the other pole of said first direct-current power supply and the other end of which is connected to the connection point of said first switching device and said reactor, and an output current on-off section having a second switching device for supplying a machining power to a machining gap between an electrode and a workpiece disposed in a dielectric fluid, wherein:

said first direct-current power supply comprises a plurality of direct-current power supplies having predetermined voltages and connected in series with each other, one of said plurality of direct-current power supplies being a second direct-current power supply having a voltage capable of supplying said machining gap with a voltage substantially equal to or lower than an electrical discharge voltage;

one end of a series connection of a third switching device and a diode is connected to the connection point of said second direct-current power supply and a third direct-current power supply, and the other end thereof is connected to the connection point of said first switching device and said reactor.

31. The power supply apparatus for an electrical discharge machine as defined in claim 30, wherein one of said plurality of direct-current power supplies is employed as a fourth direct-current power supply having a voltage capable of supplying said machining gap with a voltage higher than the electrical discharge voltage and lower than a voltage supplied by the first direct-current power supply in conjunction with said second direct-current power supply, one end of a series connection of a third switching device and a diode is connected to the connection point of said third direct-current power supply and fifth direct-current power supply other than said second direct-current power supply, and the other end thereof is connected to the connection point of said first switching device and said reactor.

32. The power supply apparatus for an electrical discharge machine as defined in claim 30, wherein a sixth direct-current power supply is connected to said first direct-current power supply, one end of a series connection of a fifth switching device and a resistor is connected to one end of said sixth direct-current power supply, and the other end, thereof is connected to one of the electrode and the workpiece.

* * * * *